US012168306B2

(12) United States Patent
Josefsson et al.

(10) Patent No.: US 12,168,306 B2
(45) Date of Patent: Dec. 17, 2024

(54) PANEL WITH DIFFERENT GROOVE DEPTHS

(71) Applicant: CERALOC INNOVATION AB, Viken (SE)

(72) Inventors: Per Josefsson, Ramlösa (SE); Richard Jolfson, Jonstorp (SE)

(73) Assignee: CERALOC INNOVATION AB, Viken (SE)

( * ) Notice: Subject to any disclaimer, the term of this patent is extended or adjusted under 35 U.S.C. 154(b) by 0 days.

(21) Appl. No.: 18/209,359

(22) Filed: Jun. 13, 2023

(65) Prior Publication Data

US 2023/0321865 A1 Oct. 12, 2023

Related U.S. Application Data

(63) Continuation of application No. 16/808,973, filed on Mar. 4, 2020, now Pat. No. 11,712,816.

(30) Foreign Application Priority Data

Mar. 5, 2019 (SE) .................................... 1950280-6
Mar. 5, 2019 (SE) .................................... 1950281-4

(51) Int. Cl.
*E04F 15/00* (2006.01)
*B27F 1/02* (2006.01)
(Continued)

(52) U.S. Cl.
CPC ................. *B27F 1/02* (2013.01); *B27M 3/04* (2013.01); *E04F 15/10* (2013.01)

(58) Field of Classification Search
CPC .......... E04F 15/02033; E04F 15/02038; E04F 15/107; E04F 15/102; E04F 13/0866;
(Continued)

(56) References Cited

U.S. PATENT DOCUMENTS 2,004,917 A 6/1935 Johnson
2,031,596 A 2/1936 Fulbright
(Continued)

FOREIGN PATENT DOCUMENTS

CA 2903432 A1 1/2008
CN 201338295 Y 11/2009
(Continued)

OTHER PUBLICATIONS

U.S. Appl. No. 18/295,559, filed Apr. 4, 2023, Darko Pervan.
(Continued)

*Primary Examiner* — Chi Q Nguyen
(74) *Attorney, Agent, or Firm* — Boone IP Law

(57) ABSTRACT

A method for forming grooves in a board element. An exemplary method includes arranging the board element in contact with a support member, and forming at least one groove in a rear side of the board element by removing material, such as chips, from the board element by rotating one or more cutting devices including a plurality of tooth elements configured to rotate around a rotational axis. A method further includes counteracting, such as preventing, a displacement of the board element away from the support member during forming of the at least one groove, wherein the counteracting, such as preventing, includes arranging at least a portion of the board element between an obstruction element and the support member.

20 Claims, 18 Drawing Sheets

(51) Int. Cl.
*B27M 3/04* (2006.01)
*E04F 15/10* (2006.01)

(58) Field of Classification Search
CPC ................ E04F 13/0894; E04F 15/105; E04F 2201/042; E04F 2201/0107; E04F 2201/03; E04F 2201/0552; E04F 2201/023; E04F 2201/0535; E04F 2201/0146; E04F 2201/043; E04F 2201/0547; E04F 2201/0153; E04F 2201/0138; B32B 3/06; B32B 5/02; B32B 27/08; B32B 27/12; B32B 27/20; B32B 27/304; B32B 2255/10; B32B 2307/412; B32B 2307/554; B32B 2307/558; B32B 2307/72; B32B 2419/00; B32B 2451/00; B32B 2471/00; B27M 3/04
See application file for complete search history.

(56) References Cited

U.S. PATENT DOCUMENTS 2,088,238 A 7/1937 Ray
2,269,927 A 1/1942 Crooks
2,324,628 A 7/1943 Kahr
3,234,074 A 2/1966 Bryant
3,619,964 A 11/1971 Passaro et al.
3,908,053 A 9/1975 Hettich
5,103,614 A 4/1992 Kawaguchi et al.
5,109,898 A 5/1992 Schacht
5,190,799 A 3/1993 Ellingson, III
5,208,086 A 5/1993 Owens
5,540,025 A 7/1996 Takehara et al.
5,879,781 A 3/1999 Mehta et al.
5,900,099 A 5/1999 Sweet et al.
6,156,402 A 12/2000 Smith
6,182,413 B1 2/2001 Magnusson
6,455,127 B1 9/2002 Valtanen
6,465,046 B1 10/2002 Hansson et al.
6,558,070 B1 5/2003 Valtanen
6,761,008 B2 7/2004 Chen et al.
6,769,219 B2 8/2004 Schwitte et al.
6,772,568 B2 8/2004 Thiers et al.
6,895,881 B1 5/2005 Whitaker
6,953,105 B2 10/2005 Rust et al.
7,152,379 B2 12/2006 Lin et al.
7,337,588 B1 3/2008 Moebus
7,413,374 B2 8/2008 Rogers et al.
7,918,062 B2 4/2011 Chen
8,029,880 B2 10/2011 Liu
8,082,717 B2 12/2011 Dammers
8,117,732 B2 2/2012 Dick et al.
8,166,718 B2 5/2012 Liu
8,245,477 B2 8/2012 Pervan
8,261,507 B2 9/2012 Hahn et al.
8,375,674 B2 2/2013 Braun et al.
8,381,488 B2 2/2013 Pervan
8,397,456 B2 3/2013 Ruhdorfer
8,419,877 B2 4/2013 Pervan et al.
8,484,924 B2 7/2013 Braun
8,490,361 B2 7/2013 Curry et al.
8,544,232 B2 10/2013 Wybo et al.
8,720,151 B2 5/2014 Pervan
8,784,587 B2 7/2014 Lindgren et al.
8,828,175 B2 9/2014 Roy
8,839,584 B2 9/2014 Sokol
8,850,769 B2 10/2014 Pervan
8,875,464 B2 11/2014 Pervan et al.
8,935,899 B2 1/2015 Bergelin et al.
9,050,731 B2 6/2015 Nobukuni
9,140,010 B2 9/2015 Pervan
9,194,135 B2 11/2015 Pervan
9,222,267 B2 12/2015 Bergelin et al.
9,314,936 B2 4/2016 Pervan
9,453,346 B2 9/2016 Yau
9,482,015 B2 11/2016 Pervan
9,556,623 B2 1/2017 Pervan
9,663,956 B2 5/2017 Pervan
9,714,515 B2 7/2017 Pervan
9,758,966 B2 9/2017 Bergelin et al.
9,758,972 B2 9/2017 Pervan
9,840,849 B2 12/2017 Pervan
10,066,400 B2 9/2018 Pervan
10,619,356 B2 4/2020 Pervan
10,669,724 B2 6/2020 Pervan
11,377,855 B2 * 7/2022 Josefsson ............ E04F 13/0894
11,712,816 B2 * 8/2023 Josefsson ............... B27G 21/00
144/371
2002/0007608 A1 1/2002 Pervan
2002/0007609 A1 1/2002 Pervan
2002/0100231 A1 8/2002 Miller et al.
2002/0170258 A1 11/2002 Schwitte et al.
2003/0009971 A1 1/2003 Palmberg
2003/0037504 A1 2/2003 Schwitte et al.
2003/0101681 A1 6/2003 Tychsen
2003/0233809 A1 12/2003 Pervan
2004/0211143 A1 10/2004 Hanning
2004/0211144 A1 10/2004 Stanchfield
2004/0226243 A1 11/2004 Lin et al.
2004/0255538 A1 12/2004 Ruhdorfer
2005/0005558 A1 1/2005 Bolduc
2005/0069674 A1 3/2005 Chang
2005/0102937 A1 5/2005 Pervan
2005/0108969 A1 5/2005 Whitaker
2005/0138881 A1 6/2005 Pervan
2005/0208255 A1 9/2005 Pervan
2005/0268571 A1 12/2005 Magnusson
2006/0179773 A1 8/2006 Pervan
2006/0191226 A1 8/2006 Kim et al.
2006/0194015 A1 8/2006 Sabater et al.
2007/0006543 A1 1/2007 Engstrom
2007/0175148 A1 8/2007 Bergelin et al.
2007/0193180 A1 8/2007 Plante
2007/0292656 A1 12/2007 Handojo
2008/0005992 A1 1/2008 Pervan
2008/0008871 A1 1/2008 Pervan
2008/0010937 A1 1/2008 Pervan et al.
2008/0092473 A1 4/2008 Heyns
2008/0110125 A1 5/2008 Pervan
2008/0184647 A1 8/2008 Yau
2009/0049792 A1 2/2009 Cappelle et al.
2009/0155612 A1 6/2009 Pervan et al.
2009/0183458 A1 7/2009 Gibson et al.
2009/0193748 A1 8/2009 Boo et al.
2009/0269522 A1 10/2009 Liu
2010/0088990 A1 4/2010 Liu
2010/0129611 A1 5/2010 Sugimoto
2011/0023302 A1 2/2011 Pervan et al.
2011/0030303 A1 2/2011 Pervan et al.
2011/0146188 A1 6/2011 Wallin
2011/0203703 A1 8/2011 Otsuka
2011/0247285 A1 10/2011 Wybo et al.
2011/0277409 A1 11/2011 Atkinson
2011/0308097 A1 12/2011 Vollrath
2012/0124932 A1 5/2012 Schulte et al.
2012/0266555 A1 10/2012 Cappelle
2012/0279158 A1 11/2012 Konstanczak
2013/0047536 A1 2/2013 Pervan
2013/0065072 A1 3/2013 Pervan et al.
2013/0145707 A1 6/2013 Pervan
2013/0199120 A1 8/2013 Bergelin et al.
2013/0260089 A1 10/2013 Gorby et al.
2013/0273244 A1 10/2013 Vetter et al.
2013/0283720 A1 10/2013 Pervan et al.
2013/0333182 A1 12/2013 Pervan et al.
2014/0000197 A1 1/2014 Pervan
2014/0069044 A1 3/2014 Wallin
2014/0215952 A1 8/2014 Pervan
2014/0283466 A1 9/2014 Boo
2015/0013260 A1 1/2015 Pervan
2015/0059927 A1 3/2015 Brnnstrm et al.
2015/0075675 A1 3/2015 Andersson
2015/0090400 A1 4/2015 Bergelin et al.
2015/0210055 A1 7/2015 Pervan

(56) References Cited

U.S. PATENT DOCUMENTS

| | | | |
|---|---|---|---|
| 2015/0284964 | A1 | 10/2015 | Yau |
| 2015/0345153 | A1 | 12/2015 | Pervan |
| 2016/0069089 | A1 | 3/2016 | Bergelin et al. |
| 2016/0168865 | A1 | 6/2016 | Pervan |
| 2016/0194883 | A1 | 7/2016 | Pervan |
| 2016/0201336 | A1 | 7/2016 | Pervan |
| 2016/0208501 | A1 | 7/2016 | Pervan |
| 2016/0250835 | A1 | 9/2016 | Pervan |
| 2016/0265234 | A1 | 9/2016 | Pervan |
| 2016/0265236 | A1 | 9/2016 | Pervan |
| 2016/0340910 | A1 | 11/2016 | Ramachandra et al. |
| 2016/0369507 | A1 | 12/2016 | Pervan et al. |
| 2017/0009462 | A1 | 1/2017 | Muehlebach |
| 2017/0114550 | A1 | 4/2017 | Pervan |
| 2017/0268238 | A1 | 9/2017 | Pervan |
| 2018/0002933 | A1 | 1/2018 | Pervan |
| 2018/0080232 | A1 | 3/2018 | Pervan |
| 2018/0223540 | A1 | 8/2018 | Cappelle |
| 2018/0313094 | A1 | 11/2018 | Pervan |
| 2018/0355260 | A1 | 12/2018 | Castillo et al. |
| 2018/0355620 | A1 | 12/2018 | Pervan |
| 2019/0024390 | A1 | 1/2019 | Yasuda et al. |
| 2019/0292793 | A1 | 9/2019 | Van et al. |
| 2020/0208411 | A1 | 7/2020 | Pervan |
| 2020/0308846 | A1 | 10/2020 | Josefsson et al. |
| 2021/0032877 | A1 | 2/2021 | Pervan |
| 2021/0198901 | A1 | 7/2021 | Josefsson et al. |
| 2021/0363760 | A1 | 11/2021 | Pervan |
| 2022/0063167 | A1 | 3/2022 | Josefsson et al. |

FOREIGN PATENT DOCUMENTS

| | | | |
|---|---|---|---|
| CN | 101932780 | A | 12/2010 |
| CN | 102652201 | A | 8/2012 |
| CN | 206025043 | U | 3/2017 |
| CN | 107208426 | A | 9/2017 |
| DE | 2251762 | A1 | 5/1974 |
| DE | 29521221 | U1 | 3/1997 |
| DE | 10049172 | A1 | 4/2002 |
| DE | 10300451 | B3 | 1/2004 |
| DE | 102005061099 | A1 | 3/2007 |
| DE | 102006024184 | A1 | 11/2007 |
| DE | 102007032885 | A1 | 1/2009 |
| EP | 2206851 | A2 | 7/2010 |
| EP | 2339092 | A1 | 6/2011 |
| EP | 2395180 | A2 | 12/2011 |
| EP | 2517848 | A1 | 10/2012 |
| EP | 2520737 | B1 | 3/2017 |
| EP | 3415702 | A1 | 12/2018 |
| EP | 3511485 | A1 | 7/2019 |
| ES | 2350339 | A1 | 1/2011 |
| FI | 21805 | A | 1/1947 |
| GB | 0519198 | A | 3/1940 |
| JP | 56-009114 | A | 1/1981 |
| JP | 62-178654 | A | 8/1987 |
| JP | 03-047366 | A | 2/1991 |
| JP | 03-055444 | U | 5/1991 |
| JP | 06-158831 | A | 6/1994 |
| JP | 08-028015 | A | 1/1996 |
| JP | 09-038906 | A | 2/1997 |
| JP | 10-299231 | A | 11/1998 |
| JP | 11-324292 | A | 11/1999 |
| JP | 2000-265652 | A | 9/2000 |
| JP | 2003-307023 | A | 10/2003 |
| JP | 2004-225387 | A | 8/2004 |
| JP | 2006-118337 | A | 5/2006 |
| JP | 2019-025589 | A | 2/2019 |
| RU | 2359093 | C2 | 6/2009 |
| WO | 96/06248 | A1 | 2/1996 |
| WO | 99/00242 | A1 | 1/1999 |
| WO | 01/48333 | A1 | 7/2001 |
| WO | 03/87498 | A1 | 10/2003 |
| WO | 2009/065769 | A2 | 5/2009 |
| WO | 2009/116926 | A1 | 9/2009 |
| WO | 2010/081532 | A1 | 7/2010 |
| WO | 2011/012104 | A2 | 2/2011 |
| WO | 2014/007738 | A1 | 1/2014 |
| WO | 2014/136128 | A1 | 9/2014 |
| WO | 2016/085397 | A1 | 6/2016 |
| WO | 2018/068197 | A1 | 4/2018 |
| WO | 2021/018918 | A1 | 2/2021 |

OTHER PUBLICATIONS

U.S. Appl. No. 17/812,281, filed Jul. 13, 2022, Darko Pervan.
U.S. Appl. No. 17/463,902, filed Sep. 1, 2021, Per Josefsson.
U.S. Appl. No. 17/705,465, filed Mar. 28, 2022, Per Josefsson.
U.S. Appl. No. 17/831,826, filed Jun. 3, 2022, Per Josefsson.
U.S. Appl. No. 18/055,473, filed Nov. 15, 2022, Per Josefsson.
U.S. Appl. No. 18/209,667, filed Jun. 14, 2023, Per Josefsson.
U.S. Appl. No. 18/210,429, filed Jun. 15, 2023, Per Josefsson.
U.S. Appl. No. 18/495,918, filed Oct. 27, 2023, Per Josefsson.
U.S. Appl. No. 18/425,012, filed Jan. 29, 2024, Per Josefsson.
International Preliminary Report on Patentability received for PCT Patent Application No. PCT/SE2020/050239, mailed on Sep. 16, 2021, 9 pages.
International Search Report and Written Opinion issued in PCT/SE2020/050239, mailed Mar. 25, 2020, Patent-och registreringsverket, Stockholm, SE, 12 pages.
Josefsson, Per, et al., U.S. Appl. No. 17/130,783 entitled "A Thermoplastic-Based Building Panel Comprising a Balancing Layer," filed Dec. 22, 2020.
Josefsson, Per, et al., U.S. Appl. No. 17/463,902 entitled "Method and Arrangement for Forming Grooves in a Board Element," filed Sep. 1, 2021.
Office Action (The First Office Action) issued Sep. 30, 2022, by the State Intellectual Property Office of People's Republic of China in corresponding Chinese Patent Application No. 202080034152.7 and an English Translation of the Office Action. (27 pages).
Official Action with International-Type Search Report issued in Swedish Patent Application No. 1950280-2, Sep. 2019, Patent-och registreringsverket, Stockholm, SE, 13 pages.
Pervan, Darko (Author), Technical Disclosure entitled "VA073a Zip Loc," IP com No. IPCOM000210869D, Sep. 13, 2011, IP.com Prior Art Database, 36 pages.
Pervan, Darko, U.S. Appl. No. 16/854,343 entitled "Mechanical Locking System for Floor Panels," filed Apr. 21, 2020.
Pervan, Dark, U.S. Appl. No. 17/228,240 entitled "Panel Formimg," filed Apr. 12, 2021.
Supplementary European Search Report and Search Opinion received for EP Application No. 20766520.9, mailed on Nov. 29, 2022, 7 pages.
U.S. Appl. No. 18/663,063, filed May 14, 2024, Per Josefsson.
U.S. Appl. No. 18/628,988, filed Apr. 8, 2024, Per Josefsson.

* cited by examiner

PANEL WITH DIFFERENT GROOVE DEPTHS

CROSS-REFERENCE TO RELATED APPLICATIONS

The present application is a continuation of U.S. application Ser. No. 16/808,973, filed on Mar. 4, 2020, now U.S. Pat. No. 11,712,816, which claims the benefit of Swedish Application No. 1950281-4, filed on Mar. 5, 2019, and the benefit of Swedish Application No. 1950280-6 filed on Mar. 5, 2019. The entire contents of each of U.S. application Ser. No. 16/808,973, Swedish Application No. 1950281-4 and Swedish Application No. 1950280-6 are hereby incorporated herein by reference in their entirety.

TECHNICAL FIELD

The disclosure generally relates to a method and a system for reducing weight in a board element. More specifically, the disclosure relates to a method and a system for forming at least one groove in a board element. The disclosure also relates to a corresponding board element comprising at least one groove. The board element may be a panel per se. Alternatively, the board element may be dividable or may be divided into at least two panels. The panel per se or any panel of said at least two panels may be a building panel, floor panel, wall panel, ceiling panel or furniture panel. Optionally, the panel per se or any panel of said at least two panels may comprise a locking system on at least one edge portion of the panel, preferably on two opposite edge portions of the panel.

BACKGROUND

Thermoplastic flooring currently attracts an increased interest in the market. Thermoplastic floor components may be flexible, such as Luxury Vinyl Tiles (LVT), or rigid, such as so-called Stone Plastic (Polymer) Composite (SPC) flooring. LVT tiles and SPC panels typically comprise PVC, a filler, such as chalk or stone powder, and additives. LVT tiles preferably comprise plasticizers.

A problem with these types of panels is that they may become heavy which may negatively impact their performance as well as their production and transportation costs. Moreover, the transportation and the handling of the panels may become cumbersome. Thereby, there is a need to reduce the weight of the panels. As a consequence of a weight reduction of the panels, less material may be needed for manufacturing the panels and, additionally, cost savings may be made.

WO 2013/032391 discloses LVT panels comprising flexing grooves for increasing the flexibility of the panels as well as for decreasing their weight. There is also disclosed methods for forming such grooves. The grooves may be formed with rotating jumping tools or with knives, or they may be formed when the panel is pressed.

WO 2014/007738 discloses building panels comprising thermosetting resins or a thermoplastic material, preferably comprising a filler, and being provided with core grooves. There is also disclosed methods for producing such panels as well as recycling material that has been removed when forming the core grooves. The core grooves may be formed with rotating saw blades, milling or carving.

However, there is need for improved methods and systems of providing such grooves in panels. There is also need for improved panels.

SUMMARY

It is therefore an object of at least embodiments of the present inventive concept to provide an improved method for forming grooves in a board element.

More specifically, it is an object of at least embodiments of the present inventive concept to provide a method that makes the forming of the grooves more controllable.

It is also an object of at least embodiments of the present inventive concept to provide a corresponding system.

Additionally, it is an object of at least embodiments of the present inventive concept to provide a corresponding panel comprising at least one groove.

It is also an object of at least embodiments of the present inventive concept to provide a panel comprising at least one groove that has improved balancing properties and/or that has improved strength properties, such as locking strength properties, for example while saving more material.

At least some of these and other objects and advantages that will be apparent from the description have been achieved by the various aspects described below.

In accordance with a first aspect of the inventive concept, there is provided a method for forming grooves in a board element. The method comprises arranging the board element in contact with a support member, such as on the support member, and forming at least one groove in a rear side of the board element by removing material, such as chips, from the board element by a processing tool.

As described further below, the board element may be a panel per se, or it may be dividable into at least two panels.

The board element or panel may comprise a front side and a rear side. The front side may adapted to be visible and, at least in some embodiments, the rear side may be adapted to be concealed in an installed state of the board element or panel, which may be a building panel, floor panel, wall panel, ceiling panel or furniture panel. In non-limiting examples, the floor panel may be an LVT tile, an SPC panel, an EPC panel (Expanded Polymer Core), or an WPC (Wood Plastic Composite) panel. Moreover, the board element or panel may comprise a pair of opposite edge portions. The board element or panel may comprise a first pair and a second pair of opposite edge portions. The first pair and the second pair may comprise long edge portions and short edge portions of the board element/panel, respectively.

In the following, it is understood that every embodiment and example discussed in relation to a board element in the first, second, third, and fourth aspects, are equally applicable to a panel.

The at least one groove may have a longitudinal extension and a transverse extension. The longitudinal extension may be larger than the transverse extension. In a first example, the longitudinal extension and the transverse extension may be parallel to a long edge portion and a short edge portion, respectively. In a second example, the longitudinal extension and the transverse extension may be parallel to a short edge portion and a long edge portion, respectively. In a third example, the longitudinal extension may be non-linear.

The board element may be fed towards the support member and/or processing tool in a feeding direction F. Preferably, for a board element comprising short edge portions and long edge portions, the feeding direction is parallel with the long edge portions. Thereby, the at least one groove may be formed in parallel with the long edge portions. However, it is equally feasible that the feeding direction is parallel with the short edge portions. Thereby, the at least one groove may be formed in parallel with the short edge portions. In either of the above cases, depending on how the board element is divided into at least two panels, if at all divided, the at least one groove in a panel may be parallel with long edge portions or short edge portions of the panel.

In operation of the method or a system configured to implement the method, the board element, such as the front side and/or the rear side, may be essentially parallel with a horizontal plane HP. The horizontal plane may extend in a direction parallel to the feeding direction F and in a lateral direction L.

During operation, the feeding direction F and/or the lateral direction L may be parallel with a first x and/or second y horizontal direction of the board element. The first and second horizontal directions may be perpendicular to each other. In a first example, the first and second horizontal directions extend in parallel with long edge portions and short edge portions of the board element, respectively. In a second example, the first and second horizontal directions extend in parallel with short edge portions and long edge portions of the board element, respectively. A vertical direction z of the board element may be perpendicular to the first and second horizontal directions.

The support member and/or the processing tool may be connected to a frame member. For example, the horizontal plane HP may be parallel to a supporting structure, such as a support floor, preferably being planar, on which the frame member is arranged during operation. The frame member may extend in a longitudinal direction X, a transverse direction Y, and a vertical direction Z. During operation, the feeding direction F of the board element may be parallel to the longitudinal direction X. Moreover, the lateral direction L may be parallel to the transverse direction Y during operation. For example, the longitudinal X and/or the transverse Y direction may be parallel to the supporting structure. An upward direction may be a direction parallel to the vertical direction Z of the frame member, such as directed away from the supporting structure. A downward direction may be a direction opposite to the upward direction.

It is emphasized that throughout this disclosure, any embodiment involving a board element may also be an embodiment involving a panel per se. It is noted, however, that the panel preferably comprises, or may be intended to comprise, a locking system.

The method may further comprise displacing the board element in a feeding direction, such as during the forming of the at least one groove. The board element may be displaced by a transportation device, such as a conveyor belt, at least one roller, etc., and/or by the support member.

The method may comprise arranging a receiving surface of the board element in contact with the support member, such as on the support member.

The receiving surface may be a front side of the board element, preferably facing downwards during the forming of the at least one groove. Thereby, the rear side may face upwards. Alternatively, the rear side may face downwards during the forming, the receiving surface preferably facing downwards.

The method may further comprise displacing the processing tool with respect to the support member during forming of the at least one groove, such as at least in a direction perpendicular to a feeding direction of the board element, the support member preferably being fixedly mounted in a frame member, and the direction preferably being parallel to a vertical direction of the frame member. The processing tool may be displaceably mounted in the frame member. Thereby, the processing tool may be displaced with respect to the board element. The processing tool may be displaced towards the support member in a first stage and away from the support member in a second, subsequent, stage.

By being fixedly mounted in the frame member, the support member may be fixed, such as in a direction perpendicular to a feeding direction, in particular during the forming of grooves.

The method may further comprise displacing the support member with respect to the processing tool during forming of the at least one groove, such as at least in a direction perpendicular to a feeding direction of the board element, the processing tool preferably being fixedly mounted in a frame member, and the direction preferably being parallel to a vertical direction of the frame member. The support member may be displaceably mounted in the frame member, such as being displaceable between a first position and a second position.

By being fixedly mounted in the frame member, the processing tool may be fixed, such as in a direction perpendicular to a feeding direction, in particular during the forming of grooves. It is clear, however, that the processing tool per se may comprise components that are displaceable; for example, it may comprise a rotating cutting device which may rotate during the forming of the grooves.

In some embodiments, the method comprises displacing the processing tool as well as the support member during forming of the at least one groove.

The processing tool may comprise or may be a rotating cutting device comprising a plurality of tooth elements configured to rotate around a rotational axis.

The rotating cutting device may comprise at least two cutting elements, preferably a plurality of cutting elements. A plurality of tooth elements may be arranged on each cutting element, preferably symmetrically. The cutting elements may be arranged on at least one shaft during the forming of the grooves. The rotational axis may coincide with one shaft axis. Each or any cutting element may be a cutting blade, preferably being circular. For example, adjacent cutting elements configured to form grooves in an individual floor panel, or a portion of a board element corresponding to an individual floor panel, may be separated by a distance of 0.5-20 mm, such as 3-9 mm, along the rotational axis. Moreover, a width of the cutting elements may be 2-5 mm, such as 3-4 mm.

The plurality of tooth elements may be provided in at least one set, such as a plurality of sets, around the rotational axis, each set comprising a plurality of tooth elements. The plurality of tooth elements of each set may be disposed along a joining curve, such as a straight line or, more generally, a non-linear curve. For example, the joining curve may follow a centre portion or outermost portion of the tooth elements. Preferably, such as when diameters d0 of the cutting elements are the same, the joining curve is provided in a surface of a right circular cylinder having the rotational axis as a centre axis. Moreover, when diameters d1, d2, . . . of the cutting elements are different, the joining curve is preferably provided in a surface of a cylinder having a varying radius and having the rotational axis as a centre axis. When projected from the surface of the cylinder, e.g. the right circular cylinder, onto a plane, the projected joining curve may be a monomial curve or a polynomial curve of order S, for example, $P_S(x)=a_0+a_1 x+a_2 x^2+a_3 x^3+ \ldots +a_S x^S$, where $a_0, a_1, a_2, a_3, \ldots$, as are constants any of which may be zero or non-zero. S may be any natural number S=0, 1, 2, 3, 4, 5, 6, . . . . For example, the monomials $P_1(x)=a_1x$ or $P_2(x)=a_2x^2$ may be used. Other joining curves are equally conceivable. For example, when projected from the surface of the cylinder onto a plane, the joining curve may be a stepwise constant curve, such as a sawtooth wave or a triangle wave or a square wave, or a Taylor series, such as a trigonometric function, e.g., sine or cosine.

Each set around the rotational axis may have the same type of joining curve.

In some embodiments, the tooth elements in a set of tooth elements may be angularly aligned along the rotational axis, thereby corresponding to a set of tooth elements disposed along a straight line.

A first tooth element may be angularly offset with respect to a second tooth element, such as along the rotation axis.

The first tooth element may be provided on a first cutting element and the second tooth element may be provided on a second cutting element. The first and second cutting elements may be provided along the rotational axis and preferably are spaced from each other.

The first and second tooth elements may be configured to rotate around the same rotational axis. The first tooth element may be angularly offset around the rotational axis with respect to the second tooth element.

Preferably, the first and second tooth elements are provided in the same set.

More generally, a plurality of tooth elements may be angularly offset around the rotational axis. The tooth elements may be provided in the same set. Moreover, each of the tooth elements may be provided on a respective cutting element.

In some embodiments, each of the tooth elements of a set may be angularly offset with respect to an adjacent tooth element in the set, such as two adjacent tooth elements.

The method may further comprise driving the board element in a lateral direction during forming of the at least one groove. The lateral direction may be parallel to a rotational axis of a rotating cutting device.

The board element may be driven towards an aligning element. The aligning element may be fixedly mounted in the frame member and/or the support member. The aligning element may be displaceably mounted in the frame member, such as when the support member is displaceably mounted in the frame member. Optionally, the aligning element may comprise a chamfer, preferably at a longitudinal end portion thereof, for laterally aligning the board element.

The board element may be provided between the aligning element and a blocking element. Thereby, a twisting of the board element may be counteracted. Optionally, the blocking element may comprise a chamfer, preferably at a longitudinal end portion thereof, for laterally aligning and/or guiding the board element.

The method may further comprise controlling a position, preferably a position in a lateral direction, of an aligning element and/or a blocking element.

In some embodiments, the aligning element may comprise roller members or wheels. Thereby, a friction between the aligning element and the board element may be reduced.

A cutting surface of at least one tooth element may be inclined. Thereby, the rotating cutting device may drive the board element in a lateral direction, such as towards an aligning element. Also, the removed material may be directed at least partly in a lateral direction. Preferably, at least a portion of the cutting surface is planar. Preferably, the cutting surface of each tooth element of a cutting element is inclined.

For example, the cutting surface may be inclined by having an inclined axial angle and/or an inclined top bevel angle. The axial angle may be inclined by 1°-70°, preferably 1°-25°, more preferably 1°-10°. The top bevel angle may comprise an inclined planar portion. Additionally, or alternatively, the cutting surface may be inclined by having an inclined rake angle, such as between −30° and +30°, preferably −20° and +20°, and more preferably −10° and +100.

A shape and/or an inclination of a cutting surface of a first tooth element and a cutting surface of a second tooth element may be different. Preferably, the first and second tooth elements are provided on the same cutting element.

Any or each cutting surface of the first and second tooth elements or, more generally, of a plurality of tooth elements, may be configured to remove a different material shape and/or a different amount of material from the board element, for example by having a different width W and/or a different radial depth D. For example, the cutting surface may comprise a recess on at least one of its sides. Moreover, top surfaces of the cutting surfaces, such as top bevel angles, may be different. An advantage of these embodiments is that a power consumption of the processing may be reduced and/or wear of the cutting elements may be reduced. In addition, a shape and/or size of the removed material, such as the shape and/or size of the chips, may be adjusted and, preferably, optimized.

The rotating cutting device may be configured to operate in an up-cut direction or a down-cut direction. The up cut may improve the control of the board element during operation of the rotating cutting device. The down cut may provide a smoother cutting surface. Also, a power consumption of the rotating cutting device may be reduced.

The rotating cutting device may be a first rotating cutting device and the processing tool may further comprise a second rotating cutting device comprising a plurality of tooth elements configured to rotate around a rotational axis, the second rotating cutting device preferably being located downstream of the first rotating cutting device in a feeding direction.

Preferably, the rotational axes of the first and second rotating cutting devices are parallel. In some embodiments, the processing device comprises a plurality of rotating cutting devices, the rotational axes of the each preferably being parallel. It is emphasized that embodiments of the second rotating cutting device or of any individual rotating cutting device of the plurality of rotating cutting devices may be the same as any of the embodiments for the first rotating cutting device described above.

The first and second rotating cutting devices may both be configured to operate in the same direction, such as in an up-cut direction or in a down-cut direction.

The first and second rotating cutting devices may be configured to operate, such as rotate, in opposite directions. Thereby, cutting forces and/or feeding forces may be decreased. In a first embodiment, the first rotating cutting device may be configured to operate in a down-cut direction and the second rotating cutting device may be configured to operate in an up-cut direction. By means of the up cut, the board element may be better controlled during forming of the grooves. In a second embodiment, the first rotating cutting device may be configured to operate in an up-cut direction and the second rotating cutting device may be configured to operate in a down-cut direction.

A cutting element of the second rotating cutting device may be laterally offset, such as completely laterally offset, with respect to a cutting element of the first rotating cutting device. Thereby, the first and second rotating cutting devices may cut at least partly consecutively, whereby cutting forces may be more controlled. A cutting element of the first rotating cutting device at a lateral position corresponding to a lateral position of the cutting element of the second rotating cutting device may thereby be absent.

A cutting part of the second rotating cutting device may be aligned with a cutting part of the first rotating cutting device. Thereby, the grooves may be formed sequentially.

Also, wear of the tooth elements may be decreased. At least one cutting element of the second rotating cutting device may be laterally aligned with respect to a corresponding number of cutting elements of the first rotating cutting device.

The first and second rotating cutting devices may comprise the same number of cutting elements and, optionally, all of them may be aligned.

The forming of at least one groove may comprise forming a first groove arrangement and forming a second groove arrangement. Each of the first and second groove arrangements may comprise at least one groove, preferably a plurality of grooves.

A groove of the first groove arrangement may be adjacent to at least one groove, preferably two grooves, of the first groove arrangement, such as in the first x and/or second y horizontal direction(s). A groove of the second groove arrangement may be adjacent to at least one groove, preferably two grooves, of the second groove arrangement, such as in the first and/or second horizontal direction(s). In other words, the grooves of each groove arrangement may be arranged together.

Grooves of the first and/or second groove arrangement(s), such as a longitudinal extension of the grooves, may be parallel to each other.

Generally, grooves of the respective first and second groove arrangement may have the same characteristics, such as cross sections, for example groove depths. The groove depths of the first and second groove arrangements may be different from each other.

Alternatively, or additionally, grooves of the first groove arrangement may have the same groove widths and/or grooves of the second groove arrangement may have the same groove widths. The groove widths of the first and second groove arrangements may be different from each other.

For example, the groove depths and/or groove widths of the first groove arrangement may be larger than the groove depths and/or groove widths of the second groove arrangement.

Generally herein, the groove depth of a groove may be a maximal groove depth, such as from a horizontal plane provided along the rear side to an innermost portion of the respective groove. Moreover, the groove width of a groove may be a maximal groove width.

More generally, the forming at least one groove may comprise forming a plurality of groove arrangements. Grooves of the each groove arrangement may have the same characteristics, such as cross sections, for example groove depths and/or groove widths. In some embodiments, the characteristics of at least two groove arrangements, such as all of them, may be different from each other.

The first groove arrangement may be spaced from the second groove arrangement in a first horizontal direction x and/or in a second horizontal direction y of the board element.

In one embodiment, the first and second groove arrangements each have groove depths and/or groove widths that are different from a groove depth and/or a groove width of a third groove arrangement. In a first example, the groove depths and/or the groove widths of the first and second groove arrangements are the same. In a second example, the groove depths and/or the groove widths of the first and second groove arrangements are different. The third groove arrangement may be disposed between the first and second groove arrangements, wherein the grooves of each of the first, second and third groove arrangements preferably extend in parallel with an edge portion of the board element or panel, preferably being a long edge portion, but may also be a short edge portion.

In examples, the groove depths of each of the first and second groove arrangements may be smaller than groove depths of the third groove arrangement, wherein the first and/or the second groove arrangement preferably is disposed adjacent to a respective edge portion, such as a long edge portion or a short edge portion, each optionally comprising a locking system.

The first and second groove arrangements may be at least partially, such as completely, formed by the same component of the processing tool, such as a single rotating cutting device. In a first example, the rotating cutting device may comprise cutting elements having the same diameter. In a second example, the rotating cutting device may comprise cutting elements having at least two different diameters.

In some embodiments, the groove depths of a plurality of grooves vary along the first x or the second y horizontal direction of the board element, such as along its long edge portions. Thereby, the indentation value and/or the balancing properties of the board element may be improved. A linking portion provided between or joining the grooves may be spaced from the rear side in a vertical direction z towards the front side. In a first example, the groove depths vary continuously such that substantially no portion of the grooves has a constant groove depth. In a second example, the groove depths of at least the end portions of the grooves vary continuously. Optionally, a centre portion of at least some of the grooves provided between the end portions may have a constant groove depth.

The processing tool may comprise a first and a second group of cutting elements, the first group and second group comprising cutting elements each having a first diameter and a second diameter, respectively, wherein the second diameter is different from the first diameter. The first and second diameters may be outer diameters of the respective cutting element.

The first groove arrangement may be at least partially, such as completely, formed by the first group of cutting elements and the second groove arrangement may be at least partially, such as completely, formed by the second group of cutting elements. Optionally, a third groove arrangement may be formed by a third group of cutting elements configured to rotate around the first or the second rotational axis.

The first and second groups of cutting elements may be configured to rotate around the same rotational axis.

The first and second groups of cutting elements may be configured to rotate around two different rotational axes, such as a first and a second rotational axis.

In a first example, the cutting elements of the first and/or the second group may be provided adjacent to each other, such as during forming of grooves. In a second example, at least some of the cutting elements of a group, such as the first or the second group, may be provided spaced from each other by at least one cutting element from a different group, such as the second or first group, respectively.

More generally, the rotating cutting device may comprise at least three groups of cutting elements, each group comprising cutting elements having the same diameter, and wherein the diameters of each of the different groups are different from each other.

The first groove arrangement may be formed at least partially, such as completely, by a first rotating cutting device and the second groove arrangement may be formed at least partially, such as completely, by a second rotating cutting device.

The first rotating cutting device may comprise cutting elements each having the same diameter, such as an outer diameter.

The second rotating cutting device may comprise cutting elements each having the same diameter, such as an outer diameter.

The first and/or the second rotating cutting device(s) may comprise cutting elements having at least two different diameters.

More generally, each or some of a plurality of groove arrangements may be spaced from each other in the first and/or second horizontal direction(s). Thereby, the balancing properties of the board element may be better controlled.

The method may further comprise counteracting, such as preventing, a displacement of the board element away from the support member during forming of the at least one groove. For example, an undesired displacement of the board element may be counteracted.

The board element may be prevented to be displaced beyond a critical position, preferably along a direction being parallel with the vertical direction of the frame member. The critical position may be a position beyond which the board element is prevented to be displaced.

The counteracting, such as preventing, may comprise arranging at least a portion of the board element between an obstruction element and the support member. The critical position may be determined by a surface of the obstruction element, the surface preferably being configured to face the board element in operation.

The obstruction element may be mounted in the frame member and/or to the support member.

In operation, the obstruction element may be provided above or below the support member.

The obstruction element may have a constant profile, for example a constant thickness, such as along a longitudinal direction X.

The obstruction element may have a varying profile, such as a varying thickness, along a longitudinal direction X, preferably being parallel to a feeding direction F of the board element, and optionally comprising a chamfer on at least one side of the obstruction element along the longitudinal direction. Preferably, at least one chamfer is configured to face an incoming board element. Thereby, the board element may be guided and/or aligned between the obstruction element and the support member in an improved manner. Also, a friction between the obstruction element and the board element may be reduced, e.g., since a contact surface between them may be reduced.

The varying profile of the obstruction element may be configured to face the board element in operation.

The counteracting, such as preventing, may comprise adjusting a distance, such a vertical distance Z1, between the obstruction element and the support member. Hence, a pressure exerted by the obstruction element and/or the support member on the board element may be adjusted.

The portion of the board element may engage with the obstruction element and the support member during forming of the at least one groove, preferably by a pressured engagement, such as a pretensioned engagement. The system may comprise a pressure member, such as a resilient member, for providing the pressured engagement, such as the pretensioned engagement.

The forming of the at least one groove may comprise arranging a portion of the processing tool through at least one slot in the obstruction element. Thereby, the board element may be processed while counteracting the displacement of the board element. The number of slots may correspond at least to the number of grooves to be formed and/or to the number of cutting elements of a rotating cutting device.

The at least one slot may be closed or open, such as open towards one lateral side of the obstruction element.

The method may further comprise forming the at least one slot by the processing tool. Thereby, the slots and the grooves may be formed by the same processing tool, for example during a single operation thereof. Thereafter, the obstruction element with the formed slot(s) may be reused.

It is clear that in embodiments where cutting elements are configured to rotate around two or more different rotational axes, there may be one respective obstruction element for each rotational axis. In some embodiments, however, there is no counteracting of a displacement of the board element. For example, the obstruction element may be missing.

An extension of any, some, or each of the formed at least one groove may be larger along the first horizontal direction x than along the second horizontal direction y of the board element, the first horizontal direction preferably being parallel to a feeding direction of the board element during operation.

A depth of any, some, or each of the at least one groove may be at least 0.2, such as at least 0.3, preferably at least 0.4, times a thickness of the board element.

After forming the grooves, an area of a rear side of the board element may be less than 90%, such as less than 80%, preferably less than 70%, of an area of a front side of the board element.

The forming of any, some or each of the at least one groove may comprise forming a first groove profile and, thereafter, a second groove profile, the second groove profile having a larger cross-sectional area than the first groove profile. The first and/or the second groove profile(s) may extend at least along a longitudinal portion of the groove which is to be formed. In a first example, the first and second groove profiles are formed by the same component of the processing device, such as a rotating cutting device. In a second example, the first and second groove profiles are formed by different components of the processing device, such as a first and a second rotating cutting device, respectively.

The first groove profile of a groove may correspond to a portion of a final groove profile. In a first example, the second groove profile of a groove may correspond to a final groove profile of the groove. In a second example, the second groove profile of a groove may correspond to a portion of the final groove profile. The method may comprise forming a third groove profile after forming the second groove profile, the third groove profile having a larger cross-sectional area than the second groove profile. The third groove profile may correspond to a final groove profile of the groove or, alternatively, the third groove profile may correspond to a portion of the final groove profile and the method may comprise forming of at least one additional groove profile; the last one of these groove profiles may correspond to a final groove profile of the groove.

The first and second groove profiles may have different shapes. For example, the width and/or the depth of the groove profiles may be different.

The first and/or second groove profile(s) may comprise one bevel or two bevels, each preferably being disposed between a respective groove wall and the rear side.

A shape of each of the first and second groove profiles may correspond to a shape of a corresponding tooth element. Thereby, a tooth element may comprise one tooth bevel or two tooth bevels.

Any, some or each of the at least one groove, such as a plurality of grooves, may be formed in an interior of the rear side being spaced from a pair of opposite edge portions, such as opposite short edge portions, of the board element, preferably being spaced from all edge portions of the board element. Here, any of the edge portions may be an outermost edge portion of the board element. Alternatively, or additionally, the at least one groove may be spaced from a locking system at a pair of opposite edge portions, such as opposite short edge portions, of the board element, preferably being spaced from locking system at all edge portions.

In some embodiments, the at least one groove, preferably a plurality of grooves, may extend to at least one edge portion of a pair of opposite edge portions, such as opposite short edge portions, of the board element.

The forming of the at least one groove may comprise forming at least two grooves having different lengths along a feeding direction F of the board element. Thereby, grooves having different lengths along the first and/or the second horizontal direction(s) of the board element (or panel) may be formed. Preferably, the grooves at least partially overlap along the first and/or the second horizontal direction(s) of the board element.

End portions of the grooves, preferably longitudinal end portions of the grooves, may be disposed along a joining curve, such as a straight curve or a non-linear curve. For example, the joining curve may follow an outermost portion of the grooves. In a first example, the joining curve may be a monomial curve or a polynomial curve of order N, for example, $Q_N(x)=b_0+b_1x+b_2x^2+b_3x^3+\ldots+b_Nx^N$, where $b_0$, $b_1$, $b_2$, $b_3$, . . . , $b_N$ are constants any of which may be zero or non-zero. N may be any natural number N=0, 1, 2, 3, 4, 5, 6, . . . . For example, the monomials $Q_1(x)=b_1x$ or $Q_2(x)=b_2x^2$ may be used. In a second example, the joining curve may be a stepwise constant curve, such as a sawtooth wave or a triangle wave or a square wave. In a third example, the joining curve may correspond to a Taylor series, such as a trigonometric function, e.g., sine or cosine.

The method may further comprise collecting the removed material, such as at least from the board element and/or the support member, preferably by suction and/or blowing, and preferably during a displacement of the board element.

The method may further comprise feeding the removed material created from the forming at least one groove into a container element, such as a cyclone. Thereby, at least parts of the removed material may be collected and, optionally, recycled.

The method may further comprise separating the removed material into a first and a second group of material elements, a characteristic of material elements of the first group being different from a corresponding characteristic of material elements of the second group, the characteristic preferably being at least one selected from the group of a material composition of the material elements, a size of the material elements, a weight of the material, a shape of the material, and a density of the material.

The separation may be implemented by a material separating device. The separating may be a cyclonic separation. For example, a cyclone may be utilized.

The characteristic of the material elements may be determined based on an ensemble of material elements or based on individual material elements.

The material elements may comprise, or may be, chips, particles, dust particles, etc. from the removed material. A dust particle may have a maximal extension of 0.1 mm. For example, chips and particles may be separated from the dust particles. In a first example, any, some or each of the size, the weight or the density of the material elements may be an average size, average weight, or an average density of the material elements. The shape may be an approximate shape. In a second example, any, some or each of the size, the weight or the density of the material elements may be a maximal size, a maximal weight, or a maximal density of the material elements.

The processing tool may be at least partially enclosed by an enclosure element.

The enclosure element may comprise at least one orifice. The orifices may be air inlets and/or air outlets. For example, enclosure element may comprise a housing and the obstruction element, wherein the orifice(s) may correspond to the slot(s) of the obstruction element. The material separation device may be connected to the enclosure element.

The board element may be a panel. It is again emphasized that any of the embodiments of the board element described herein thereby is equally valid for the panel, such as layer structure and material compositions. For instance, the grooves of a panel may correspond to grooves of a portion of the board element. It is noted, however, that the panel preferably comprises, or is intended to comprise, a locking system.

The panel may be part of a board element that has been divided into at least two panels. Moreover, the panel may be adapted to be installed on a substructure, such as in the case of a floor, ceiling, or wall panel, or it may be a furniture panel or building panel.

The panel may be a panel with or without a locking system, such as a mechanical locking system. For example, the locking system may be formed or provided in the panel before, during or after forming the grooves therein.

The method may further comprise dividing the board element into at least two panels, such as by sawing, cutting or breaking. The board element may be a dividable slab. In a first example, the dividing is performed after forming the at least one groove. In a second example, the dividing is performed before forming the at least one groove. In a third example, the at least one groove is formed at least partially at the same time as the dividing.

The board element may be divided along the first and/or second horizontal direction(s) of the board element. In a first example, the dividing is performed in parallel with a longitudinal extension of the at least one groove. In a second example, the dividing is performed transversely to the longitudinal extension of the at least one groove. In a third example, the dividing is performed in parallel with and transversely to the longitudinal extension of the at least one groove.

The dividing of the board element may comprise forming at least one notch in the board element. Thereby, the dividing may be simplified. The at least one notch may be formed in a front side of the board element, but may alternatively be formed in the rear side. The at least one notch may be formed along the feeding direction of the board element. For example, the notch may be formed after extrusion or calendaring of the board element, preferably while the board element has a temperature exceeding a critical temperature.

The method may further comprise forming at least one functional groove in the board element, preferably in the rear side. The functional groove may be configured to perform a function. For example, the at least one functional groove may be at least one guiding groove. Generally, it may assist in controlling the board element during various processing or treatment acts of the board element. For example, it may assist in guiding the dividing of the board element, guiding the board element when providing a layer on the board element, such as a backing layer, or guiding the board element when providing a locking system therein.

The functional groove may be positioned at a predetermined distance from an edge portion, such as an outermost edge portion. By way of example, the position of the functional groove may be more exact than positions of the grooves. Thereby, the associated function may be implemented in a more secure manner.

The method may further comprise controlling a processing or treatment of the board element, such as the dividing, by providing a guiding element in the at least one functional groove of the board element. Thereby, the dividing process may be better controlled. At the same time, due to the functional groove, material may be saved.

The at least one functional groove may extend to at least one edge of the board element, preferably to each of a pair of opposite edges. In some embodiments, however, the at least one functional groove may be provided in an interior of the rear side, thereby being spaced from each of a pair of opposite edge portions, preferably all edge portions of the board element.

The guiding element may be resilient, such as in a vertical direction Z.

The at least one functional groove may be formed in the board element before, during, or after forming the grooves. For example, at least one functional groove may be formed in the board element after an extrusion or calendering of, at least portions of, the board element.

The at least one functional groove may be a calibrating groove. A calibrating groove may facilitate locking of the panels, such as when the panels have diverging thicknesses or when no underlay element, such as a foam, is used. The calibration groove may be embodied as described in WO 2014/182215, page 2, lines 13-22, the disclosure of which is hereby expressly incorporated by reference in its entirety.

The method may further comprise forming a locking system on at least one edge portion of the panel or the at least two panels, preferably on two opposite edge portions thereof. The method may further comprise forming a locking system on a first pair and a second pair of opposite edge portions of the panel or the at least two panels, the first pair preferably comprising long edge portions of the panel or the at least two panels and the second pair preferably comprising short edge portions thereof. The locking system may comprise a horizontal locking system and/or a vertical locking system, the horizontal locking system preferably being integrally formed with each panel.

In some embodiments, such as when the panel is a floor panel, the panel may be configured to be installed in a floating floor system. In some embodiments, no horizontal or vertical mechanical locking system may be formed in the panel. For example, the panels may be configured to be nailed or glued to a subfloor. In another example, the panels may be configured to be installed loosely on a subfloor without any mechanical locking system, optionally being interconnectable by separate connecting elements, such as adhesive strips.

In some embodiments, the wall panels may comprise a locking system comprising a tongue and groove configuration and/or separate clips, optionally being connectable to a wall substructure, such as a rail.

The vertical locking system may be integrally formed with the panel. Alternatively, the locking system may be configured to comprise a separate locking tongue for vertical locking. Optionally, the method may further comprise: forming a displacement groove in an edge of the panel or the at least two panels, and providing the separate locking tongue in the displacement groove.

The forming of the at least one groove may comprise carving or scraping the board element. The processing tool may comprise a carving tool or a scraping tool.

The forming of the at least one groove may comprise drilling or milling the board element. The processing tool may comprise a drilling tool or a milling tool.

The board element may comprise at least one layer, wherein any layer, some layers, or each layer preferably comprises a thermoplastic material and, optionally, a filler. The filler may be a functional filler and/or an extender. One layer of the at least one layer may be a core layer.

The method may comprise forming the at least one groove in any layer or some layers, or in each layer of the at least one layers.

The filler of any layer may be a mineral material, such as calcium carbonate ($CaCO_3$) or stone material, such as stone powder, or similarly. Alternatively, or additionally, an organic material, such as organic fibers, e.g., wood flour or rice husks, or a clay material, such as kaolin, are feasible. It is noted that calcium carbonate may be provided in the form of chalk, limestone, or marble. For example, the amount of filler in the board element, such as in any layer (such as a layer the grooves are being formed in), may be 20-85 wt %, such as 40-80 wt %.

The thermoplastic material of any layer, some layers, or all layers may be or may comprise polyvinyl chloride (PVC). Alternatively, or additionally, the thermoplastic material of any layer, some layers, or all layers may be or may comprise PE, PP, PET or ABS. Optionally, each layer, some layers, or any layer may comprise a plasticizer and/or additives and/or pigments. For example, the amount of thermoplastic in the board element, such as in any layer (such as a layer the grooves are being formed in), may be 20-85 wt %, such as 40-80 wt %.

The board element may comprise at least two layers. The at least two layers may be laminated together or bonded together by an adhesive. One layer may be a core layer and other layer(s) may be a decorative layer and/or a wear layer. Optionally, the board element may further comprise a backing layer and/or a cover layer. The backing layer may be a balancing layer. Moreover, the cover layer may cover the grooves. The cover layer may be an insulation layer, and may impact the thermal and/or sound properties of the board element. Alternatively, or additionally, the cover layer may be configured to compensate for uneven surface portions of a substructure, such as a subfloor, on which the panel or board element is to be installed. For example, the cover layer may be a flexible layer, such as a foam layer. In non-restrictive examples, the cover layer may comprise an irradiated cross-linked polyethylene (IXPE) foam, Ethylene Vinyl Acetate (EVA) foam, foam rubber, cork, a natural material, or Polyurethane (PU) foam.

More generally, the board element may comprise at least three layers. The at least three layers may be laminated together or bonded together by an adhesive. One layer may be a core layer, one layer may be a decorative layer, and one layer may be a wear layer. Optionally, the board element may further comprise a backing layer and/or a cover layer.

Optionally, a finish layer may be provided on the at least one the layer. For example, the finish layer comprises a lacquer, which may be curable by ultra-violet radiation (UV) or by an electron beam (EB). The finish layer may be a water-based lacquer. Optionally, the finish layer may comprise PU.

The forming at least one groove may comprise forming a first portion of the at least one groove in a first layer and, thereafter, forming a second portion of the at least one groove in the first layer and/or in a second layer.

The first portion may be formed in the first layer only, and the second portion may be formed in the second layer only. Thereby, the removed material of first and the second layer may be easily separated. This may be advantageous when the materials of the first and second layers are different and e.g., need to be recycled separately. For example, the first and second layers may comprise different material compositions, such as different amounts of thermoplastic material, fillers, plasticizers, additives, pigments, etc.

More generally, the method may comprise consecutively forming a portion of the at least one groove in a plurality of layers in analogy with the discussion above, i.e., first forming in a first layer, then forming in a second layer, then forming in a third layer, etc.

The board element may comprise at least one reinforcement layer, such as at least one glass fibre layer. The forming the at least one groove may comprise removing at least a portion of the at least one reinforcement layer. The removed portions may correspond to at least one opening of the at least one reinforcement layer, preferably fully penetrating the reinforcement layer.

The method may further comprise controlling a penetration depth of the processing tool such that the at least one reinforcement layer is left unprocessed. Thereby, wear of the processing tool may be reduced. Moreover, a function of the at least one reinforcement layer may remain intact.

The method may further comprise extruding and/or calendering at least one layer, each preferably comprising thermoplastic material, for forming the board element. The method may comprise coextruding at least two layers, each preferably comprising thermoplastic material, for forming the board element.

It is noted that the steps of the method in accordance with any of the embodiments and examples above do not have to be performed in the exact order disclosed above.

According to a second aspect of the inventive concept, there is provided a panel obtainable by a method according to the first aspect. For example, the board element in the method according to the first aspect may be a panel.

Embodiments and examples of the panel in accordance with the second aspect are largely analogous to those of the first, third and fourth aspects, wherein reference is made thereto. Further embodiments are provided in an embodiment section below.

According to a third aspect of the inventive concept, there is provided a system for forming grooves in a board element. The system comprises a frame member, a support member for supporting the board element during the forming, and a processing tool.

Embodiments and examples of the system in accordance with the third aspect are largely analogous to those of the first, second, and fourth aspects, wherein reference is made thereto. In fact, some embodiments of the system in accordance with the third aspect have been described in under the first aspect. Further embodiments are provided in an embodiment section below. In addition, the following embodiments are conceivable.

The system may further comprise a transportation device adapted to displace the board element in a feeding direction F. Optionally, the transportation device may comprise the support member.

The support member may be displaceably mounted in the frame member, such as being displaceable at least in a direction perpendicular to a feeding direction of the board element. Alternatively, or additionally, the support member may be fixedly mounted in the frame member.

The processing tool may be displaceably mounted in the frame member, such as being displaceable at least in a direction perpendicular to a feeding direction of the board element. Alternatively, or additionally, the processing tool may be fixedly mounted in the frame member.

The processing tool may comprise or may be a rotating cutting device comprising a plurality of tooth elements configured to rotate around a rotational axis.

The rotating cutting device may comprise at least two cutting elements, preferably a plurality of cutting elements.

A first tooth element may be angularly offset around the rotational axis with respect to a second tooth element.

A cutting surface of at least one tooth element may be inclined, such as 1°-70°, preferably 10°-55°, more preferably 15°-25°.

A shape and/or an inclination of a cutting surface of a first tooth element and a cutting surface of a second tooth element may be different.

The rotating cutting device may be configured to operate in an up-cut direction or a down-cut direction.

The rotating cutting device may be a first rotating cutting device and the processing tool may further comprise a second rotating cutting device comprising a plurality of tooth elements configured to rotate around a rotational axis, the second rotating cutting device preferably being located downstream of the first rotating cutting device in a feeding direction F.

The first rotating cutting device may be configured to operate in a down-cut direction and the second rotating cutting device may be configured to operate in an up-cut direction. Clearly, the other combinations described above are equally conceivable.

A cutting element of the second rotating cutting device may be laterally offset with respect to a cutting element of the first rotating cutting device.

At least one cutting element of the second rotating cutting device may be laterally aligned with respect to a corresponding number of cutting elements of the first rotating cutting device.

The first rotating cutting device may comprise cutting elements each having the same diameter and/or the second rotating cutting device may comprise cutting elements each having the same diameter.

At least one of the first and second rotating cutting devices may comprise cutting elements having at least two different diameters.

The system may further comprise an aligning element, optionally comprising a chamfer, for example at a longitudinal end portion thereof. Moreover, the system may further comprise a blocking element, wherein the board element is configured to be provided between the aligning element and the blocking element, the blocking element optionally comprising a chamfer, for example at a longitudinal end portion thereof.

The system may further comprise an obstruction element configured to counteract, such as prevent, a displacement of the board element away from the support member.

The obstruction element may have a varying profile, such as a varying thickness, along a longitudinal direction X, preferably being parallel to a feeding direction F of the board element, optionally comprising a chamfer on at least one side of the obstruction element along the longitudinal direction.

A portion of the processing tool may be configured to be arranged through at least one slot in the obstruction element. The at least one slot may be closed or open, such as open towards one lateral side of the obstruction element.

The system may further comprise a pressure member, optionally being a resilient member, configured to exert pressure on, such as providing a pretensioned engagement against, the board element. The pressure member may be connected to the frame member.

The pressure member may comprise the obstruction element and/or the support member. Thereby, the obstruction element and/or the support member may exert pressure on the board element. The pressure member may comprise at least one actuator element configured to displace the obstruction element and/or the support member in at least in a direction perpendicular to a feeding direction of the board element, wherein the direction preferably is parallel to a vertical direction of a frame member.

When the pressure member is embodied as a resilient member, it may comprise at least one resilient element, such as a spring element. The resilient member may comprise the obstruction element and/or the support member. Thereby, the obstruction element and/or the support member may be pretensioned against the board element. The resilient member may comprise a resilient covering. For example, the resilient covering may be provided on the support member and/or on the obstruction element.

The system may further comprise a material collecting device, such as a suction device and/or a blowing device, for collecting the removed material. The system may further comprise a material separating device and/or an enclosure element.

The system may further comprise a board dividing device configured to divide a board element into at least two panels. The board dividing device, or a separate notching apparatus, may be configured to provide notches in the board element as described above.

The system may further comprise a guiding element for controlling the dividing of the board element.

The system may further comprise a locking system unit configured to form a locking system on at least one edge portion of a panel or at least two panels, preferably on two opposite edge portions thereof.

The processing tool may comprise a carving tool or a scraping tool. The carving tool or scraping tool may comprise at least one tooth element, preferably being provided in a tooth holder. In a first example, the tooth holder is fixedly mounted in the frame member. In a second example, the tooth holder comprises at least two tooth units and is configured to rotate intermittently between the tooth units. In a third example, which optionally may be combined with the second example, the tooth holder is displaceably mounted in the frame member.

The processing tool may comprise a drilling tool or a milling tool.

According to a fourth aspect of the inventive concept, there is provided a panel comprising at least one layer. The panel comprises at least one groove in a rear side of the panel, preferably a plurality of grooves.

Embodiments and examples of the panel in accordance with the fourth aspect are largely analogous to those of the first, second, and third aspects, wherein reference is made to the above. Further embodiments are provided in an embodiment section below. In addition, the following embodiments are conceivable.

The at least one groove may comprise one bevel or two bevels, each preferably being disposed between a respective groove wall and the rear side. Any or both bevels may be at least partly planar or rounded. Each groove of the at least one groove may comprise such a bevel or bevels.

A groove profile, preferably a cross-sectional groove profile, of a groove may comprise the bevel or bevels.

The at least one groove may comprise a first groove arrangement and a second groove arrangement, each of the first and second groove arrangements comprising at least one groove, preferably a plurality of grooves. Generally, grooves of the first and/or second groove arrangement(s) may have the same characteristics, such as cross sections. More details of embodiments have been described in relation to the first aspect.

Generally herein, the cross sections may include groove depths and/or groove widths.

Grooves of the first groove arrangement may have the same groove depths and grooves of the second groove arrangement may have the same groove depths, wherein groove depths of the first and second groove arrangements are different from each other.

The first groove arrangement may be spaced from the second groove arrangement in a first horizontal direction x and/or in a second horizontal direction y of the panel.

The at least one groove may comprise a third groove arrangement comprising at least one groove, preferably a plurality of grooves, the first and second groove arrangements each having characteristics, such as groove depths and/or groove widths, that are different from characteristics, such as groove depths and/or groove widths, of the third groove arrangement, the third groove arrangement preferably being disposed between the first and second groove arrangements, and wherein the grooves of each of the first, second and third groove arrangements preferably extend in parallel with an edge portion of the panel, preferably being a long edge portion.

The groove depths of each of the first and second groove arrangements may be smaller than groove depths of the third groove arrangement, wherein the first and/or the second groove arrangement(s) preferably is disposed adjacent to a respective edge portion, such as a long edge portion or a short edge portion, each optionally comprising a locking system.

The panel may comprise at least two grooves, wherein at least one pair of grooves are provided in an offset relation in a first x and/or a second y horizontal direction of the panel.

The at least one groove may be provided in an interior of the rear side being spaced from a pair of opposite edge portions, such as opposite short edge portions, of the panel, preferably being spaced from all edge portions of the panel.

The at least one groove may extend to at least one edge portion of a pair of opposite edge portions, such as opposite short edge portions, of the panel.

The at least one groove may comprise at least two grooves having different lengths along the first x and/or second y horizontal direction(s) of the panel. Preferably, the longitudinal lengths of the at least one groove are different.

End portions of the grooves, preferably longitudinal end portions of the grooves, may be disposed along a joining curve, such as a straight curve or a non-linear curve. The joining curve may be a monomial curve or a polynomial curve of order N, where N is any natural number N=0, 1, 2, 3, 4, 5, 6, . . . , wherein the joining curve is a stepwise constant curve, such as a sawtooth wave or a triangle wave or a square wave, or wherein the joining curve corresponds to a Taylor series, such as a trigonometric function, e.g. sine or cosine.

The panel may comprise at least a first layer and a second layer, such as a plurality of layers, for example comprising a core layer, a decorative layer and/or a wear layer.

The panel may further comprise a backing layer and/or a cover layer.

At least two layers may be laminated together or bonded together by an adhesive.

The at least one groove may be provided in the first layer only. More specifically, any, some or each groove may be provided in the first layer only. For example, the grooves may completely penetrate the first layer.

The at least one groove may be provided in the first and second layers only. More specifically, any, some or each groove may be provided in the first and second layers only. For example, the grooves may completely penetrate the first and second layers.

The panel may comprise at least one reinforcement layer. The at least one reinforcement layer may comprise at least one opening.

Any layer, some layers, or each layer may comprise a thermoplastic material, such as PVC, PE, PP, PET, or ABS and, optionally, a filler, such as a mineral material, such as calcium carbonate or stone material, such as stone powder. Each layer, some layers, or any layer of the at least one layer may comprise a plasticizer and/or additives and/or pigments. Other conceivable alternatives and combinations of the layer compositions are described under the first aspect.

Any layer, some layers or each layer may be calendered or extruded, such as coextruded, each of the calendered or extruded layer preferably comprising a thermoplastic material, such as PVC, and optionally a filler.

The panel may further comprise a locking system on a first pair and a second pair of opposite edge portions of the panel, the first pair preferably comprising long edge portions of the panel and the second pair preferably comprising short edge portions thereof. Preferably, the at least one groove is provided inwardly of the locking system on the first and/or second pair.

The at least one groove may have a substantially vertical groove wall. For example, such grooves may be formed by drilling or milling.

Further aspects of the inventive concept and embodiments and examples of each of the first, second, third and fourth aspects are provided in an embodiment section below. It is emphasized that the embodiments and examples of any aspect may be combined with embodiments and examples of any other aspect.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

BRIEF DESCRIPTION OF THE DRAWINGS

The disclosure will in the following be described in connection to exemplary embodiments and in greater detail with reference to the appended exemplary drawings, wherein.

DETAILED DESCRIPTION

Figure 1:
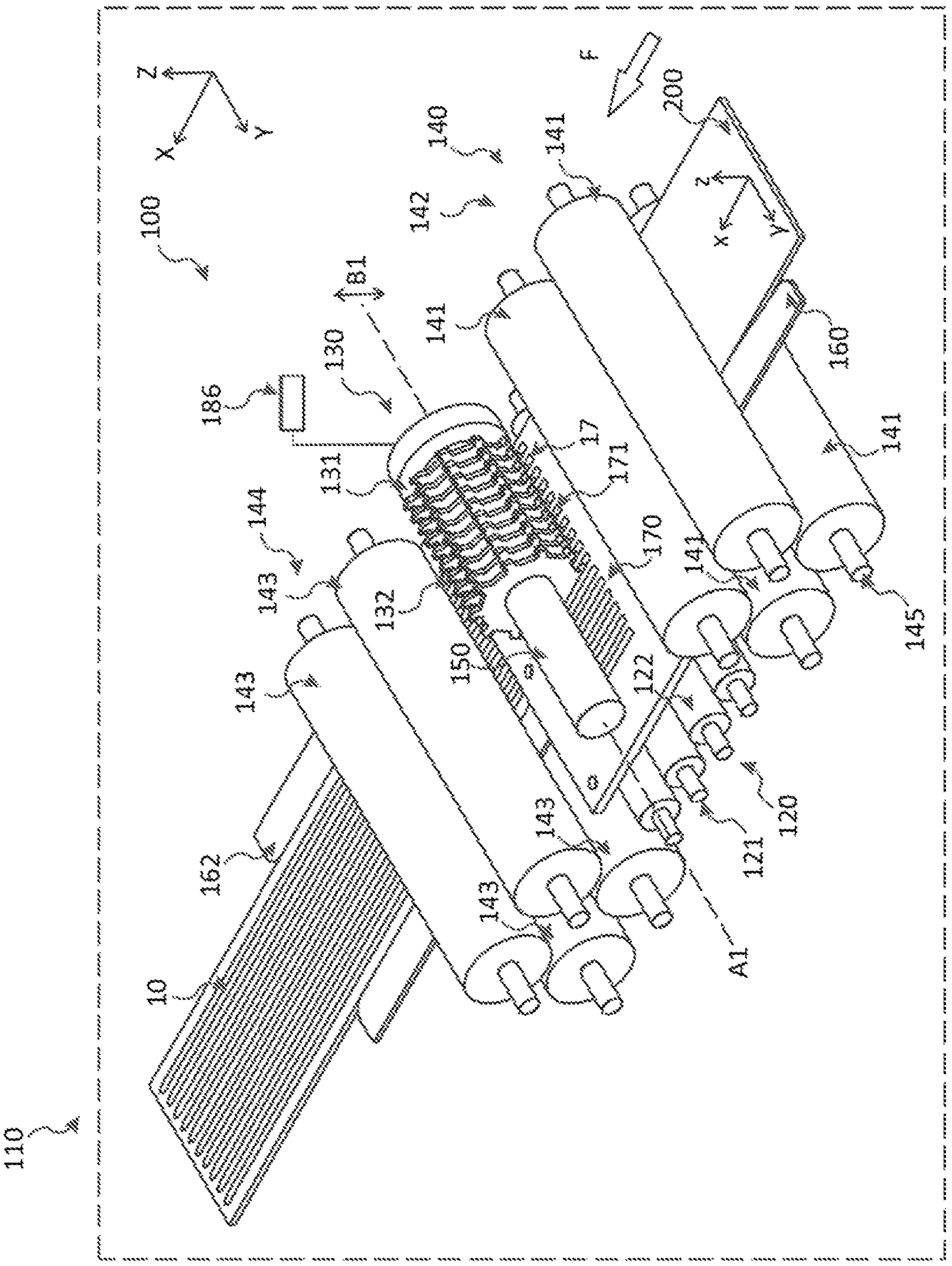
FIG. 1 illustrates in a perspective view an embodiment of a system for forming grooves in a board element.

FIGS. 1, 2*a*-2*g*, 3*a*-3*h*, 4*a*-4*e*, 5*a*-5*g*, 6*a*-6*g*, 7*a*-7*h*, 8*a*-8*f*, 9*a*-9*h*, 10*a*-10*e*, 16*a*-16*d*, 16*f*-16*g*, 17*a*-17*c*, 18*a*-18*c* and 18*f* illustrate embodiments of a system 100 for forming grooves 10 in a board element 200. The system is capable of implementing a method for forming grooves in the board element.

The system 100 comprises a frame member 110, a support member 120 for supporting the board element 200 during the forming, and a processing tool 130. The system preferably further comprises a transportation device 140 adapted to displace the board element in a feeding direction F towards the support member and/or processing tool. For example, a feeding speed may be 0.5-350 m/min, such as 20-130 m/min.

In the perspective view in FIG. 1 the frame member 110 is shown only schematically by a broken line, but it is understood that the support member and/or the processing tool may be connected thereto. The frame member extends in a longitudinal direction X, a transverse direction Y, and a vertical direction Z.

The support member 120 may comprise at least one roller 122. Each roller is configured to rotate and may thereby displace the board element during the forming of grooves. It is understood that other support members are equally conceivable, such as a conveyor belt, a plate, etc. Preferably, the support member is fixedly mounted in the frame member and may be fixed at least in the vertical direction Z of the frame member.

Grooves 10 may be formed in a board element 200 arranged in contact with the support member 120 by the processing tool 130, e.g., by displacing a rotating cutting device 131 with respect to the support member. The displacement may be controlled by a control unit 186.

The transportation device 140 may comprise a first 142 and/or a second 144 roller arrangement, and optionally parts of the support member, such as the at least one roller 122. Preferably, and as shown in, e.g., FIG. 1, the first 142 and second 144 roller arrangements are provided upstream and downstream of the support member, respectively, along the feeding direction F. Each of the first 142 and second 144 roller arrangements may comprise at least one roller 141, 143, configured to be provided above and/or below the board element 200 during operation. At least one roller 122, 141, 143 may be driving. For example, a shaft 121, 145 of a driving roller may be driven by means of a motor, e.g., via a gearwheel configuration 146 of the driving roller (cf. FIG. 4*c*). It is understood that other embodiments of the transportation device are equally conceivable, such as at least one conveyor belt and/or any combination with the support member or roller arrangements.

Components of the transportation device 140, such as the first 142 and/or a second 144 roller arrangement(s), may be configured to position the board element 200, such as in the vertical direction Z.

The support member 120 and the processing device 130 may overlap along the longitudinal direction X, as shown in, e.g., FIG. 1. In some embodiments (not shown), however, the support member and the processing device may be spaced along the longitudinal direction X. For example, the support member may comprise components of the transportation device 140, such as the first 142 and/or a second 144 roller arrangement(s).

The processing tool 130 is configured to remove material 80, such as chips. In FIGS. 1 and 2*a*-2*g* the processing tool comprises a rotating cutting device 131 comprising at least two cutting elements 132, preferably a plurality of cutting elements, arranged on a shaft 150 configured to rotate around a rotational axis A1. The rotational axis A1 and the transverse direction Y may be essentially parallel. The shaft 150 may be driven by any method known in the art, such as by a motor. The cutting elements may be circular cutting blades or saw blades, such as diamond cutting blades or hardened saw blades, preferably comprising tooth elements comprising hardened tooth elements. For example, the hardened saw blades may be carbide saw blades comprising tooth elements comprising cemented carbide. A plurality of tooth elements 133 are arranged on each cutting element 132, see e.g., FIG. 2*e*. The rotating cutting device 131 is displaceably mounted in the frame member 110, since it is displaceable at least in the vertical direction Z, such as downwards and/or upwards, with respect to the frame member 110 and/or the support member 120 between a first and a second position (see arrow B1). The rotating cutting device 131 may be a jumping tool.

A diameter d0 of each cutting element may be 50-400 mm, such as 100-200 mm. Moreover, a rotation speed may be 1000-12000 rpm, such as 2000-6000 rpm, preferably 3000-4500 rpm. For example, a cutting element having a diameter of 100-200 mm, such as 150 mm, may be rotated at a rotation speed of 2000-6000 rpm, such as 3000-4500 rpm.

Figure 2A:
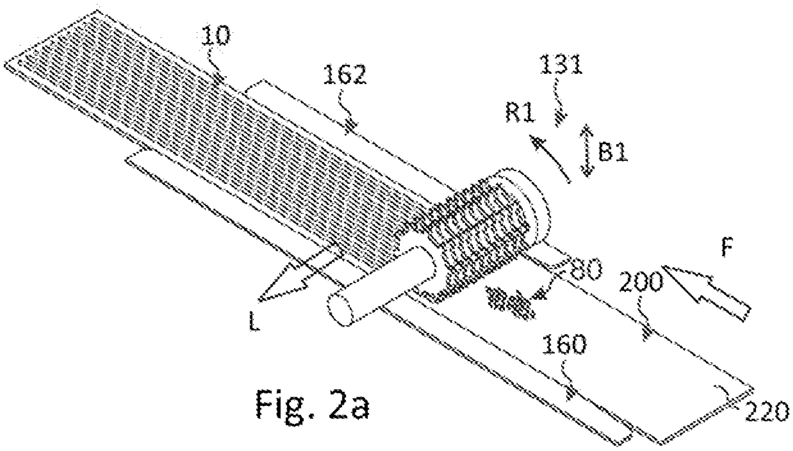
FIGS. 2*a*-2*g* illustrate in a perspective view, top views, a side view, and a cross-sectional top view embodiments of a system for forming grooves in a board element and embodiments of cutting elements.
Figure 2B:
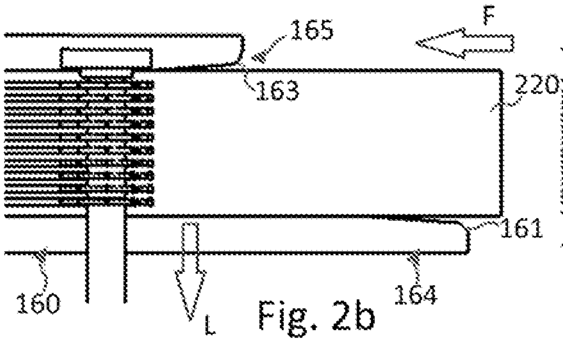
Figure 2C:
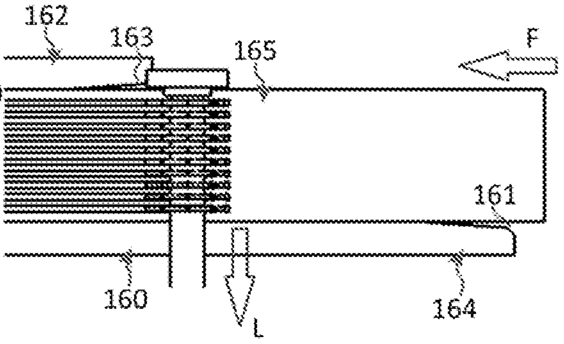
Figure 2D:
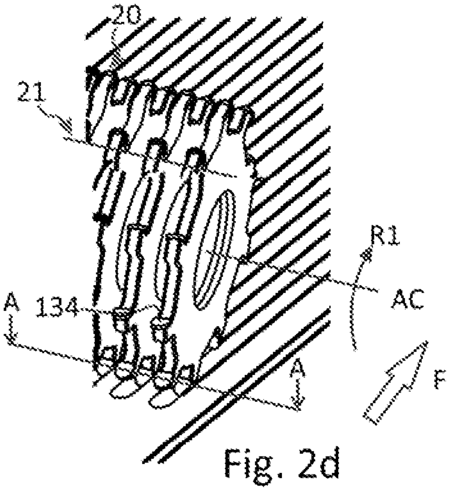
Figure 2E:
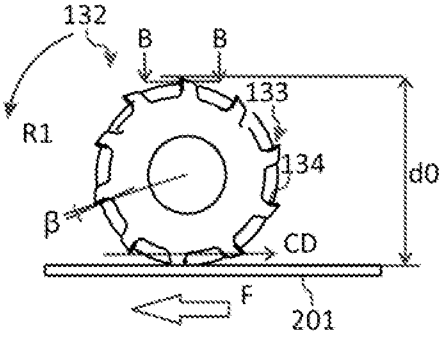
Figure 2F:
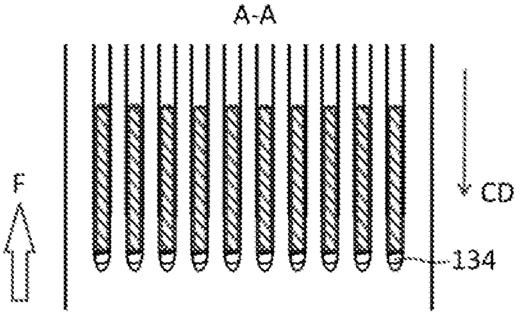

Generally, the rotating cutting device may operate in an up-cut direction R1 or a down-cut direction R2, but FIGS. 1 and 2*a*-2*g* illustrate the former operation. FIGS. 2*e*-2*f* illustrate a cutting direction CD which is parallel to the feeding direction F during operation of the system 100. Generally, in the up cut, the cutting direction CD and the feeding direction F of the board element may be opposite. Moreover, in the down cut, the cutting direction CD of the rotating cutting device and the feeding direction F of the board element may be the same.

The system 100 may further comprise an aligning element 160, preferably fixedly mounted in the frame member 110. Optionally, the aligning element may comprise a chamfer 161, preferably at a longitudinal end portion 164 thereof, for laterally aligning the board element 200, cf. FIGS. 2*b*-2*c*.

The system 100 may further comprise a blocking element 162, preferably fixedly mounted in the frame member 110. In operation, the board element may be provided between the aligning element 160 and the blocking element 162, such as during forming of the grooves 10. Optionally, the blocking element may comprise a chamfer 163, preferably at a longitudinal end portion 165 thereof, for laterally aligning and/or guiding the board element 200, cf. FIGS. 2*b*-*c*.

In some embodiments, a position, preferably a position in a lateral direction L, of the aligning element 160 and/or the blocking element 162 may be controlled, such as by the control unit 186.

The system 100 may further comprise an obstruction element 170, preferably fixedly mounted in the frame member 110. The obstruction element is configured to counteract, such as prevent, a displacement of the board element 200 away from the support member 120, such as in the vertical direction Z. At least a portion of the board element may be arranged between the obstruction element 170 and the support member 120, such as in the vertical direction Z, and preferably during forming of the grooves 10. A portion of the rotating cutting device 131 may be configured to be arranged through at least one slot 171 in the obstruction element 170, preferably during forming of the grooves 10.

FIGS. 2*a*-2*c* show in a perspective view and in top views an embodiment comprising an alignment element 160 and a blocking element 162, but without an obstruction element. The longitudinal end portion 164 of the aligning element preferably is provided upstream of the rotating cutting device 131 along the feeding direction F. The longitudinal end portion 165 of the blocking element 162 may be provided upstream or downstream of the rotating cutting device 131 as shown in FIGS. 2*b* and 2*c*, respectively.

As shown in a perspective view and a side view in FIGS. 2*d-e*, each tooth element 133 comprises a cutting surface 134. FIG. 2*f* illustrates a cross-sectional top view along the line A-A in FIG. 2*d*. As shown, a cutting surface 134, preferably all of them, may be inclined. Thereby, the board element may be driven in a lateral direction L, for example towards the aligning element 160, see FIGS. 2*a*-2*c*.

Figure 2G:
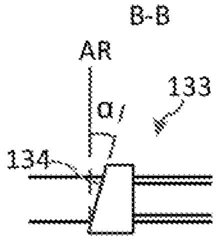

FIG. 2*g* illustrates a top view or a cross-sectional top view along the line B-B of a tooth element 133, wherein the cutting surface 134 is inclined by an axial angle $\alpha$. The axial angle may be an angle between the cutting surface 134 and an axis AR which is parallel to a rotational axis AC of the cutting element 132. The axial angle may be 1°-70°, preferably 1°-25°, more preferably 1°-10°.

Alternatively, or additionally, the cutting surface 134 may be inclined by a rake angle $\beta$, see FIG. 2*e*. The rake angle may be an angle between the cutting surface and a radial direction of the cutting element.

It is clear that in some embodiments, the cutting surface 134 of the tooth elements 133 is not inclined. For example, the axial angle and/or the rake angle may be zero.

Figure 3A:
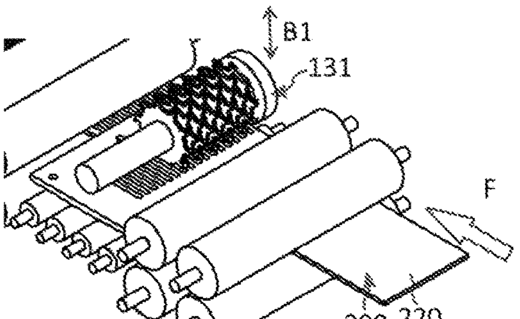
FIGS. 3*a*-3*h* illustrate in perspective views and a side view embodiments of a system for forming grooves in a board element and embodiments of cutting elements.
Figure 3B:
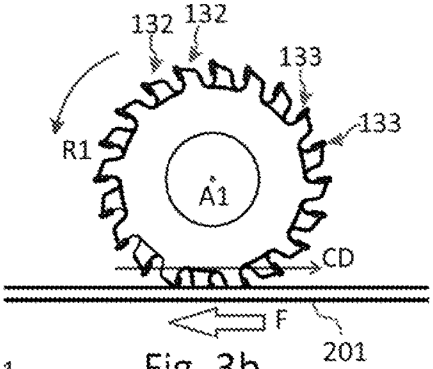
Figure 3C:
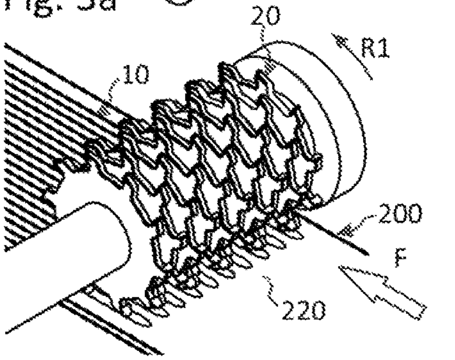
Figure 3D:
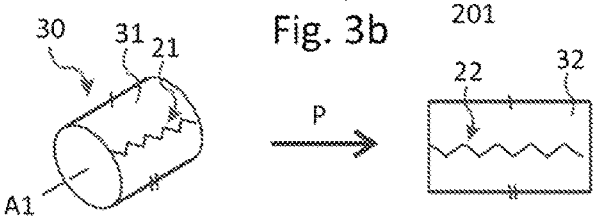
Figure 3E:
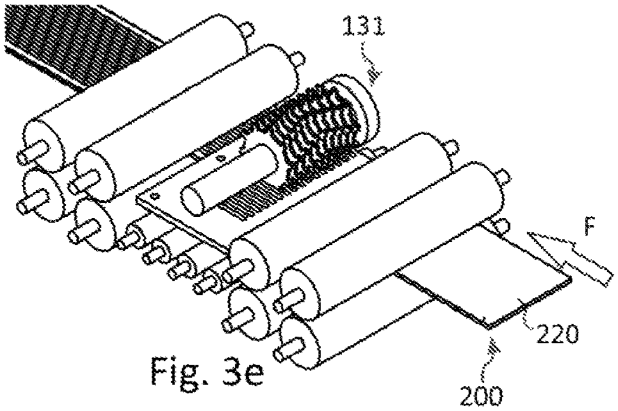
Figure 3F:
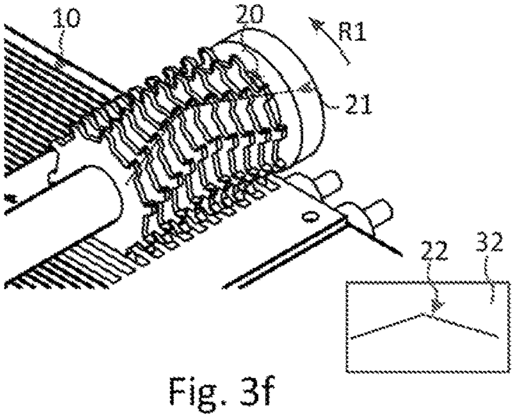
Figure 3G:
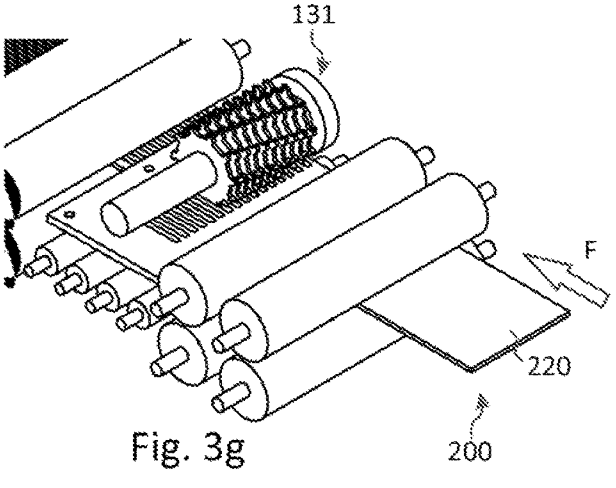
Figure 3H:
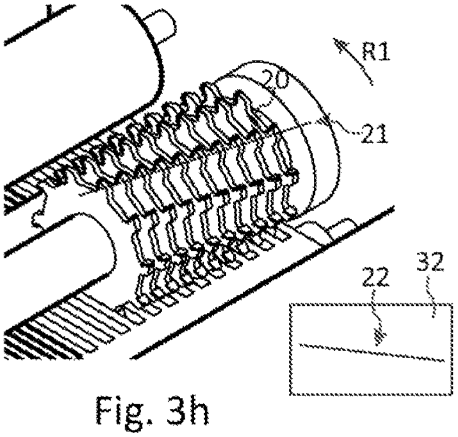

FIGS. 3*a*-3*c* illustrate in perspective views and a side view an embodiment similar to the embodiments in FIGS. 1 and 2*a*-2*g*. However, tooth elements of each pair of adjacent cutting elements are angularly offset with respect to each other around the rotational axis A1. More specifically, a plurality of tooth elements is provided in a plurality of sets 20 around the rotational axis A1, each set comprising a plurality of tooth elements. As shown in FIG. 3*d*, the plurality of tooth elements of each set 20 may be disposed along a joining curve 21. Preferably, the joining curve 21 is provided in a surface 31 of a cylinder 30 having the rotational axis A1 as a centre axis and, preferably, a radius given by a distance from the rotational axis A1 to an outer portion of the cutting elements, such as an outermost portion. When projected P from the cylindrical surface 31 onto a flat plane 32, the projected joining curve 22 may in this embodiment be a stepwise constant curve, such as a sawtooth wave or a triangle wave. For example, a portion of the cylindrical surface 31 may be cut along a direction which is parallel to the rotational axis A1, as indicated by the marked bold lines, and thereafter being straightened into a flat surface in the flat plane 32.

In some embodiments, and as shown in FIGS. 1 and 2*a*-2*g*, the tooth elements 133 may be angularly aligned along the rotational axis A1, thereby corresponding to a set 20 of tooth elements disposed along a straight joining line 21 as well as a straight projected joining line 22.

FIGS. 3*e*-3*f* and FIGS. 3*g*-3*h* illustrate perspective views of embodiments wherein the projected joining curve 22 is a stepwise constant curve comprising two straight lines and an inclined line, respectively.

Figure 4A:
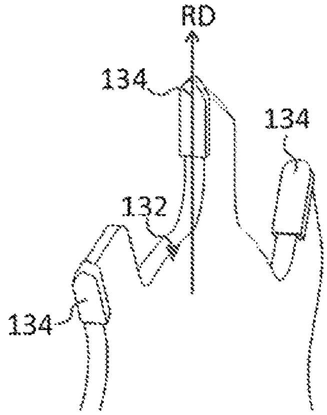
FIGS. 4*a*-4*e* illustrate in a perspective view and a front view embodiments of a cutting element and in perspective views and a side view embodiments of a system for forming grooves in a board element.
Figure 4B:
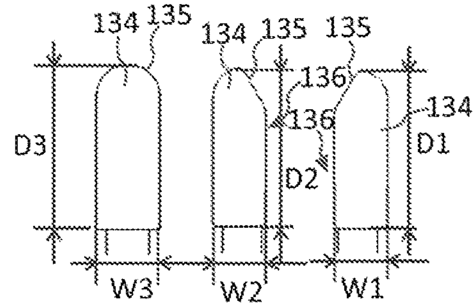

A shape and/or an inclination of the cutting surfaces 134 of a cutting element 132 or several cutting elements may be the same. In some embodiments, however, the shape and/or an inclination of the cutting surfaces may be different. FIGS. 4*a*-4*b* illustrate in a perspective view and a front view cutting surfaces having different shapes and inclinations. Any or each cutting surface may be configured to remove a different material shape and/or a different amount of material, for example by having a different width W and/or a different radial depth D. The width may be a length along the rotational axis AC and the radial depth may be a length along a radial direction RD of the cutting element 132. In the present embodiment, a first cutting surface 134 (right subfigure in FIG. 4*b*) has a first radial depth D1 and a first width W1, a second cutting surface 134 (middle subfigure) has a second radial depth D2 and a second width W2, and a third cutting surface 134 (left subfigure) has a third radial depth D3 and a third width W3. W3 may correspond to a final width of a groove and D3 may provide a final depth of the groove. The first and second widths may be smaller than the third width. Moreover, first and second radial depths may be smaller than the third radial depth. The first and second cutting surfaces may comprise a recess 136 on a respective one of their sides.

As shown in FIGS. 4*a*-4*b*, at least some of the top surfaces 135 of the cutting surfaces, such as the top bevel angles, may be different. For example, the top surfaces 135 of the first and second cutting surfaces may be oppositely inclined.

It is clear that the above embodiment is only exemplifying and that any other combination of at least one selected from the group of shapes, widths, radial depths, top surfaces and inclinations are equally conceivable.

Figure 4C:
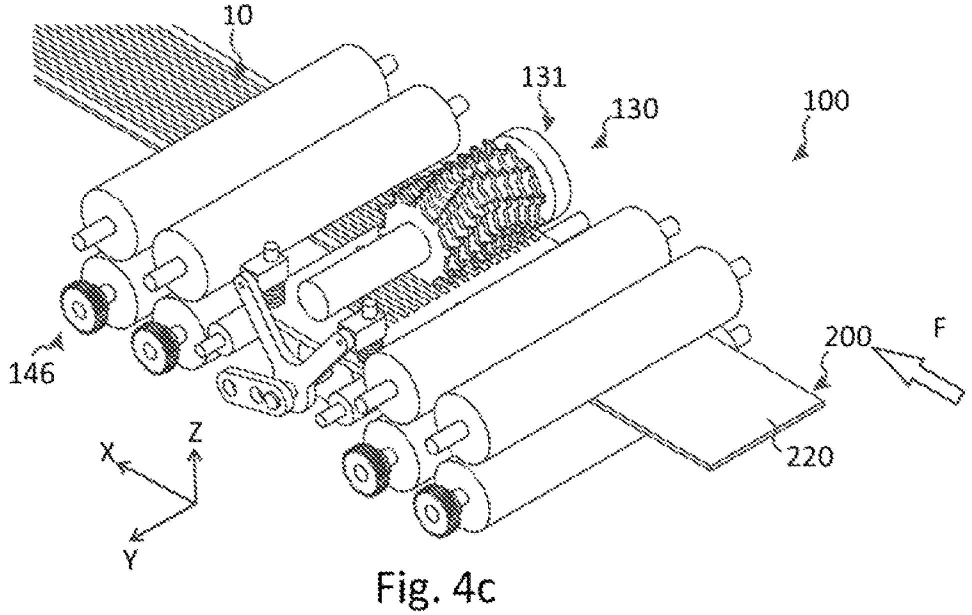
Figure 4D:
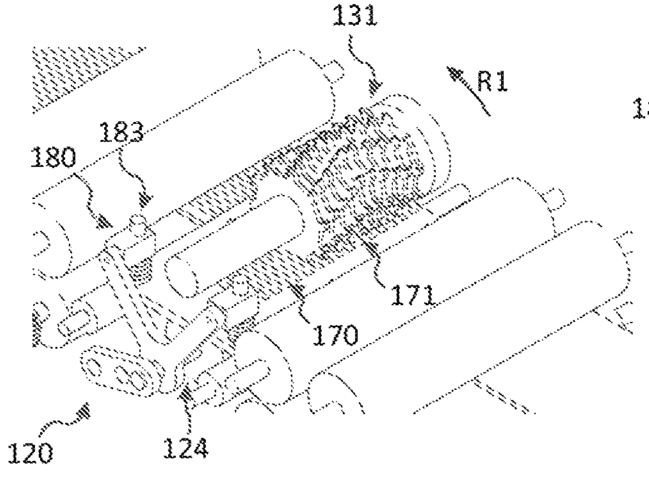
Figure 4E:
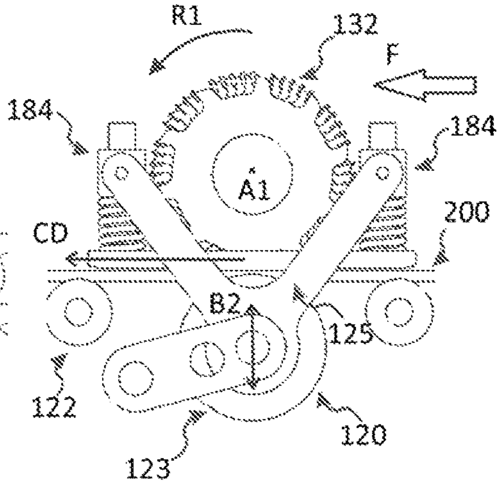

FIGS. 4*c*-4*e* illustrate in perspective views and a side view an embodiment in which the rotating cutting device 131 is fixedly mounted in the frame member 110. Thereby, the rotating cutting device may be fixed at least in the vertical direction Z. The support member 120 is displaceably mounted in the frame member, by being displaceable at least in the vertical direction Z with respect to the frame member 110 and/or the processing tool 130 between a first and a second position (see arrow B2). The support member may be a jumping support member. In non-limiting examples, the support member may be displaced by means of a device comprising a, preferably linear, actuator. For example, the actuator may comprise a ball screw, a ball bushing, a linear guiding system or a cam curve, any e.g., being pneumatically controlled or servo controlled.

Embodiments of the support member 120 may be similar to any embodiment described elsewhere in this disclosure, for example comprising at least one roller 122. Moreover, the support member may comprise a displaceable portion 123, such as in the form of a displaceable roller 124.

Hence, grooves 10 may be formed in a board element 200 arranged in contact with the support member 120 by displacing the support member with respect to the processing tool 130, e.g., a rotating cutting device 131. The displacement may be controlled by a control unit 186.

Other features and functionalities of the embodiment in FIGS. 4*c*-4*e* may be similar to the embodiments described elsewhere in this disclosure, e.g., in relation to FIGS. 1, 2*a*-2*g* and 3*a*-3*h*, whereby reference is made thereto.

FIGS. 5*a*-5*g*, 6*a*-6*g* and 7*a*-7*h* illustrate embodiments of a system 100 comprising a processing device 130 comprising first rotating cutting device 131*a* and a second rotating cutting device 131*b* located downstream of the first rotating cutting device in the feeding direction F. Thereby, the second rotating cutting device may operate after the first rotating cutting device.

It is emphasized that embodiments of any or each of the frame member 110, support member 120, components of the processing tool 130, transportation device 140, aligning element 160, blocking element 162 and obstruction element 170 may be the same as the embodiments described elsewhere in this disclosure, e.g. in relation to FIGS. 1, 2*a*-2*g*, 3*a*-3*h*, 4*a*-4*e*, 8*a*-8*f*, 9*a*-9*h*, 10*a*-10*e*, 16*a*-16*d* and 16*f*-16*g*.

For example, the first and/or second rotating cutting device (s) may be the same as any rotating cutting device in these embodiments.

The first and second rotating cutting devices 131*a*, 131*b* may comprise the same number of cutting elements 132*a*, 132*b*.

In the embodiments in FIGS. 5*a*-5*g*, the cutting elements of the first and second rotating cutting devices preferably are aligned. Thus, for each cutting element of the first rotating cutting device there may be a corresponding cutting element of the second rotating cutting device, whereby both cutting elements may contribute to forming the same groove 10.

Figure 6A:
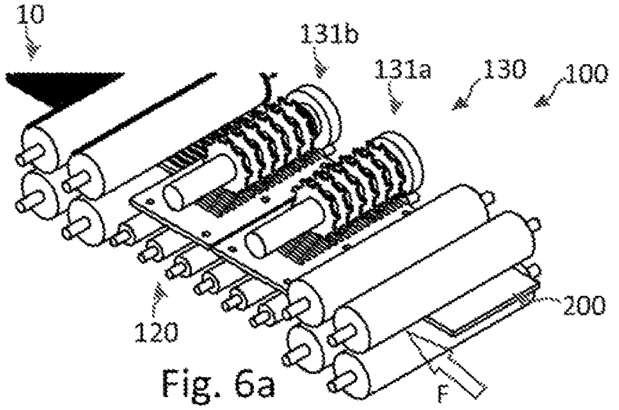
FIGS. 6*a*-6*g* illustrate in perspective views, top views and a side view embodiments of a system for forming grooves in a board element.
Figure 6B:
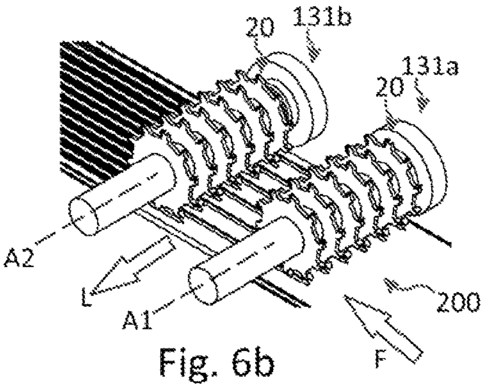
Figure 6C:
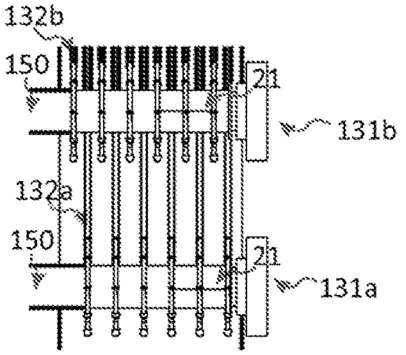
Figure 6D:
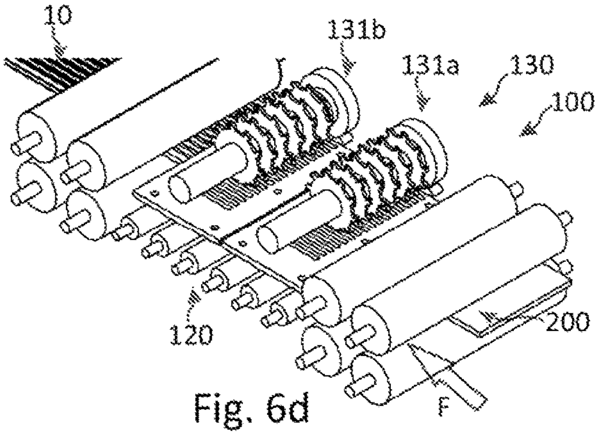
Figure 6E:
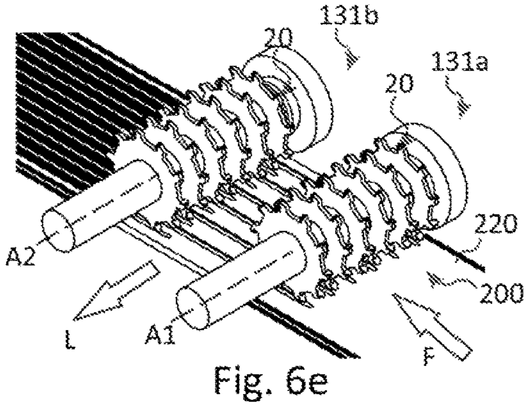
Figure 6F:
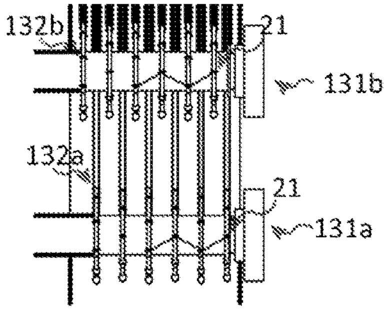
Figure 6G:
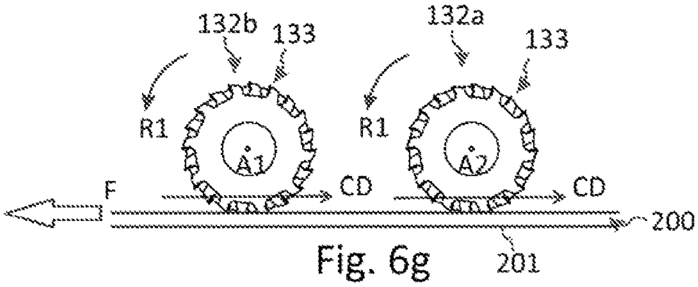
Figure 7A:
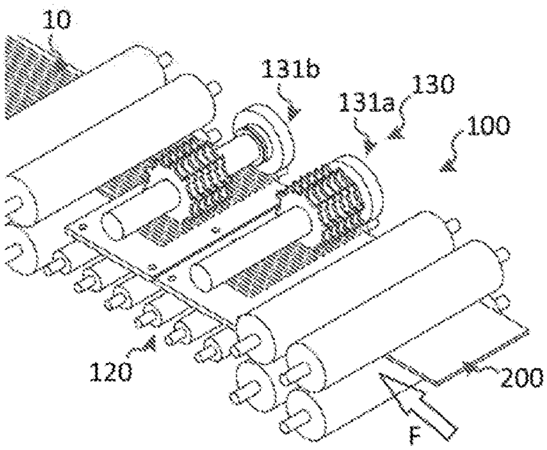
FIGS. 7*a*-7*h* illustrate in perspective views, a zoomed-in perspective view, a cross-sectional side view, front views and side views embodiments of a system for forming grooves in a board element, embodiments of forming such grooves, and embodiments of tooth elements.
Figure 7B:
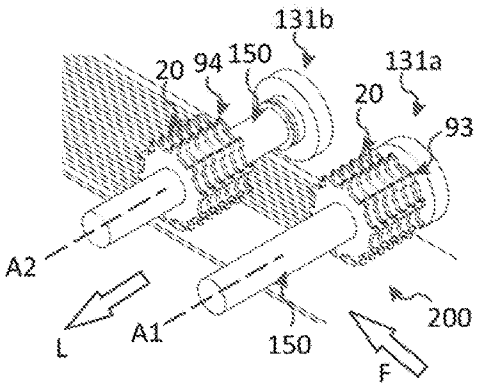

In the embodiments in FIGS. 6*a*-6*g* and 7*a*-7*b*, the cutting elements of the first and second rotating cutting devices preferably are laterally offset with respect to each other. In FIGS. 7*a*-7*b* the cutting elements of the first rotating cutting device preferably are completely laterally offset with respect to the cutting elements of the second rotating cutting device.

FIGS. 5*a*-5*b*, 6*a*-6*c* and 7*a*-7*b* show in perspective views and a top view a first and a second rotating cutting device 131*a*, 131*b*, each comprising sets 20 of tooth elements 133 that each are disposed along a straight joining line 21 and/or a straight projected joining line 22 as described in relation to e.g., FIGS. 1, 2*a*-2*g* and 3*g*-3*h*. A portion of such a joining curve 21 is shown in FIG. 6*c* for each of the first and second rotating cutting devices. For example, at least some, preferably all, the tooth elements may be angularly aligned along the respective rotational axis A1, A2.

FIGS. 5*c*-5*g* and 6*d*-6*g* show in perspective views, top views and side views a first and a second rotating cutting device 131*a*, 131*b*, wherein tooth elements of each pair of adjacent cutting elements 132*a*, 132*b* in each rotating cutting device are angularly offset with respect to each other around the respective rotational axis A1, A2. The tooth elements are provided in a plurality of sets 20 around the respective rotational axis A1, A2.

Figure 5A:
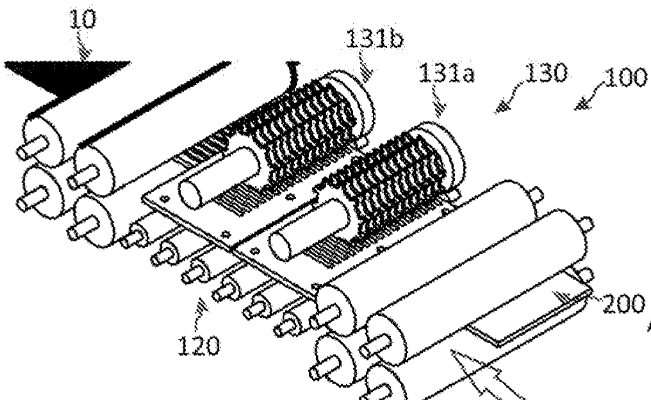
FIGS. 5*a*-5*g* illustrate in perspective views, top views and a side view embodiments of a system for forming grooves in a board element.
Figure 5B:
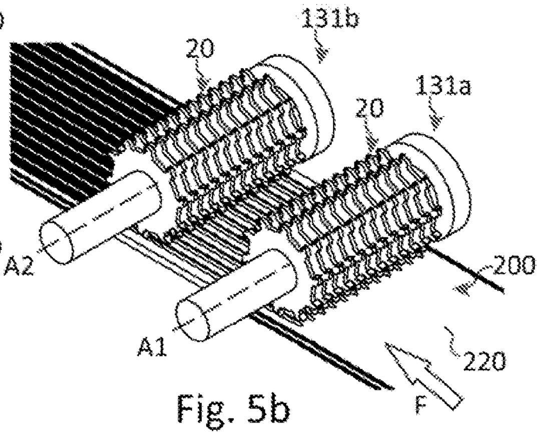
Figure 5C:
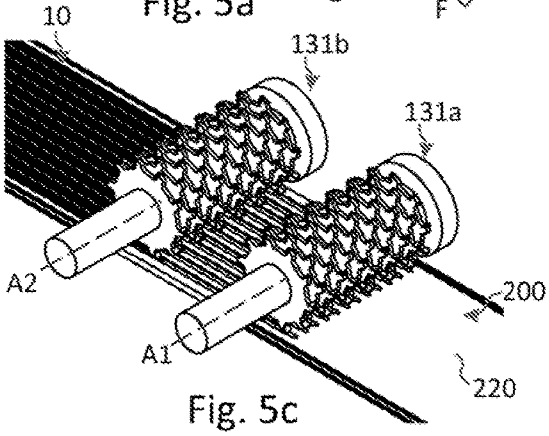
Figure 5D:
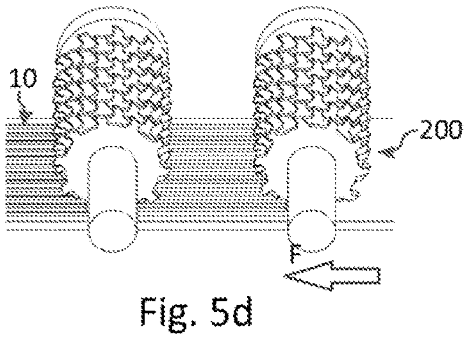
Figure 5E:
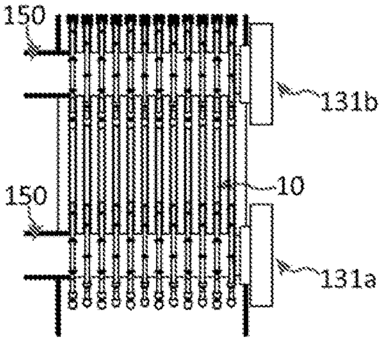
Figure 5F:
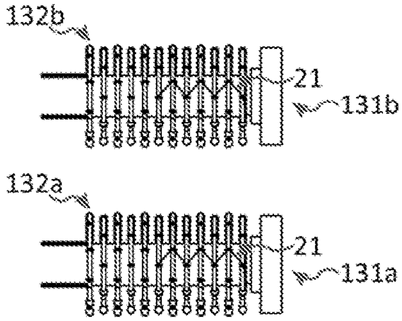

A projected joining curve 22 of each set may be a stepwise constant curve, such as a sawtooth wave or a triangle wave as described in relation to e.g., FIGS. 3*a*-3*f*. A portion of a corresponding joining curve 21 is shown in FIG. 5*f* and FIG. 6*f* for each of the first and second rotating cutting devices.

Figure 5G:
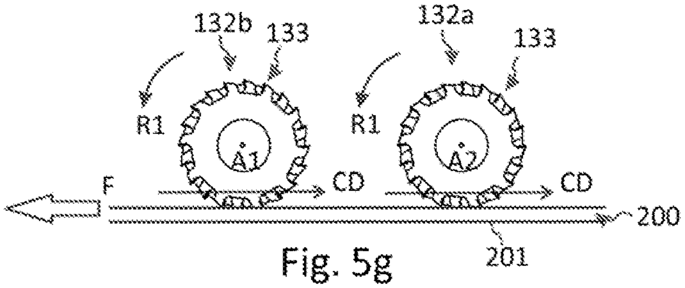
Figure 7C:
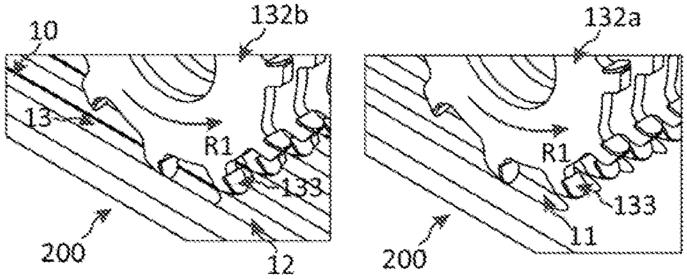
Figure 7D:
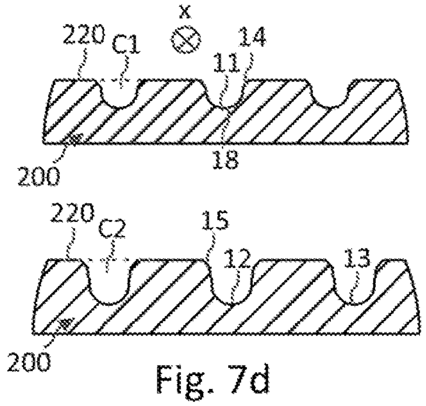
Figure 7E:
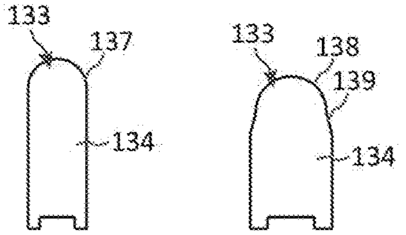
Figure 7F:
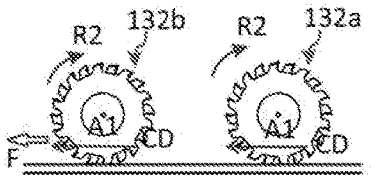
Figure 7G:
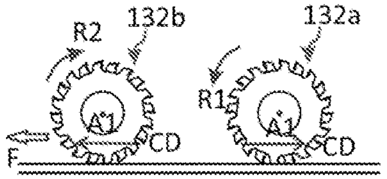
Figure 7H:
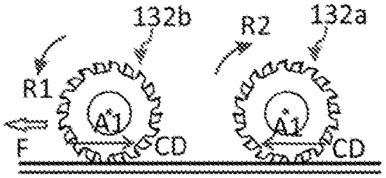

In any of the embodiments herein, the first and second rotating cutting devices 131*a*, 131*b* may both be configured to operate in the same direction, such as in an up-cut direction R1 as shown in e.g., FIGS. 5*g* and 6*g* or in an down-cut direction R2 as shown in the embodiment in FIG. 7*f*.

Furthermore, in any of the embodiments herein, the first and second rotating cutting devices 131*a*, 131*b* may be configured to operate in opposite directions. As shown in the embodiment in FIG. 7*g*, the first rotating cutting device 131*a* may be configured to operate in an up-cut direction R1 and the second rotating cutting device 131*b* may be configured to operate in a down-cut direction. Moreover, as shown in the embodiment in FIG. 7*h*, the first rotating cutting device 131*a* may be configured to operate in a down-cut direction R2 and the second rotating cutting device 131*b* may be configured to operate in an up-cut direction R1.

FIGS. 7*c*-7*e* illustrate in embodiments a zoomed-in perspective view of the system 100 in operation and a board element 200, a cross-sectional side view of the board element, and front views of tooth elements 133. The forming of the grooves 10 may be implemented e.g., by the system 100 in FIGS. 5*a*-5*g* and may correspond to the steps S13 and S15 in the method S10 described below, cf. FIG. 11.

A first cutting element 132*a* of a first rotating cutting device 131*a* may form a first groove profile 11, and, thereafter, a second cutting element 132*b* of a second rotating cutting device 131*b* may form a second groove profile 12. The second groove profile 12 has a larger cross-sectional area C2 than a cross-sectional area C1 of the first groove profile 11. The cross-sectional area may be an area defined by the rear side 220 of the board element and the respective groove profile 11, 12, such as at a specific longitudinal position of the groove which is to be formed. The first 11 and second 12 groove profiles extend along a longitudinal portion of the groove to be formed, which here is parallel to the first horizontal direction x.

The first 11 and second 12 groove profiles may have different shapes. For example, the width and/or the depth of the groove profiles 11, 12 may be different. As illustrated in the cross-sectional side view in FIG. 7*d*, the first and/or second groove profile(s) may comprise one bevel or two bevels 14, 15, each preferably being disposed between a respective groove wall 18 and the rear side 220. Each or any bevel 14, 15 may correspond to a bevel of a final groove profile 13 of a groove 10.

The second groove profile 12 may correspond to a final groove profile 13 of a groove 10. Alternatively, however, there may be additional removal of material before forming the final groove profile 13.

As shown in FIG. 7*e*, a shape of each of the first 11 and second 12 groove profiles may correspond to a shape 137, 138 of a corresponding tooth element 133. For example, a cutting surface 134 of a tooth element may comprise one tooth bevel 139 or two tooth bevels.

In some embodiments (not shown), the processing device 130 may comprise a plurality of rotating cutting devices 131. Each rotating cutting device, such as a third and, optionally a fourth, rotating cutting device consecutively arranged along the feeding direction F may be laterally aligned or offset with respect to the first and/or the second rotating cutting device(s).

Figure 8A:
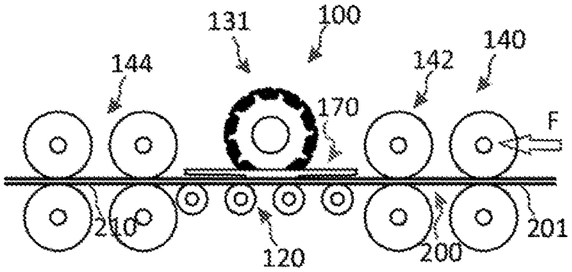
FIGS. 8*a*-8*f* illustrate side views of embodiments of a system for forming grooves in a board element.
Figure 8B:
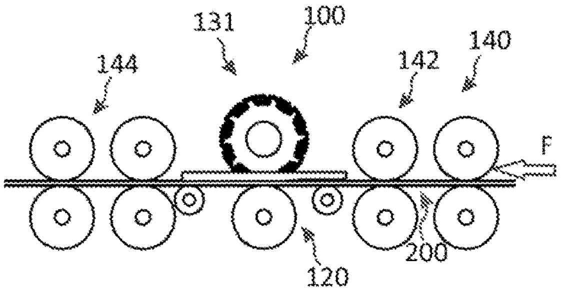
Figure 8C:
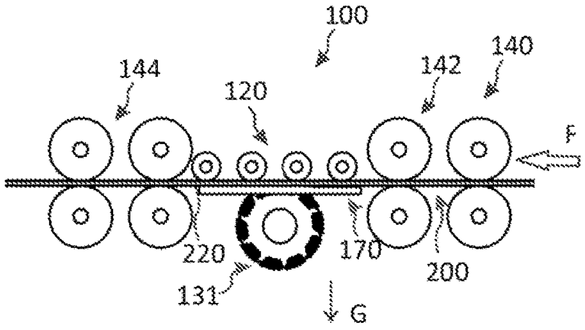
Figure 8D:
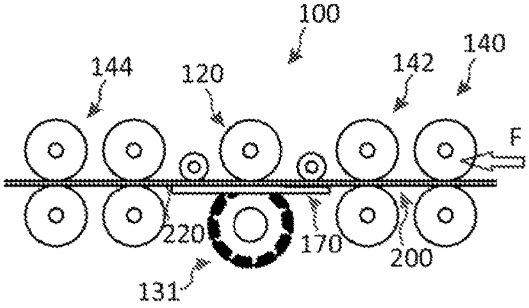
Figure 8E:
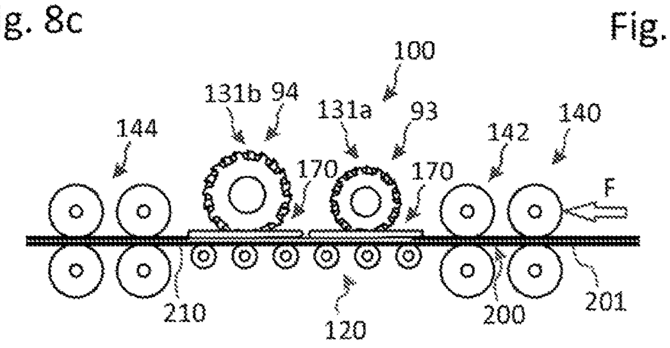
Figure 8F:
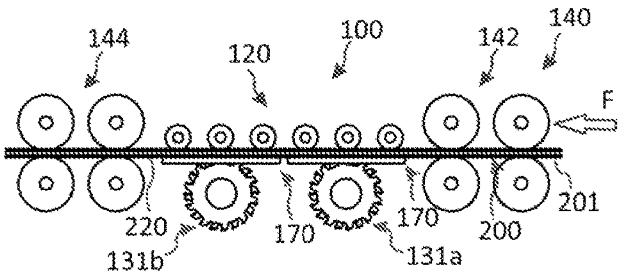

FIGS. 8*a*-8*f* illustrate side views of embodiments of a system 100 in operation. In FIGS. 8*a*-8*b* and 8*e*, a front side 210 and a rear side 220 of the board element 200 are configured to face downwards and upwards, respectively, during forming of the at least one groove 10. Moreover, the rotating cutting device(s) 131 and the support member 120 are configured to be provided at least partially above and below the board element, respectively, in operation. In FIGS. 8*c*-8*d* and 8*f*, a front side 210 and a rear side 220 of the board element 200 are configured to face upwards and downwards, respectively, during forming of the at least one groove 10. Moreover, the rotating cutting device(s) 131 and the support member 120 are configured to be provided at least partially below and above the board element, respectively, in operation. An advantage of having such a system is that the removed material may be driven downwards by gravity G. Reference is made to other parts of this disclosure, such as in relation to FIGS. 1 and 2*a*-2*g*, regarding embodiments of any, some or all of the transportation device 140, the alignment element 160, and the blocking element 162. For example, the transportation device may comprise a first 142 and/or a second 144 roller arrangement, and optionally parts of the support member, such as the at least one roller 122.

Embodiments of any or each rotating cutting device 131, 131*a*, 131*b*, support member 120, and obstruction element 170 in FIGS. 8*a*, 8*c*, 8*e* and 8*f* may be similar to any of the embodiments in FIGS. 1, 2*a*-2*g*, 3*a*-3*h*, 5*a*-5*g*, 6*a*-6*g*, 9*a*-9*h*, 10*a*-10*e*, 16*a*-16*d*, 16*f*-16*g* and 18*f*, whereby reference is made to those parts of the disclosure. Moreover, embodiments of the rotating cutting device 131, support member

120, and obstruction element 170 in FIGS. 8*b* and 8*d* may be similar to the embodiment in FIGS. 4*c*-4*e*, whereby reference is thereto. It is noted that the displacements of the rotating cutting device(s) 131 and/or the support member 120 in FIGS. 8*c*, 8*d* and 8*f* may be reversed, since their positioning with respect to the board element is reversed as described above.

In FIGS. 8*a*, 8*c* and 8*e*-8*f*, the support member 120 and the rotating cutting device(s) 131 may be fixedly mounted and displaceably mounted in the frame member 110, respectively. Moreover, in FIGS. 8*b* and 8*d*, the support member 120 and the rotating cutting device 131 may be displaceably mounted and fixedly mounted in the frame member 110, respectively. In some embodiments, however, any, some or each of the rotating cutting device(s) 131 and the associated support member 120 in FIGS. 8*a*-8*f* may be displaceably mounted, each thereby preferably being displaceable at least in the vertical direction Z, such as downwards and/or upwards, with respect to the frame member 110. Clearly, any of the embodiments in FIGS. 8*a*-8*f* are conceivable for at least two support members and at least two rotating cutting devices.

Figure 9A:
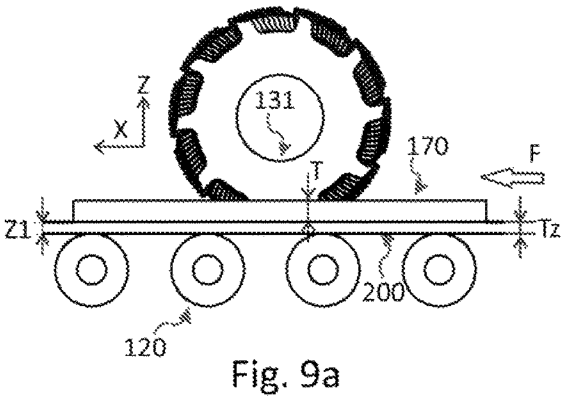
FIGS. 9*a*-9*h* illustrate side views of embodiments of an obstruction element.

As shown in the side view in the embodiment in FIG. 9*a*, the obstruction element 170 may have a constant profile, such as a constant thickness T, preferably along the longitudinal direction X. The thickness T may be a thickness along the vertical direction Z. However, as shown in side views in the embodiments in FIGS. 9*b*-9*h*, the obstruction element 170 in any of the embodiments of the present disclosure may have a varying profile, such as a varying thickness T, along the longitudinal direction X. At least a portion of a surface 179 of the obstruction element configured to face the board element 200 in operation may have a varying profile. The obstruction element may comprise a first segment 172 and a second segment 173 extending along the longitudinal direction X.

The obstruction element 170 comprises a slot portion 17 comprising at least one slot 171, cf. FIG. 1, showing closed slots. In any of the embodiments in FIGS. 9*a*-9*g*, at least a portion of the slot portion 17 may have a constant profile, such as a constant thickness, along the longitudinal direction X.

Figure 9B:
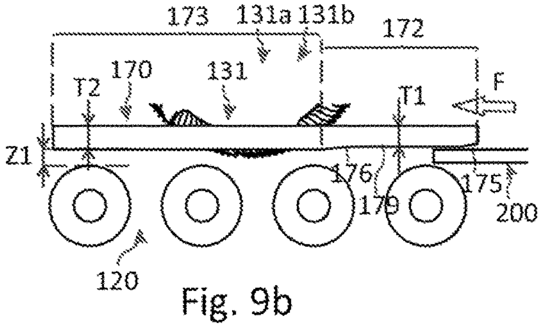
Figure 9C:
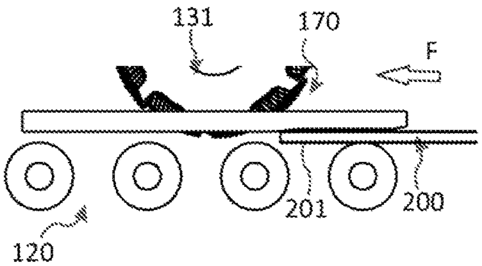
Figure 9D:
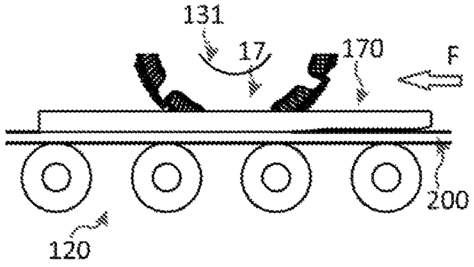

FIGS. 9*b*-9*d* show how a board element 200 may be fed into the system 100 in the feeding direction F and may be guided and/or aligned between the obstruction element 170 and the support member 120. Generally, and as shown in FIG. 9*b*, the rotating cutting device 131 may be a first 131*a* or a second 131*b* rotating cutting device. In FIGS. 9*b*-9*d*, the second segment 173 is provided downstream of the first segment 172 in operation. The first segment has a varying profile, such as a varying thickness T1, and the second segment has a constant profile, such as a constant thickness T2. The first segment comprises a first chamfer 175 and, optionally, a second chamfer 176 along the longitudinal direction X.

Figure 9E:
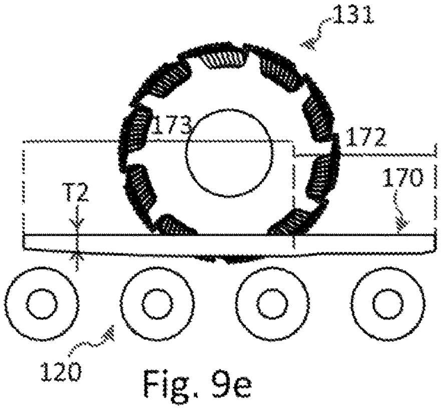
Figure 9F:
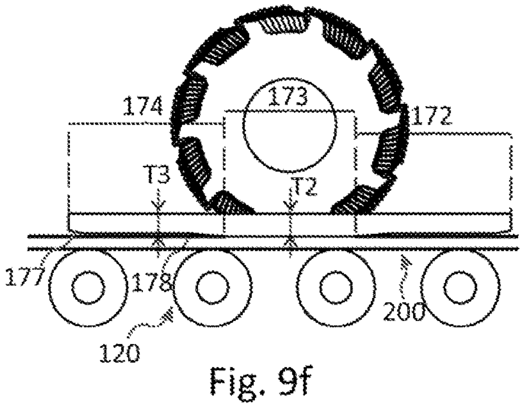

The first segment 172 of the embodiments in FIGS. 9*e*-9*f* may be similar to the first segment 172 in FIGS. 9*b*-9*d*, whereby reference is made to the above. In FIG. 9*e*, the second segment 173 has a varying profile, such as a varying thickness T2. The profile may descend or the thickness T2 may decrease, preferably continuously decrease, in a direction towards a longitudinal end of the obstruction member 170, such as in the feeding direction F. In FIG. 9*f*, the second segment 173 is provided between the first segment 172 and a third segment 174 provided downstream of the second segment in operation. The second segment 173 has a constant profile, such as a constant thickness T2, and the third segment 174 has a varying profile, such as a varying thickness T3. The third segment may comprise a first chamfer 177 and, optionally, a second chamfer 178 along the longitudinal direction.

Figure 9G:
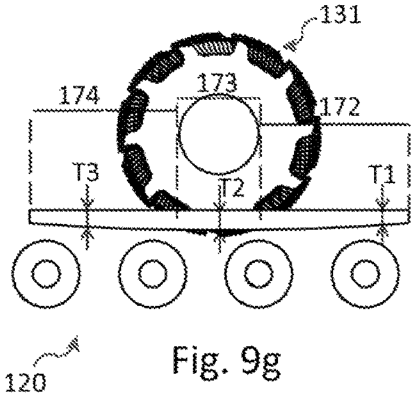
Figure 9H:
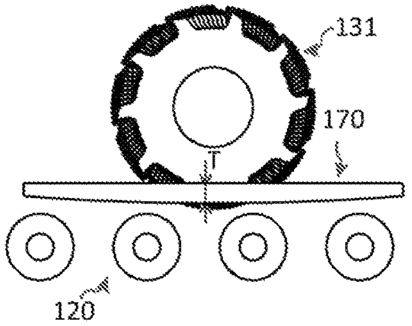

In FIG. 9*g*, the first 172 and third 174 segments have varying profiles, such as a varying thickness T1 and T3, respectively. The second segment 173 may have a constant profile, such as a constant thickness T2. Any or each of the profiles may descend or the thickness T1 and/or T3 may decrease, preferably continuously, in a direction towards each longitudinal end of the obstruction member 170. In FIG. 9*h*, the profile or thickness T may vary continuously. The profile may descend, or the thickness T may decrease, preferably continuously, in a direction towards each longitudinal end of the obstruction member 170.

At least a portion of any, some or each of the chamfers 175, 176, 177 or 178 may be planar.

The obstruction element 170 may comprise a slot portion 17 comprising at least one open slot 171. The perspective view in FIG. 16*d* illustrates in an embodiment such an obstruction element comprising one open slot 171 which is open towards one lateral side of the obstruction element, here being parallel with the Y direction. Other features and characteristics of the obstruction element comprising open slots may be similar to those of the obstruction element comprising closed slots, whereby reference is made to the discussion above. For example, the obstruction element may comprise a first chamfer 175 and/or a second chamfer 178 on at least one side.

In some embodiments, and as shown e.g., in FIGS. 9*a*-9*b*, a distance Z1, such as a minimum distance, between the support member 120 and the obstruction element 170 may correspond or substantially correspond to a thickness Tz, such as a maximal thickness, of the board element 200 along the vertical direction z.

Figure 10A:
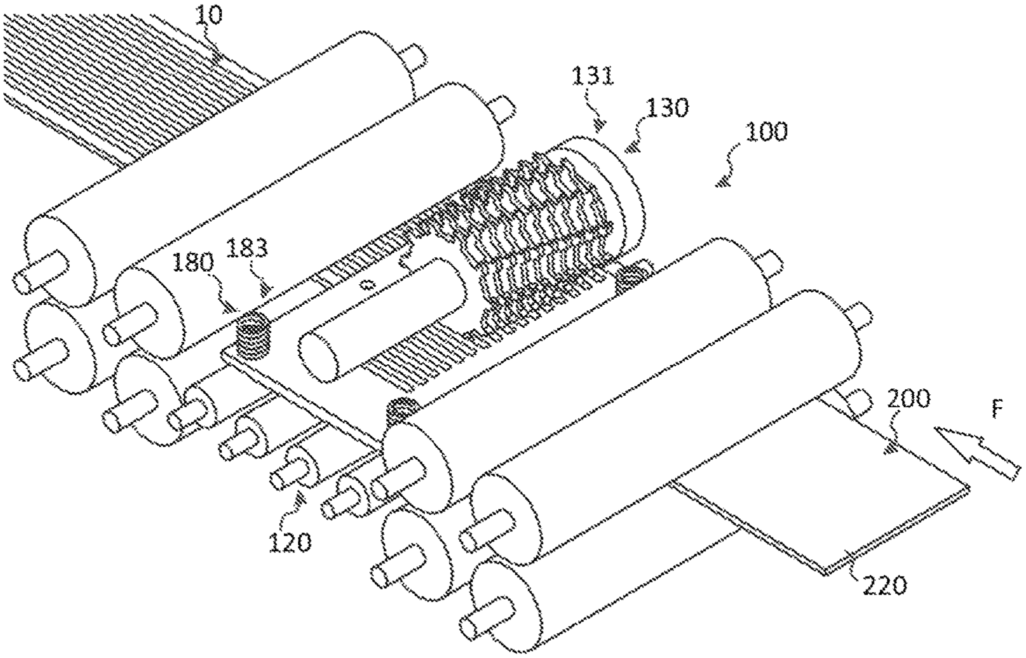
FIGS. 10*a*-10*e* illustrate in a perspective view and side views embodiments of a system for forming grooves in a board element comprising a pressure member, such as a resilient member, and in a front view and a cross-sectional perspective view embodiments of a material collecting device.
Figure 10B:
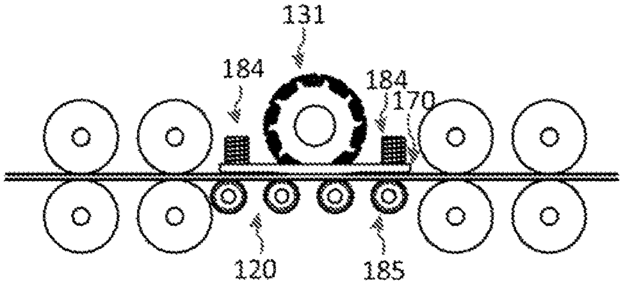
Figure 10C:
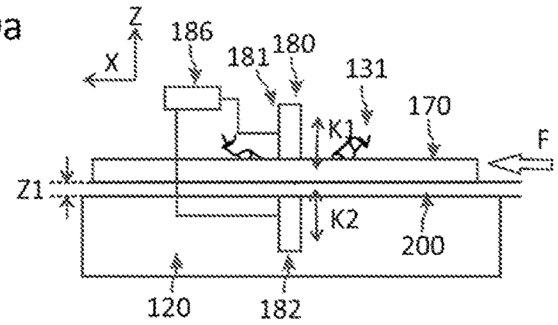

FIG. 10*c* schematically illustrates in a side view an embodiment wherein the support member 120 is a displaceable conveyor belt or a stationary plate. The conveyor belt and/or the transportation device 140 may displace the board element 200 in the feeding direction F, preferably being parallel to the longitudinal direction X. The obstruction element and the support member may be connected to the frame 110 and may be displaceable independently of each other.

In any of the embodiments of this disclosure, at least a portion of the surface 179 of the obstruction element 170 and/or a surface of the support member 120 configured to face the board element 200 may comprise a friction-reducing material or mechanism, such as a coating, for example comprising a lubricant or a physical vapour deposition (PVD) coating. Moreover, a friction-reducing mechanism may comprise the provision of an air cushion, such as between the support member 120 and the board element. This may be useful when the support member is a displaceable conveyor belt or a stationary plate. In some embodiments, the friction-reducing mechanism may comprise wheels, rollers, or balls, which may be provided on the obstruction element and/or the support member.

Generally herein, the obstruction element may comprise a pressure member 180 configured to exert pressure on the board element 200. Thereby, a distance, such a vertical distance Z1, between the obstruction element 170 and the support member 120 may be adjusted. The pressure member may comprise at least portions of the obstruction element 170 and/or at least portions of the support member 120.

The pressure member 180 may be controlled by a control unit 186. In a first example, a pressure exerted by the pressure member may be dependent on a thickness Tz along the vertical direction z, such as a maximal thickness, of a portion of the board element 200. In a second example, the exerted pressure may be determined by a predetermined pressure cycle, such as a constant predetermined pressure. In a third example, the exerted pressure may be determined by a predetermined force cycle, such as a constant predetermined force. In operation, said portion of the board element may be a portion along the longitudinal direction X and/or the feeding direction F.

For example, during operation of the pressure member, the distance Z1, such as the minimum distance, between the support member 120 and the obstruction element 170 may be smaller than the thickness Tz along the vertical direction z, such as the maximal thickness, of a portion of the board element 200.

FIG. 10*c* illustrates an embodiment wherein the pressure member 180 comprises actuator elements 181, 182 configured to displace the obstruction element 170 and/or the support member 120, such as in the vertical direction Z, as indicated by the arrows K1, K2. Thereby, the distance Z1 may be adjusted. In non-limiting examples, the actuator elements 181, 182 may be pneumatically controlled or servo controlled.

As shown in the embodiments in FIGS. 4*c*-4*e* and in an embodiment shown in a perspective view and a side view in FIGS. 10*a*-10*b*, the pressure member 180 may comprise a resilient member 183 configured to provide a pretensioned engagement against the board element. The resilient member may comprise the obstruction element and/or the support member. In non-limiting examples, the resilient member 183 may comprise at least one spring element 184, such as comprising a mechanical spring, a pneumatic element, an elastic material or a magnet.

In FIGS. 4*c*-4*e*, the resilient member 183 may be configured to pretension the obstruction element 170 towards the board element 200. As shown, the resilient member may be connected to the support member 120, e.g., by at least one linking arm 125. Thereby, the obstruction element may be displaced with respect to the support member. In some embodiments, the obstruction element may be connected to other parts of the system 100, such as the frame 110, optionally while being unconnected to the support member and being independently displaceable with respect thereto.

Alternatively, or additionally, the resilient member 183 may be configured to pretension the support member 120 towards the board element 200.

The resilient member 183 may comprise at least one resilient covering 185, for example comprising a rubber material, as illustrated in FIG. 10*b*, but is equally conceivable in FIGS. 4*c*-4*e*. In embodiments wherein the support member 120 comprises at least one roller 122, and optionally when the transportation device 140 comprises a first 142 and/or a second 144 roller arrangement, any, some or each of these rollers 122, 141, 143 may comprise the resilient covering 185, for example comprising a rubber wheel covering.

Figure 16A:
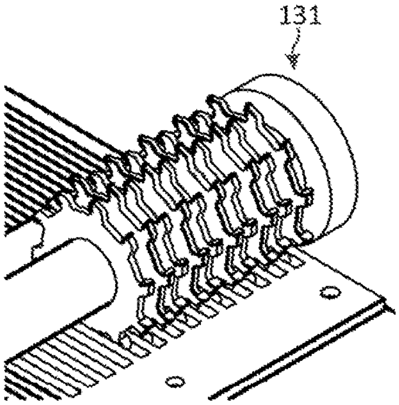
FIGS. 16*a*-16*d* illustrate in a perspective view, a top view, a zoomed-in perspective view embodiments of a system for forming grooves in a board element and in a perspective view an embodiment of an obstruction element.
Figure 16B:
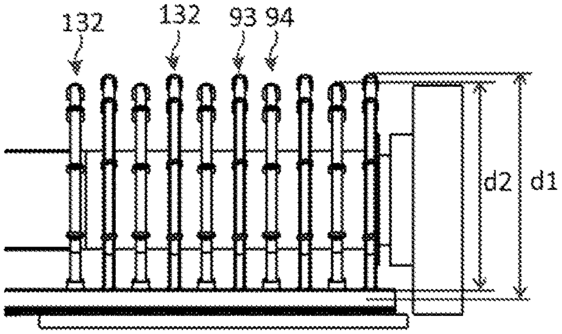
Figure 16C:
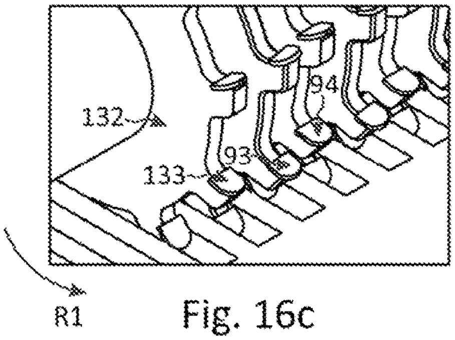
Figure 16D:
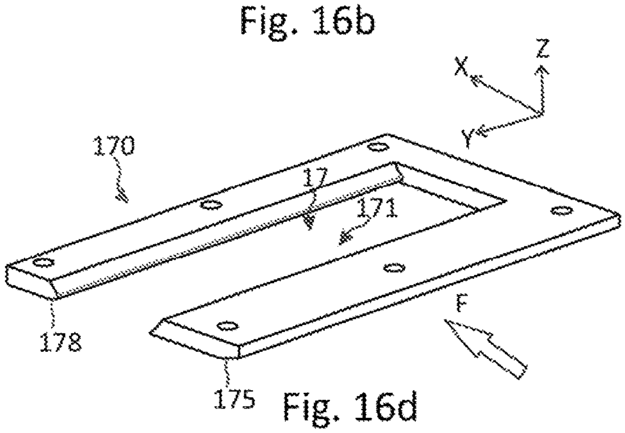
Figure 16E:
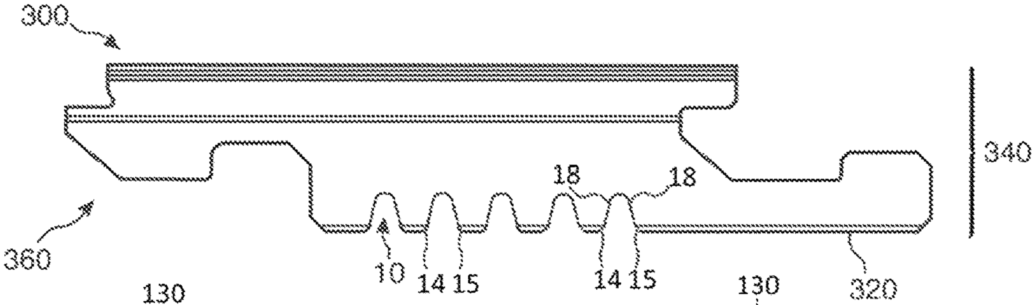
FIG. 16*e* illustrates a cross-sectional side view of an embodiment of a panel.
Figure 16F:
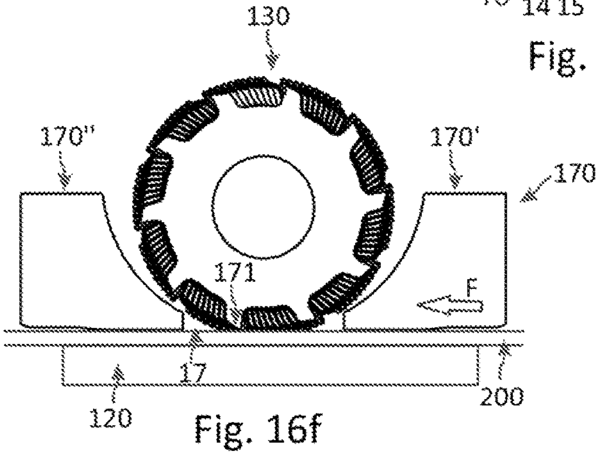
FIGS. 16*f*-16*g* illustrate embodiments of an obstruction element in side views.
Figure 16G:
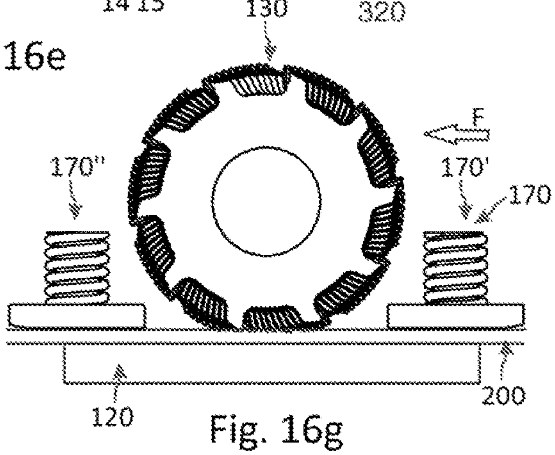

FIGS. 16*f*-16*g* illustrate embodiments wherein the obstruction element 170 comprises a first unit 170' and a second unit 170" situated before and after the processing tool 130 along the feeding direction F, respectively. The slot portion 17 may thereby comprise a single slot 171 formed by the space between the units 170', 170". Other characteristics of the obstruction element may be the same as those described elsewhere herein. For example, the obstruction element may comprise a pressure member 180, a constant or varying profile, or it may comprise at least one chamfer 175, 176, 177, 178. Moreover, the first and second unit(s) may be separately displaceable w.r.t. the support member 120.

Figure 10D:
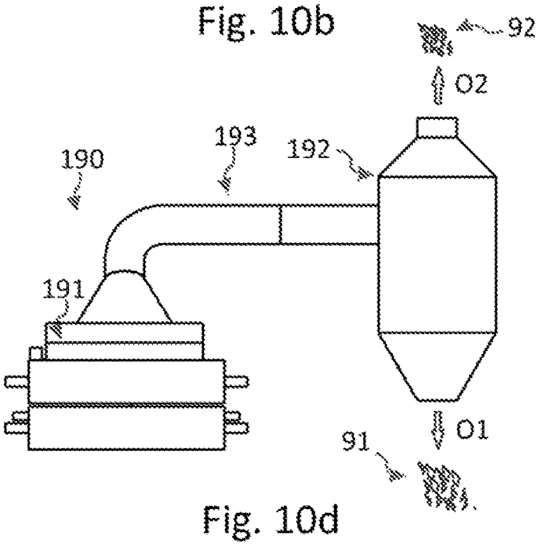
Figure 10E:
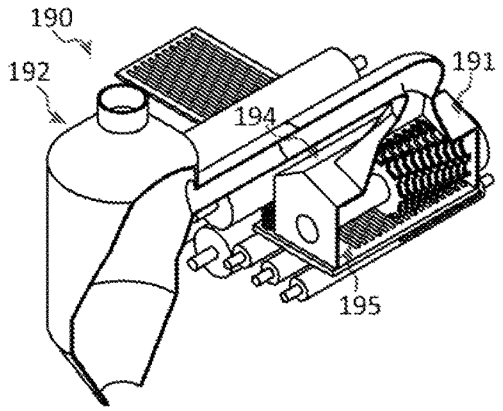

The system 100 may further comprise a material collecting device 190, such as a suction device and/or a blowing device, for collecting the removed material. FIGS. 10*d*-10*e* illustrate a front view and a cross-sectional perspective view of an embodiment in which the material collecting device 190 comprises an enclosure element 191 at least partially enclosing the rotating cutting device 131. The system further comprises a material separating device 192 connected to the enclosure element 191 by a communication member 193, such as at least one pipe. The material separating device 192 may comprise a cyclone. Moreover, the material separating device may comprise at least one material outlet O1, O2 for the separated material.

Preferably, the enclosure element 191 comprises at least one orifice 195. The orifices may be air inlets and/or air outlets. In this embodiment, the enclosure element comprises a housing 194 and the obstruction element 170, and the orifices 195 correspond to the slots 171 of the obstruction element. It is clear, however, that other types of enclosure elements are equally conceivable.

Figure 11:
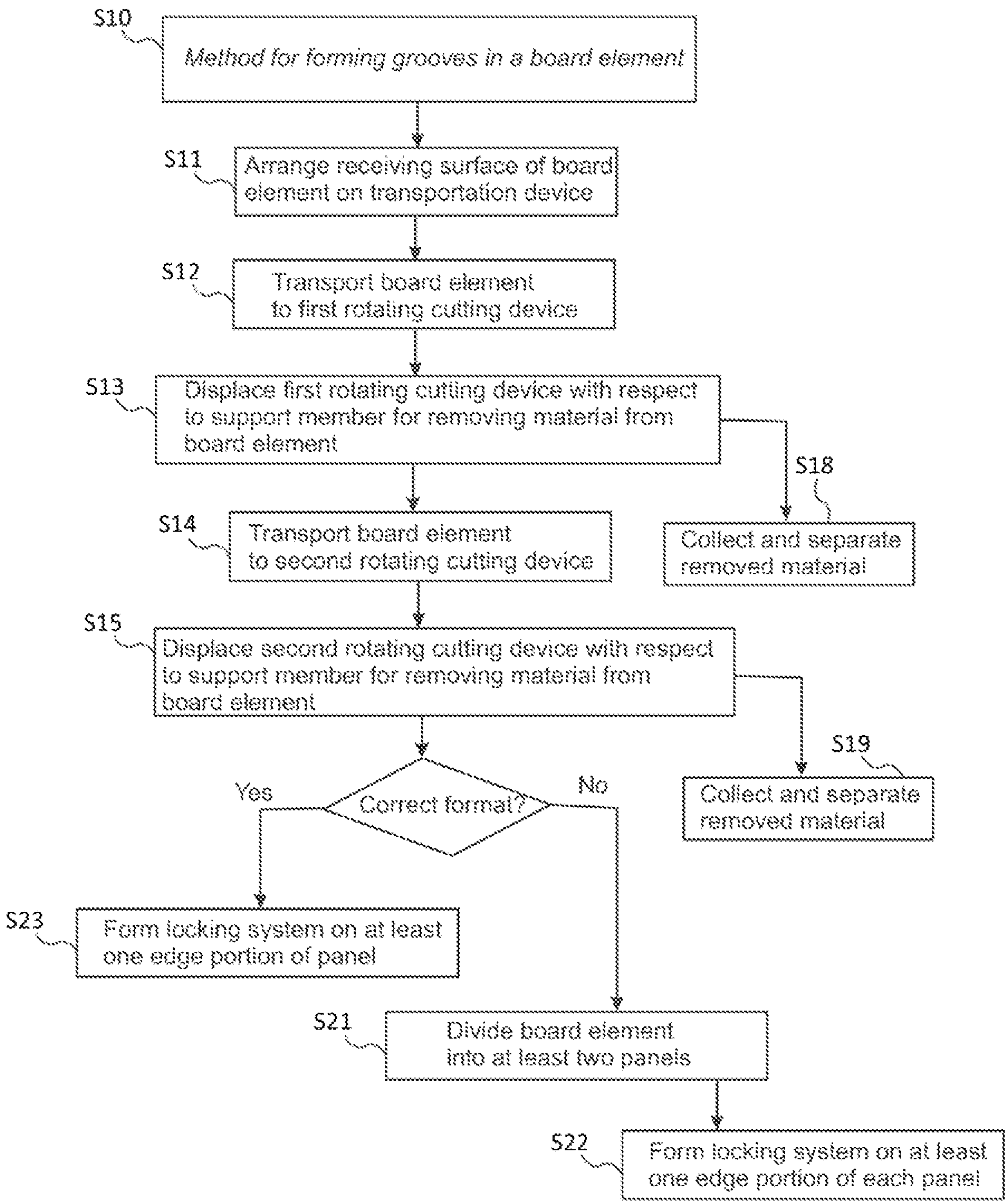
FIG. 11 is a flow chart illustrating a method for forming grooves in a board element according to an embodiment.

Next, an embodiment of a method for forming grooves in a board element 200 (Box S10) will be described with reference to the flow chart in FIG. 11. The method may be implemented in the system 100, such as in any of the embodiments in FIGS. 5*a*-5*g*, 6*a*-6*g*, 7*a*-7*h* and 8*e*-8*f*.

Figure 13A:
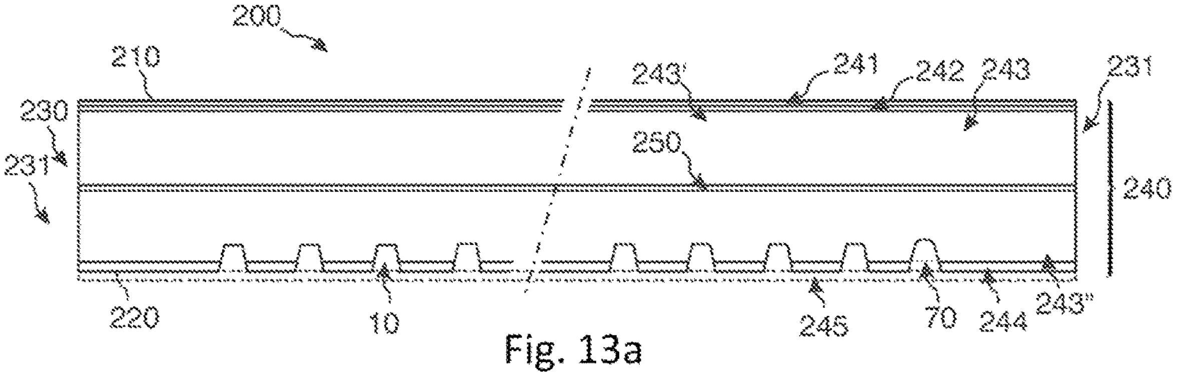
FIGS. 13*a*-13*d* illustrate in cross-sectional side views embodiments of a board element and a panel.

As illustrated in a cross-sectional side view in an embodiment in FIG. 13*a*, the board element comprises a layer structure 240 comprising at least one layer 241, 242, 243, 244, each layer preferably comprising a thermoplastic material and, optionally, a filler. One layer may be a core layer 243 and other layers may be a decorative layer 242 and/or a wear layer 241. Optionally, the board element may further comprise a backing layer 244 and/or a cover layer 245 covering the grooves 10. Preferably, the backing layer comprises a thermoplastic material and, optionally, a filler. Moreover, the cover layer may be a flexible layer, such as foam layer. The layer structure 240 may be calendered or extruded, such as coextruded. Moreover, the layer structure may be laminated together or bonded together by an adhesive.

In some embodiments of the board element or panel, at least the lowermost layers, such as a first 243' and/or a second 243" core layer, and optionally the backing layer 244, comprise a thermoplastic material and, optionally, a filler.

Optionally, the board element may further comprise at least one reinforcement layer 250, such as at least one glass fibre layer.

First, a receiving surface 201 of the board element is arranged in contact with or on the transportation device 140 (Box S11). The receiving surface may be a front side 210 or rear side 220 of the board element, preferably facing downwards as shown in e.g., FIGS. 8*e* and 8*f*, respectively.

Thereafter, as shown e.g., in FIGS. 9*b*-9*d*, the board element is transported in the feeding direction F to the first rotating cutting device 131*a* (Box S12), which then is displaced with respect to support member 120 for removing material from the board element (Box S13). For example, a first groove profile 11 may be formed, see FIGS. 7*c*-7*e* and the discussion above related thereto. Optionally, a position, preferably a position in a lateral direction L, of the aligning element 160 and/or the blocking element 162 may be controlled.

The board element is then, again as shown e.g., in FIGS. 9*b*-9*d*, transported to the second rotating cutting device 131*b*

(Box S14), which subsequently is displaced with respect to support member 120 for removing material from the board element (Box S15). For example, a second groove profile 12 may be formed. The second groove profile may have a larger cross-sectional area C2 than the first groove profile C1, see FIGS. 7*c*-7*e* and the discussion above related thereto.

A first groove arrangement 41 and a second groove arrangement 42 spaced from the first groove arrangement 41 in a first x and/or a second y horizontal direction of the board element may thereby be formed, e.g., as shown in embodiment of a panel in FIGS. 13*b*-13*d* and 14*a*-14*g* and described further below. For example, the first 41 and/or the second 42 groove arrangement(s) may be formed by the first and second rotating cutting devices 131*a*, 131*b*.

Any or both of the steps S13 and S15 may comprise the act of counteracting, such as preventing, a displacement of the board element 200 away from the support member 120 during displacement of the respective rotating cutting device 131*a*, 131*b* as described elsewhere in this disclosure.

In a non-limiting example, the at least one slot 171 may be formed by the rotating cutting device, such as during a first repetition of the method S10. During subsequent repetitions of the method S10, the at least one slot may thereby already be formed. In these examples, the obstruction element 170 may comprise a processable material, such as rubber, polymer-based material, solid wood or wood fibres.

The grooves are preferably formed in an interior of the rear side 220 and are preferably spaced from a first pair of opposite edge portions 231, more preferably spaced from all edge portions 230 of the board element. Moreover, at least two grooves may have different lengths LE along the first x and/or second y horizontal direction(s) of the board element 200, cf. FIGS. 15*a*-15*k* described below.

During or after each step S13 and S15, the removed material may be collected from the board element and/or the support member and separated into a respective first 81 and a second 82 group of material elements (Box S18 and S19). For example, the material collecting device 190 and material separating device 192 in FIGS. 10*d*-10*e* may be utilized. A characteristic of material elements of the first group may be different from a corresponding characteristic of material elements of the second group. The characteristic may be at least one selected from the group of a material composition of the material elements, a size of the material elements, a weight of the material, a shape of the material, and a density of the material.

Figure 13B:
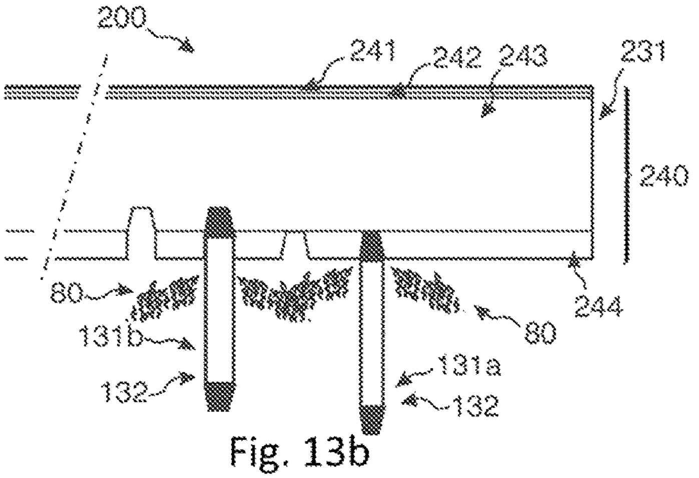

In some embodiments, and as illustrated in a cross-sectional side view in an embodiment in FIG. 13*b*, the first rotating cutting device 131*a* only removes material 80, such as chips, from a first layer of the board element and, thereafter, the second rotating cutting device 131*b* only removes material 80, such as chips, from a second layer of the board element. When the first and second layers comprise different material compositions, the material elements may thereby be grouped into a first 91 and second group 92, preferably based on different material compositions.

In some embodiments, the first and/or the second rotating cutting device(s) 131*a*, 131*b* may remove material 80, such as chips, from a first and a second layer of the board element. When the first and second layers comprise different material compositions, the material elements may thereby be separated, e.g., as described in relation to FIGS. 10*d*-*e*, and grouped into a first 91 and second group 92, preferably based on different material compositions.

In a first example, and as shown in FIG. 13*b*, the first layer may be a backing layer 244 of the board element and the second layer may be a core layer 243 of the board element. In a second example, the first and second layers may be a first 243' and a second 243" core layer of the board element, respectively.

In some embodiments, the board element may comprise at least one reinforcement layer 250. In a first example, the step(s) S13 and/or S15 may then comprise the act of removing at least a portion of the at least one reinforcement layer 250 by penetrating it with the first and/or second rotating cutting device 131*a*, 131*b*. In a second example, the step(s) S13 and/or S15 may then comprise the act of controlling a penetration depth of first and/or second rotating cutting device such that the at least one reinforcement layer 250 is left unprocessed. The controlling may be implemented by the control unit 186.

Lastly, the board element 200 may be further processed, in this case post-processed, or treated. In a first example, a format of the board panel may correspond to a desired format of a panel 300. In a second example, it may be desired to change a format of the board element by dividing it into at least two panels 300 (Box S21). In either scenario, a locking system 360 may be formed on at least one edge portion 330 of the panel or at least two panels (Boxes S22 and S23), preferably on a first pair 331 and a second pair 332 of opposite edge portions. Preferably, the locking system 360 is formed after the dividing of the board element, but it is equally conceivable to form at least a part of the locking system before the dividing. For example, the locking system on one pair 331, 332 of opposite edge portions may be formed before dividing and the locking system on the other pair 332, 331 of opposite edge portions may be formed after dividing. In some embodiments, at least a part of the locking system is formed at least partially simultaneously with the dividing.

It is clear that in some embodiments, the board element 200 is a panel 300 per se and therefore do not need to be divided. Nevertheless, a locking system may be formed in analogy with the discussion above.

Figure 12A:
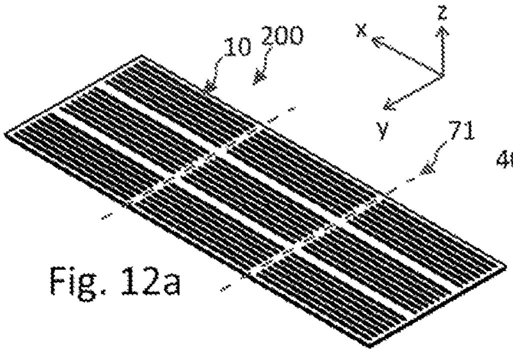
FIGS. 12*a*-12*k* illustrate perspective views and side views of embodiments of dividing of the board element into panels and in side views embodiments of a functional groove.
Figure 12B:
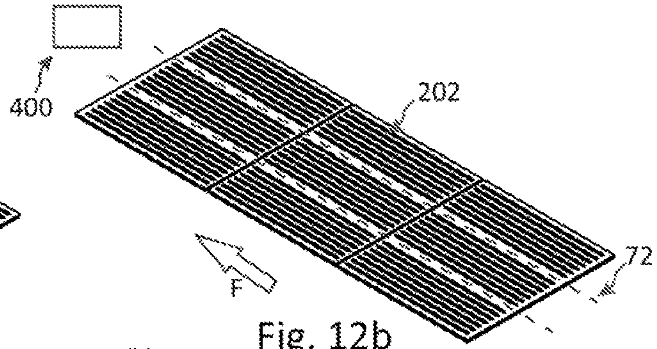
Figure 12C:
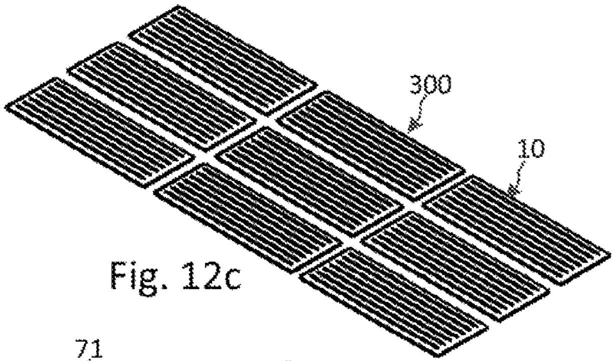
Figure 12D:
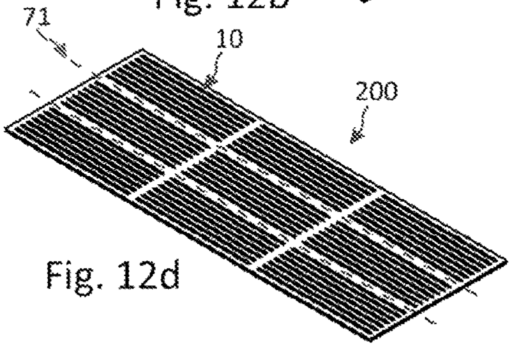
Figure 18A:
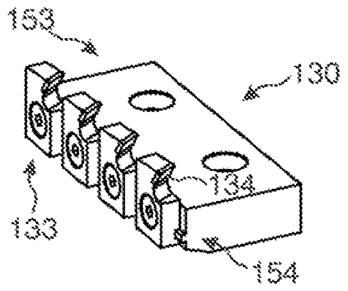
FIGS. 18*a*-18*b* illustrate in a perspective view and a side view an embodiment of a processing tool comprising a carving or scraping tool.
Figure 18B:
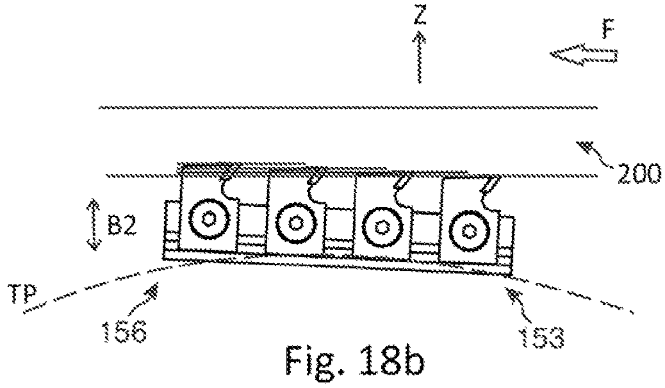
Figure 18C:
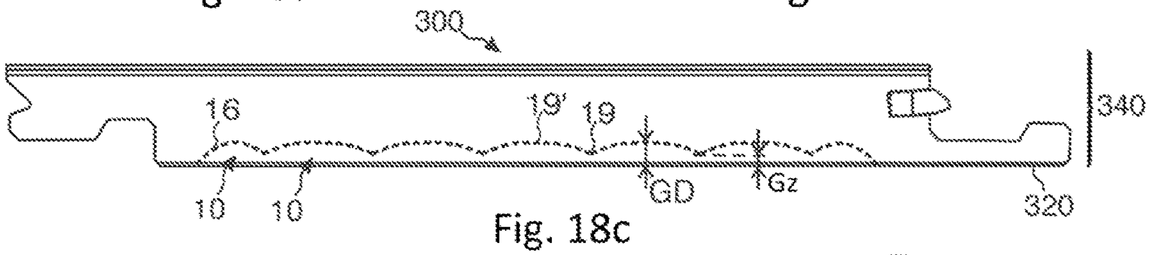
FIGS. 18*c*-18*e* illustrate an embodiment of a panel in a side view, a bottom view and a zoomed-in side view an embodiment of a panel.
Figure 18D:
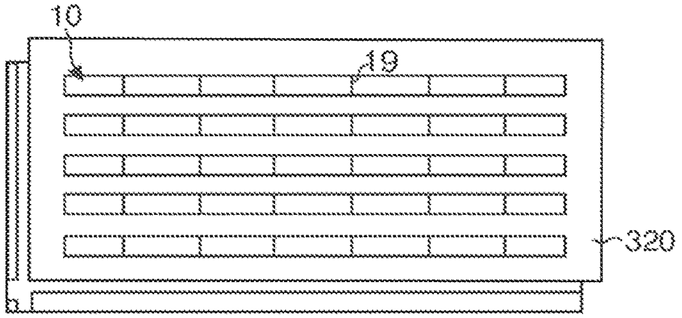
Figure 18E:
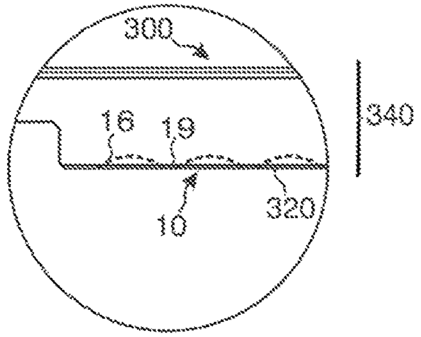
Figure 18F:
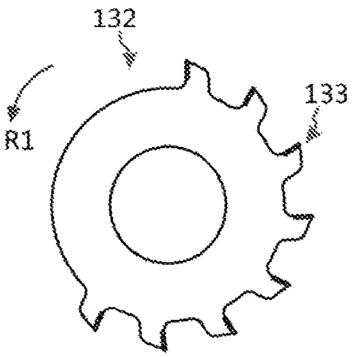
FIGS. 18*f*-18*g* illustrate an embodiment of an asymmetric cutting element and an embodiment of a dividing of a board element into panels in a bottom view.
Figure 18G:
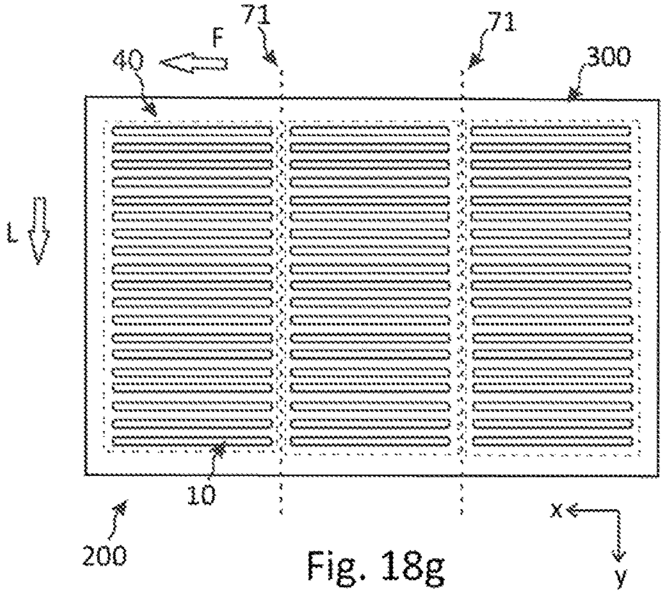

Embodiments of the dividing of the board element 200 into panels 300 are shown in perspective views in FIGS. 12*a*-12*e* and 12*i* and in a bottom view in FIG. 18*g*. In FIGS. 12*a* and 12*d*, at least two panel substrates 202 are formed by dividing the board element 200 along at least one first dividing line 71. Each first dividing line in FIGS. 12*a* and 12*d* may be parallel with the second y and first x horizontal directions of the board element, respectively. In FIG. 18*g*, at least two panels 300 are formed by dividing the board element 200 along at least one first dividing line 71. In operation, the first dividing line(s) 71 may be parallel with the lateral direction L. The longitudinal extension of the grooves 10 may extend in parallel with the feeding direction F as shown in e.g., FIG. 18*g*. Thereby, grooves 10 having a longitudinal extension being parallel to a long edge portion (e.g. FIGS. 12*a*-12*e*) or a short edge portion (e.g. FIG. 18*g*) of the panel 300 may be formed.

Figure 12E:
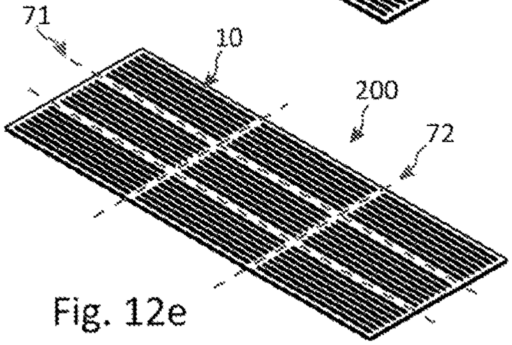

In some embodiments, the panel substrates 202 formed in FIGS. 12*a* and 12*d* correspond to panels 300, which may be provided with locking systems. In some embodiments, the panel substrates 202 formed in FIGS. 12*a* and 12*d* may be further divided. As shown in FIGS. 12*b* and 12*e*, at least two panels 300 may be formed by further dividing the panel substrate 202 in FIGS. 12*a* and 12*d*, respectively, along at least one second dividing line 72. Each second dividing line in FIG. 12*b* may be parallel with the first horizontal direction x. Moreover, each second dividing line in FIG. 12*e* may be parallel with the second horizontal direction y. Any of these divisions may form the panels 300 shown in FIG. 12*c*.

In FIGS. 12*a*-12*e*, 12*i* and 18*g* the dividing may be any dividing process known to a person skilled in the art, such as sawing, cutting, or breaking, and may be implemented by a board dividing device 400. However, other dividing processes are conceivable. The embodiment in FIGS. 12*f*-12*h* shows a dividing of the board element 200 or of the panel substrate 202 by forming at least one notch 203 in a side, such as a front side 210, thereof. For example, the notch(es) 203 may be formed along the feeding direction F of the board element.

In some embodiments, the notches 203 may be formed after forming the grooves 10. Preferably, however, and as shown in FIGS. 12*f*-12*g*, the notches 203 may be formed before forming the grooves 10. For example, the notches 203 may be formed after or in relation to extrusion or calendering of the board element, preferably while the board element has a temperature exceeding a critical temperature, such as exceeding 60° C., preferably exceeding 70° C. or even exceeding 100° C. In a first example, a notch may be formed by removing material, for example by cutting the board element, such as with a knife or by carving. In a second example, a notch may be formed by providing a dent in the material, preferably without removing material.

The board element 200 or panel substrate 202 may then be divided into panel substrates 202 or panels 300, respectively, as shown in FIG. 12*h*. The dividing may be performed along the first 71 or the second 72 dividing line. Preferably, the dividing is performed by processing, such as cutting, sawing, or breaking, the board element 200 or panel substrate 202 on the side in which the notches 203 are provided. Hence, in the present embodiment the front side 210 is processed. However, it is also possible to process the opposite side in which the notches 203 are provided, such as the rear side 220.

The board element 200 may comprise at least one functional groove 70 in the rear side 220. In the embodiment shown in FIG. 12*i*, the at least one functional groove 70 is formed before dividing the board element. The functional groove(s) may extend to at least one edge of the board element, preferably to each of a pair of opposite edge portions, such as the first pair 231 or a second pair 232.

Figure 12I:
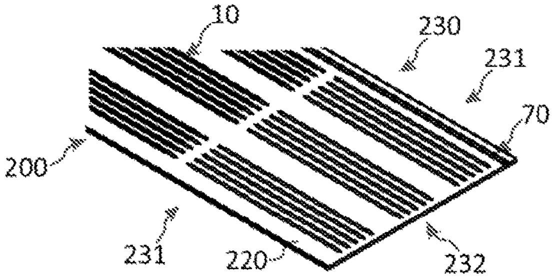
Figure 12F:
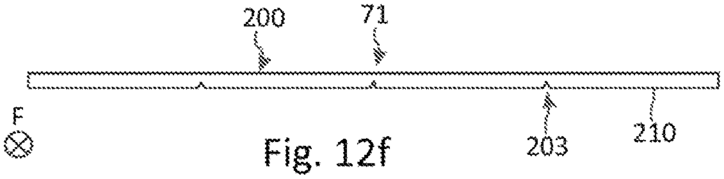

The functional groove(s) 70 may be positioned at a predetermined distance PD from an edge portion 230, which is shown as an edge portion of the first pair 231 in FIG. 12*i*. Preferably, the at least one functional groove extends in parallel with the edge portion 230.

Figure 12J:
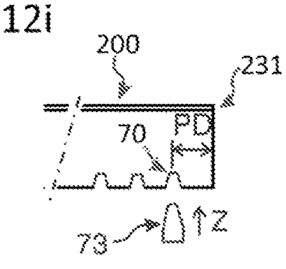
Figure 12G:
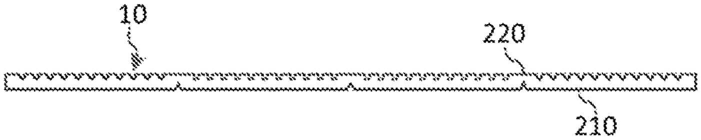
Figure 12H:
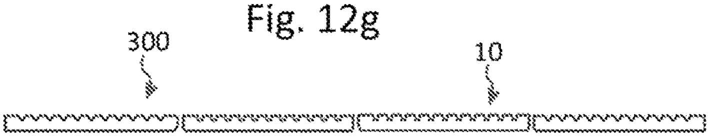
Figure 12K:
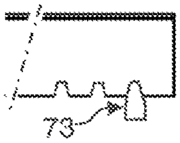

The functional groove(s) 70 may be a guiding groove. As illustrated in FIGS. 12*j*-*k*, a guiding element 73 may be provided in the guiding groove when dividing the board element for controlling the dividing process. In the present non-limiting embodiment, the guiding element 73 is displaceable in the vertical direction Z. The guiding element may be resilient, such as in the vertical direction Z.

In some embodiments (not shown), the functional groove (s) 70 may be provided in an interior of the rear side 220, thereby being spaced from each edge portions of a pair of opposite edge portions, such as the first pair 231, preferably all edge portions 230 of the board element.

In some embodiments, the functional groove(s) 70 may be formed in the board element 200 before or after the forming of the grooves 10 therein. In some embodiments, the functional groove(s) 70 may be formed in the board element 200 during the forming of the grooves 10 therein. The functional groove(s) may be formed by a rotating cutting unit. In a first example, the rotating cutting unit is a rotating cutting device 131 of any of the embodiments described herein. In a second example, the rotating cutting unit is separately formed from the rotating cutting device.

The board element 200 in FIGS. 13*a*-13*b* may correspond to a panel 300. If so, elements of the board element, such as 10, 40, 210, 220, 230, 231, 232, 240, 241-244, 250, etc., may correspond to elements of the panel, such as 10, 40, 70, 310, 320, 330, 331, 332, 340, 341-344, 350, etc., respectively. In a first example, the panel may be provided with a locking system 360, such as a mechanical locking system. In a second example, the panel does not comprise any mechanical locking system; when the panel is a floor panel, it may be nailed or glued to a subfloor, or may even be installed loosely thereon.

The method described may produce a panel 300 comprising at least one groove 10 in a rear side 320 of the panel as illustrated in any of the embodiments in FIGS. 13*c*-13*d* and 14*a*-*g*. The panel may be a building panel, floor panel, wall panel, ceiling panel or furniture panel.

The panel 300 may comprise a first pair of opposite edge portions 331, which may be long edge portions, and a second pair of opposite edge portions 332, which may be short edge portions. Preferably, the grooves 10 are formed in an interior of the rear side 320 and are spaced from the first 331 and/or second 332 pair(s) of opposite edge portions, preferably both of them. The shape of end portions 16 may be curved along the longitudinal extension of the groove, e.g., obtained when the grooves are formed by a rotating cutting device 131. In some embodiments, however, and as shown in the side view in FIG. 14*a*, the grooves 10 may extend to at least one edge portion 330 of a pair of opposite edge portions, such as opposite short edge portions, of the panel. The shape of end portion(s) 16 may be straight along the longitudinal extension of the groove. When the grooves 10 extend to a locking groove 363 or 368, they are preferably provided below an underside 381 or 382, respectively, of the corresponding edge portion 330. The underside 381, 382 may be a lowermost portion of the edge portion 330.

Figure 13C:
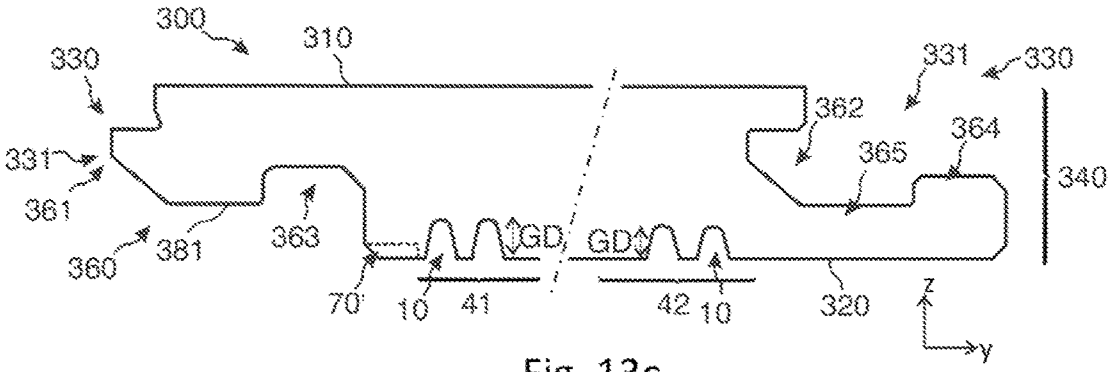
Figure 13D:
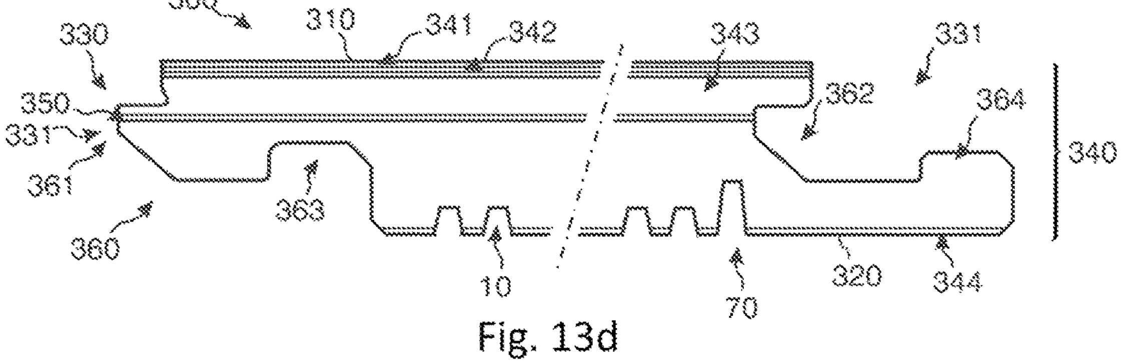

FIGS. 13*c*-13*d* and 14*a*-14*g* show in embodiments a panel comprising a layer structure 340 comprising at least one layer, any, some or each layer preferably comprising a thermoplastic material and, optionally, a filler. One of the layers may comprise a front side 310 of the panel. Alternatively, there may be another layer provided on the layer structure and thereby comprising the front side 310, such as a finish layer. For example, the finish layer may be a UV or EB cured layer, preferably comprising a water-based lacquer. As shown in FIG. 13*d*, one layer may be a core layer 343 and other layers may be a decorative layer 342 and/or a wear layer 341. Optionally, the board element may further comprise a backing layer 344 and/or a cover layer covering the grooves 10, cf. the cover layer 245 in FIG. 13*a*. The layers in the layer structure 340 may be calendered and/or extruded, such as coextruded. Moreover, the layer structure may be laminated together or bonded together by an adhesive.

Figure 14A:
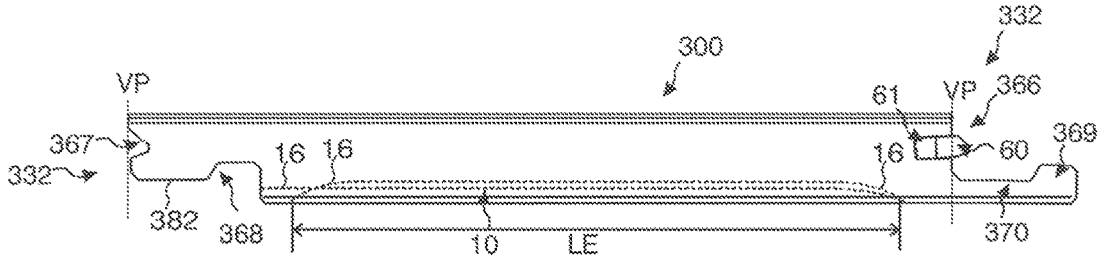
FIGS. 14*a*-14*g* illustrate a side view, bottom views and cross-sectional side views of embodiments of a panel.
Figure 14B:
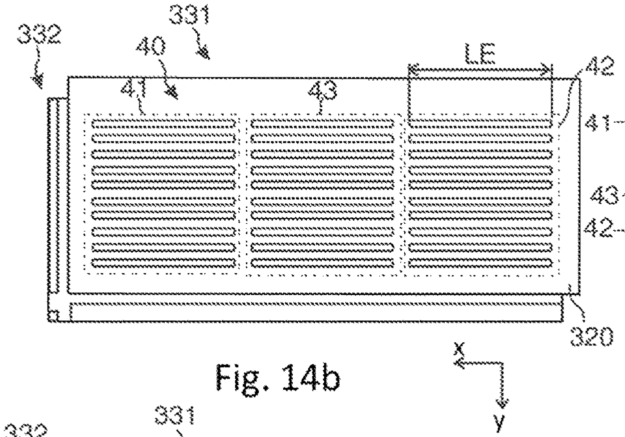
Figure 14C:
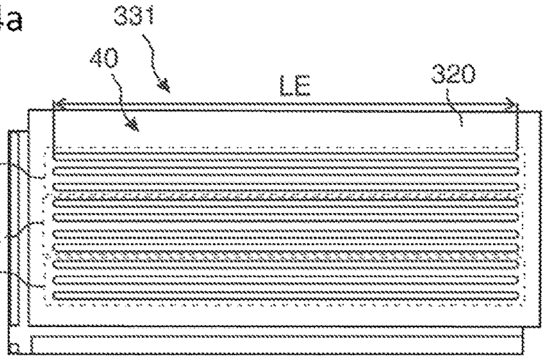
Figure 14D:
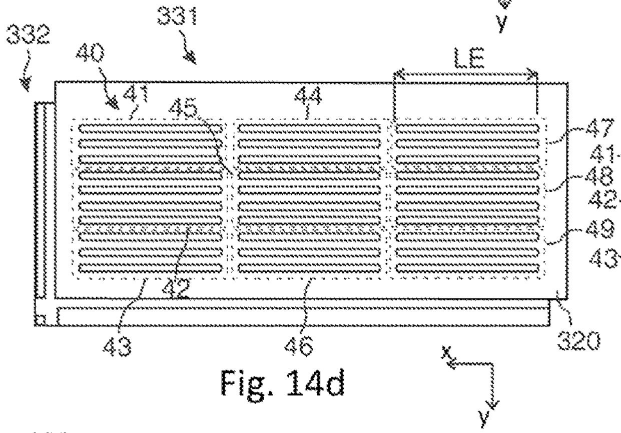
Figure 14E:
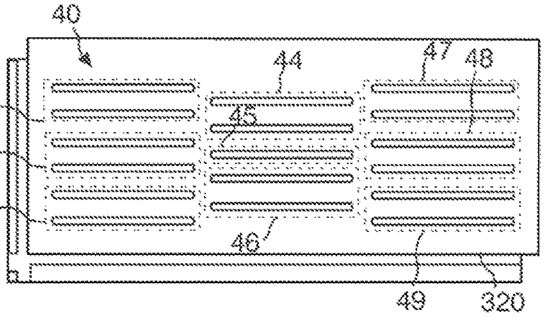
Figure 14F:
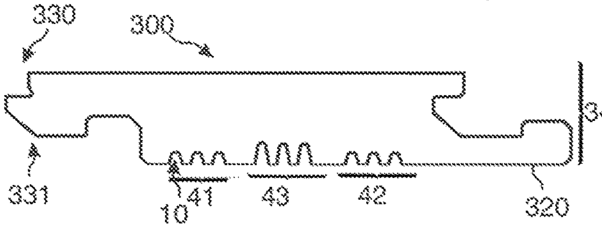
Figure 14G:
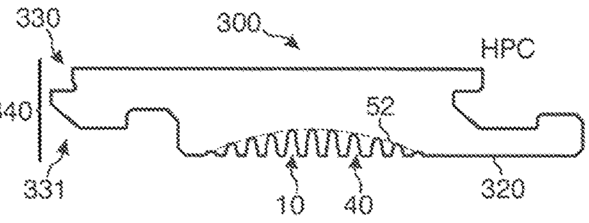

Generally, a bottom of the at least one groove 10 may be rounded, as e.g. in FIGS. 13*c* and FIGS. 14*f*-14*g*, or may comprise sharp edges, as e.g. in FIGS. 13*a*-13*b* and 13*d*.

As shown in FIGS. 13*c*-13*d*, the panel, such as a floor panel, may comprise a locking system 360 on the first pair 331 of opposite edge portions. The locking system may comprise a tongue 361 and a tongue groove 362 on the respective edge portion for vertical locking, optionally being integrally formed with the panel. The locking system may further comprise a locking groove 363 and a locking element 364 on the respective edge portion for horizontal locking.

The locking element is preferably provided on a strip 365 extending horizontally beyond an upper portion of the panel 300.

Moreover, the panel, such as a floor panel, may comprise a locking system 360 on the second pair 332 of opposite edge portions. The locking system may comprise a tongue 366 and a tongue groove 367 on the respective edge portion for vertical locking. For example, and as shown in FIG. 14*a*, the tongue 366 may be a separate locking tongue 60 provided in a displacement groove 61. The locking system may further comprise a locking groove 368 and a locking element 369 on the respective edge portion for horizontal locking. The locking element is preferably provided on a strip 370 extending horizontally beyond an upper portion of the panel 300.

As shown in FIG. 13*d*, the panel 300 may comprise at least one functional groove 70 in the rear side 320, which may extend to at least one edge of the board element, preferably to each of a pair of opposite edge portions, such as the first pair 331 or a second pair 332. The features and characteristics of the at least one functional groove may be similar to those of the board element 200, whereby reference is made to the discussion above. For example, the at least one functional groove may be positioned at a predetermined distance PD from an edge portion 330, such as an edge portion of the first 331 or second 332 pair.

In some embodiments, the at least one functional groove 70 may be a calibration groove 70' preferably being provided at an edge portion 330 of the panel. The calibration groove 70', illustrated by a broken line in FIG. 13*c*, may be provided adjacent, such as directly adjacent, to the locking groove 363 or 368.

The panel 300 may comprise at least two groove arrangements 40, such as a plurality of them. A longitudinal extension of the grooves 10 in each groove arrangement may be parallel to each other. Preferably, a longitudinal extension of each groove arrangement, such as along the first horizontal direction x, may be parallel to each other and preferably extends in parallel with an edge portion of the panel, preferably a long edge portion, which may be an edge portion of the first pair 331. Grooves of the each groove arrangement may have the same characteristics, such as groove depths and/or groove widths. The groove depths GD and/or groove widths of at least two of the groove arrangements may be different from each other. In non-limiting examples, any groove depth GD may be at least 0.2, such as at least 0.3, preferably at least 0.4, times a thickness of the board element. For example, when the thickness is 2-40 mm, a groove depth of any of the grooves may be at least 0.5-10 mm. For example, a floor panel having a thickness of 2-10 mm may have groove depth which is at least 0.5-5 mm.

As noted under steps S13 and S15 above, the panel 300 in FIG. 13*b*-13*d* comprises a first groove arrangement 41 and a second groove arrangement 42.

FIGS. 14*b* and 14*c* illustrate in bottom views groove arrangements 41, 42, 43 that are spaced in the first x and second y horizontal direction, respectively. A first 41 and a second 42 groove arrangement of the panel each have groove depths GD that are different from groove depths of a third groove arrangement 43 disposed between the first 41 and second 42 groove arrangements. As shown in a bottom view in FIG. 14*b* and in FIG. 14*f*, which is a cross-sectional side view of the embodiment in FIG. 14*c*, the groove depths GD of each of the first 41 and second 42 groove arrangements may be smaller than groove depths of the third groove arrangement 43. In any of these cases, the groove depths of the first and second groove arrangements may be the same.

More generally, as shown in a bottom view in FIG. 14*d*, each pair of the groove arrangements 41-49 may be spaced in the first x and/or second y horizontal direction(s). For example, the pair 41 and 44 are spaced in the first horizontal direction x, the pair 41 and 42 are spaced in the second horizontal direction y, and the pair 41 and 45 are spaced in the first x and second y horizontal directions.

By means of any of the embodiments in FIGS. 13*b*-13*d* and 14*a*-14*g*, more material may be saved while maintaining the balancing properties of the panel and/or strength of the panel, such as a locking strength. In a first example, by having first 41 and second 42 groove arrangements arranged adjacent to short edge portions of the panel as in FIG. 14*b*, each having groove depths GD which are smaller than the groove depths of the third groove arrangement 43, more material may be saved in the centre of the panel while maintaining the strength, such as the locking strength, along the short edge portions of the panel and/or the balancing properties of the panel. In a second example, by having first 41 and second 42 groove arrangements arranged adjacent to long edge portions of the panel as shown in FIGS. 14*c* and 14*f*, each having groove depths GD which are smaller than the groove depths of the third groove arrangement 43, more material may be saved in the centre of the panel while maintaining the strength, such as the locking strength, along the long edge portions of the panel and/or the balancing properties of the panel.

In the cross-sectional side view in FIG. 14*g* there is illustrated a plurality of groove arrangements 40, wherein bottom portions, such as bottommost portions, of the grooves 10 are disposed along an envelope curve 52, which preferably is a continuous curve. Generically, the envelope curve may be a monomial curve or a polynomial curve of order M, where M is any natural number M=0, 1, 2, 3, 4, 5, 6, . . . , a stepwise constant curve, such as a sawtooth wave or a triangle wave or a square wave, or it may correspond to a Taylor series, such as a trigonometric function, e.g., sine or cosine. The envelope curve 52 may be provided in a cross-sectional plane HPC of the panel 300, which may be perpendicular to a plane provided along the front 310 and/or rear 320 side(s) of the panel and may be parallel with a vertical plane VP extending along an edge portion 330 of the panel, such as an edge portion of the second pair 332. Each groove arrangement 40 may comprise at least one groove, preferably provided in parallel with the first pair 331 of edge portions. In some embodiments (not shown), a groove arrangement 40, preferably provided in a centre portion of the panel between the edge portions 330, may comprise at least two grooves 10, such as a plurality of grooves, i.e., thereby having a constant characteristic, such as a constant groove depth.

FIG. 14*e* shows that in any embodiment of this disclosure, at least one pair of grooves 10 may be provided in an offset relation in the first x and/or second y horizontal direction(s).

A groove arrangement may be at least partly, such as completely, spaced in the first x and/or second y horizontal direction(s) from another groove arrangement. As shown in FIG. 14*e*, the groove arrangement 44 is at least partly spaced in the second horizontal direction y, and completely spaced in the horizontal direction x, from the groove arrangement 41.

Any groove 10, or preferably all of them, may comprise one bevel 14 or two bevels 14, 15. As shown in the embodiments cross-sectional side views in FIGS. 16*e* and 7*d*, each bevel may be disposed between a respective groove wall 18 the rear side 320. Any or both bevels 14, 15 may be at least partly planar or rounded.

The groove arrangements 40 in any of the embodiments in FIGS. 13*b*-13*d* and 14*a*-14*f* may be formed in various ways using embodiments of the system 100 disclosed herein.

In some embodiments, at least the first 41 and second 42 groove arrangements may be formed by the same component of the processing tool 130, such as a single rotating cutting device 131, as shown e.g., in FIGS. 1, 2*a*-2*g*, 3*a*-3*h*, 4*a*-4*e*, 8*a*-8*d*, 10*a*-10*c* and 16*a*-16*b*.

A penetration depth of the rotating cutting device 31 may be controlled for intermittently forming different groove depths of the first 41 and second 42 groove arrangements, which preferably are formed consecutively along the feeding direction F during operation, see, e.g., FIG. 14*b*. Preferably, the rotating cutting device comprises cutting elements 132 having the same diameter.

Alternatively, however, and as shown in in the embodiment in FIGS. 16*a*-16*c*, the rotating cutting device 131 may comprise cutting elements 132 having at least two different diameters d1, d2. Thereby, at least one groove arrangement 41, 42, 43, and optionally 44, 45, 46 and/or 47, 48, 49, which are offset along the lateral direction L during operation, may be formed. At least two groove arrangements, such as the first 41 and second 42 groove arrangements, may be formed at least partially simultaneously.

Generally, the processing tool 130 may comprise a first 93 and a second 94 group of cutting elements 132, 132*a*, 132*b* comprising cutting elements each having a first diameter d1 and a second, different, diameter d2, respectively. The first 93 and second 94 groups of cutting elements may be configured to rotate around the same rotational axis A1, as shown e.g., in FIGS. 16*a*-16*c*, or around two different rotational axes A1, A2, as shown e.g., in FIGS. 7*b* and 8*e*.

In some embodiments, the first 41 and second 42 groove arrangements may be formed by different components of the processing tool 130, such as a first and a second rotating cutting device 131*a*, 131*b*, as shown e.g., in FIGS. 5*a*-5*g*, 6*a*-6*g*, 7*a*-7*h* and 8*e*-8*f*.

A penetration depth of the first and second rotating cutting devices may be controlled for forming different groove depths of the groove arrangements 40, at least some of which preferably are formed consecutively along the feeding direction F during operation, see FIGS. 14*b* and 14*d*-14*e*. For example, the first rotating cutting device may form the first groove arrangement 41 and the second rotating cutting device may form the second groove arrangement 42. Preferably, each of the first and second rotating cutting devices comprises cutting elements 132*a*, 132*b* having the same diameter. FIG. 8*e*, however, illustrates that the cutting elements of the second rotating cutting device may have a different, preferably larger, diameter than cutting elements of the first rotating cutting device.

As noted above, at least one rotating cutting device 131 may comprise cutting elements 132 having at least two diameters, cf. FIGS. 16*a*-16*c*. Thereby, in analogy with the discussion above relating to a single rotating cutting device, at least two groove arrangements 40, which are offset along the lateral direction L during operation, may be formed by each rotating cutting device having different diameters.

Generally herein, the first and second rotating cutting devices may operate consecutively, but an at least partially simultaneous operation by them is equally conceivable.

It is clear that in any of the embodiments above regarding the forming of the groove arrangements, the penetration depth may be controlled by displacing the processing device 130 and/or the support member 120. Moreover, the components of the system, such as the processing device and/or the support member, may be controlled by the control unit 186.

FIGS. 15*a*-15*k* illustrate in bottom views embodiments wherein at least two grooves 10 have different lengths LE along the first x and/or second y horizontal direction(s) of the panel 300. Preferably, the longitudinal lengths of the at least one groove are different. The discussion below is limited to one edge portion 330, which may be provided in the second pair 332, but is equally valid on one or on both edge portions of a pair of opposite side edge portions, such as the second pair 332.

End portions 16 of the grooves, preferably longitudinal end portions of the grooves, may be disposed along a joining curve 51, which generally may be a non-linear curve. A portion of such joining curves 51 are shown in FIGS. 15*a*-15*b* and 15*e*-15*j*.

Figure 15A:
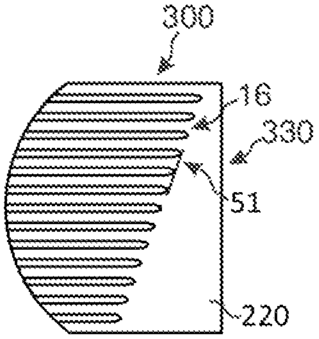
FIGS. 15*a*-15*k* illustrate bottom views of embodiments of a panel.
Figure 15B:
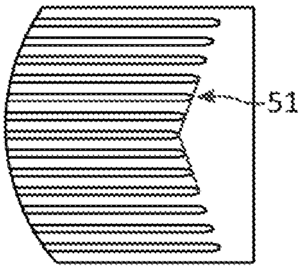
Figure 15C:
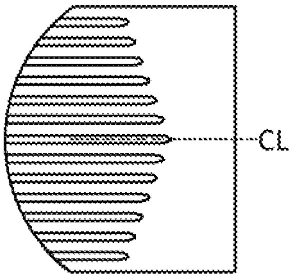
Figure 15D:
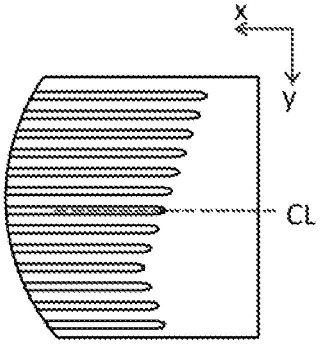
Figure 15E:
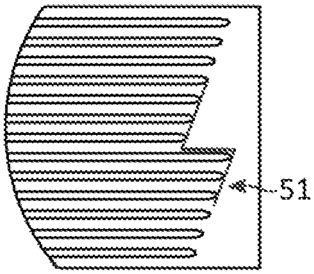
Figure 15F:
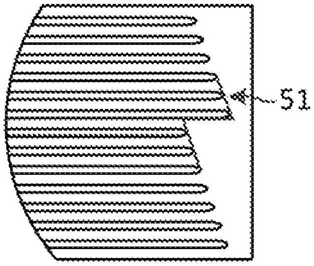
Figure 15G:
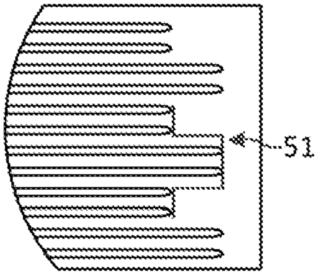
Figure 15H:
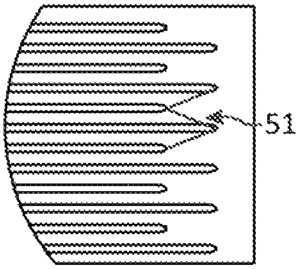
Figure 15I:
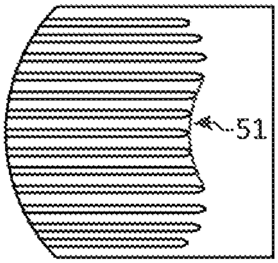
Figure 15J:
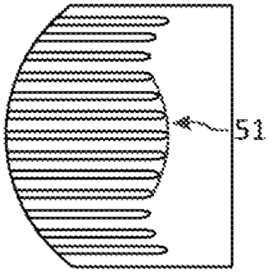
Figure 15K:
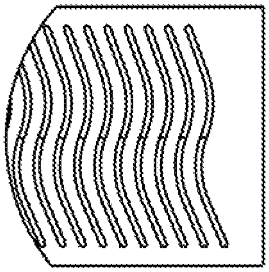

FIG. 15*a* shows end portions 16 disposed along a straight curve, which may be inclined with respect the edge portion 330, and FIGS. 15*b*-15*h* show end portions disposed along a stepwise constant curve, such as a sawtooth wave or a triangle wave or a square wave. FIGS. 15*i*-15*j* show end portions disposed along joining curve 51 having a continuous wave form, such as a trigonometric function.

In some embodiments, and as shown in FIGS. 15*b*-15*c* and 15*h*-15*j*, the end portions 16 may be disposed symmetrically around a centre line CL of the edge portion 330, preferably extending perpendicularly to the edge portion. In some embodiments, and as shown in FIGS. 15*a* and 15*d*-15*g*, the end portions may be disposed asymmetrically around the centre line CL.

The grooves 10 in FIGS. 15*a*-15*j* may be formed by a single rotating cutting device 131, such as any of those in FIGS. 1, 2*a*-2*g*, 3*a*-3*h*, 4*a*-4*e*, 8*a*-8*d*, 10*a*-10*c* or 16*a*-16*b*. Alternatively, the grooves 10 in FIGS. 15*a*-15*j* may be formed by at least two rotating cutting devices 131*a*, 131*b*, such as any of those in FIGS. 5*a*-5*g*, 6*a*-6*g*, 7*a*-7*h* or 8*e*-8*f*.

Figure 17A:
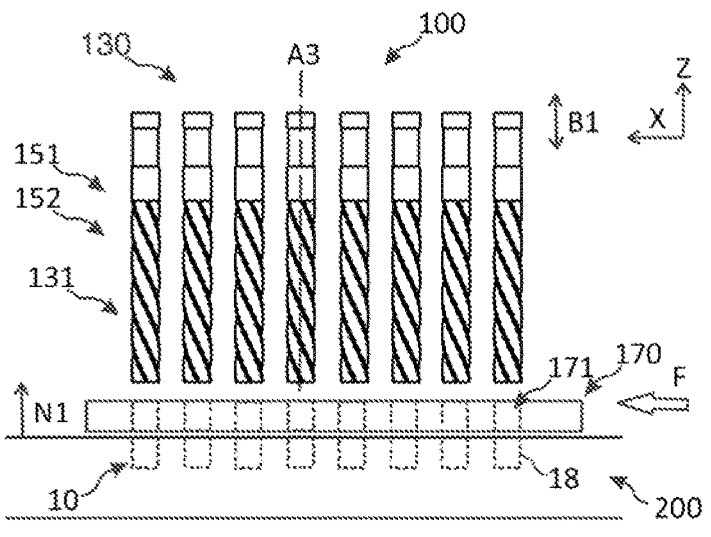
FIGS. 17*a*-17*c* illustrate in a side view, a perspective view and a top view embodiments of a system and components thereof for forming grooves in a board element.
Figure 17B:
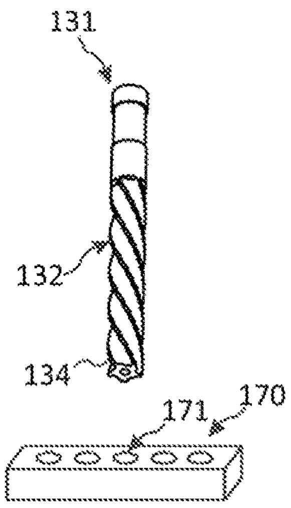
Figure 17C:
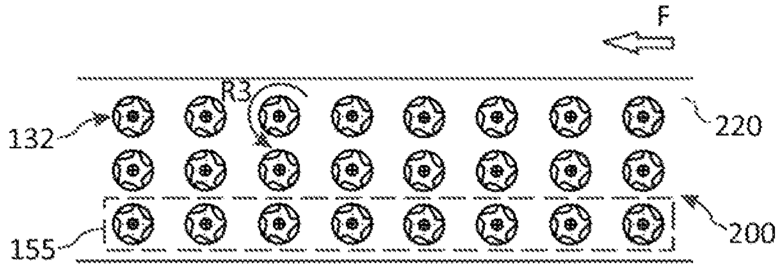

In some embodiments, and as schematically shown in FIGS. 17*a*-17*c*, the forming of the at least one groove 10 may comprise drilling or milling the board element 200 or panel 300. The processing tool 130 may comprise a drilling tool 151 or a milling tool 152, such as an end milling tool, each of which may be a rotational cutting device 131. The drilling tool 151 or milling tool 152 may comprise a plurality of cutting elements 132 configured to rotate around a rotational axis A3 provided essentially in parallel with a normal N1 of the board element or panel in operation. In a first example, all the cutting elements 132 rotate in the same direction R3. In a second example, some of the cutting elements 132, such as about half of them, rotate in opposite directions R3. In the second example, the twisting of the board element or panel may be reduced. Each cutting element 132 may comprise a cutting surface 134. A diameter of the cutting elements may be 1-15 mm, such as 1-6 mm or 2-4 mm.

Other features of the processing tool 130 may be the same as described elsewhere herein, whereby reference is made thereto. For example, the processing tool may be displaceably mounted in a frame member 110, such as being displaceable at least in a direction B1 perpendicular to a feeding direction F and preferably being parallel with the vertical direction z in operation. The milling tool 152, such as the cutting elements 132, may also be displaceable along and/or perpendicularly to the feeding direction F, preferably being parallel with the first x and/or the second y horizontal direction(s) in operation. The support member 120 (not shown) may be fixedly mounted in the frame member. Clearly, the roles may be reversed as detailed elsewhere herein, so that the processing tool and the support member may be fixedly and displaceably mounted in the frame member, respectively.

The processing tool 130 comprising a drilling 151 or milling 152 tool may be configured to form grooves intermittently. The transportation of the board element 200 may be interrupted when the grooves are formed so that the board element is temporarily stationary with respect to the processing tool. Optionally, the processing tool 130 comprising a milling tool 152 may be configured to form grooves during feeding of the board element, such as when the milling tool is displaced horizontally, at least in the lateral direction L.

Figure 17D:
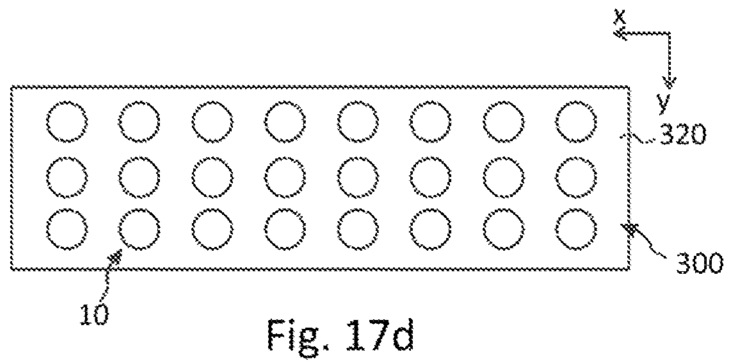
FIGS. 17*d*-17*e* illustrate embodiments of a panel in bottom views.
Figure 17E:
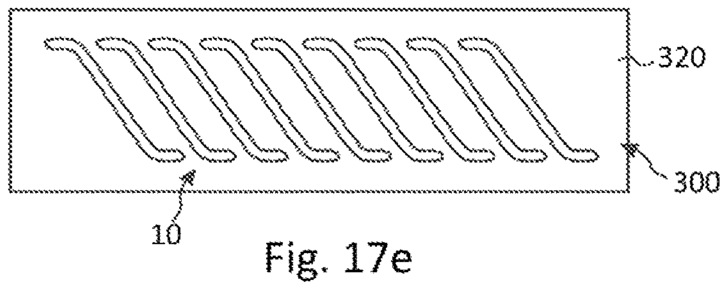

The processing tool comprising a drilling 151 or a milling 152 tool may form grooves 10 having substantially vertical groove walls 18. For example, the grooves, preferably their cross-sections, may have substantially circular shapes or non-linear shapes as illustrated in the embodiments in FIG. 17*d* and FIGS. 15*k*, 17*e*, respectively. In a non-limiting example, the non-linear shapes may be formed by end milling, such as by a single row 155 of cutting elements 132 in FIG. 17*c*, whereby the end milling tool is displaceable as described above.

Optionally, as shown in FIG. 17*a*, the system 100 may further comprise an obstruction element 170, preferably fixedly mounted in the frame member 110. A portion of the rotating cutting device 131 may be configured to be arranged through at least one slot 171 in the obstruction element 170, preferably during forming of the grooves 10. The lower subfigure in FIG. 17*b* shows a portion of such an obstruction element in a perspective view.

In some embodiments, and as schematically shown in FIGS. 18*a*-18*b*, the forming of the at least one groove 10 may comprise carving or scraping the board element 200 or panel 300. The processing tool 130 may comprise a carving or scraping tool 153, which may comprise at least one tooth element 133, preferably a plurality of tooth elements 133, configured to be fixedly mounted in a tooth holder 154. In a first example, the tooth holder 154 is fixedly mounted in the frame member 110. In a second example, the tooth holder 154 is displaceably mounted in the frame member 110 and is displaceable in a direction B2 perpendicular to a feeding direction F and preferably being parallel with the vertical direction z in operation. The tooth elements 132 may be arranged along each other along the feeding direction F in operation, preferably being vertically displaced with respect to each other as shown in FIG. 18*b*. Thereby, the tooth elements may gradually remove material from the board element. Each tooth element 133 may comprise a cutting surface 134. Optionally, the tooth holder 154 is horizontally displaceable with respect to the board element in operation.

In some embodiments, the tooth holder 154 comprises at least two tooth units 156, out of which one is shown in FIG. 18*b*. The tooth holder 154 may be configured to rotate intermittently between the tooth units 156 along a tool path TP. Optionally, the tooth units 156 may be displaceable in a direction B2 as disclosed above.

As shown in the embodiments in FIGS. 18*c*-18*e*, grooves 10 may be formed such that their groove depths GD vary along the first x or the second y horizontal direction of the board element or panel, such as along its long edge portions. For example, such grooves may be formed by an asymmetric cutting element 132 shown in the embodiment in FIG. 18*f*. A rotation speed of the asymmetric cutting element 132, the number of tooth elements 133, the diameter d0, the feeding speed, etc. may be adapted so that a desired shape of the grooves is obtained.

As shown in the embodiment in FIGS. 18*c*-18*d*, a linking portion 19 joining the grooves 10, such as along the long edge portions, may be spaced from the rear side 320 by a distance Gz>0. The groove depths GD of at least the end portions 16 of the grooves may vary continuously and, optionally, a centre portion 19' of the grooves between the end portions may have a constant groove depth.

The embodiment in FIG. 18*e*, illustrating a portion of a panel 300, shows that the groove depths GD may vary continuously such that substantially no portion of the grooves 10 has a constant groove depth. Optionally, a linking portion 19 provided between the grooves 10 may be provided along the rear side 320, such that the distance Gz=0.

Aspects of the inventive concept has mainly been described above with reference to a few embodiments. However, as is readily appreciated by a person skilled in the art, other embodiments than the ones disclosed above are equally possible within the scope of aspects of the inventive concept, as defined by the appended patent claims and items in an embodiment section below. For instance, the embodiments disclosed in relation to a single rotating cutting device are equally applicable to embodiments wherein at least two rotating cutting devices are utilized. For example, the embodiments in FIGS. 4*c*-4*e* and 8*a*-8*f* may be used for at least two rotating cutting devices, including embodiments of at least two obstruction elements and/or at least two pressure devices associated thereto. Moreover, embodiments of rotating cutting devices, such as embodiments of the cutting elements, e.g., inclined cutting surfaces, may be similar.

EMBODIMENTS

Further aspects of the inventive concept are provided below. Embodiments, examples, etc. of these aspects are largely analogous to the embodiments, examples, etc. as described above, whereby reference is made to the above for a detailed description.

1. A method for forming grooves (10) in a board element (200; 300), comprising:
   arranging the board element in contact with a support member (120), and
   forming at least one groove in a rear side (220; 320) of the board element by removing material (80), such as chips, from the board element by a processing tool (130).
2. The method according to item 1, further comprising displacing the board element in a feeding direction (F), such as during said forming.
3. The method according to item 1 or 2, comprising arranging a receiving surface (201) of the board element in contact with the support member.
4. The method according to any of the preceding items, wherein said receiving surface is a front side (210; 310) of the board element, preferably facing downwards during said forming of the at least one groove.
5. The method according to any of the preceding items, further comprising displacing the processing tool with respect to the support member during forming of said at least one groove, such as at least in a direction perpendicular to a feeding direction (F) of the board element, said support member preferably being fixedly mounted in a frame member (110), and said direction preferably being parallel to a vertical direction of the frame member.
6. The method according to any of the preceding items, further comprising displacing the support member with respect to the processing tool during forming of said at least one groove, such as at least in a direction perpendicular to a feeding direction (F) of the board element, said processing tool preferably being fixedly mounted in a frame member (110), and said direction preferably being parallel to a vertical direction of the frame member.

7. The method according to any of the preceding items, wherein the processing tool comprises or is a rotating cutting device (131) comprising a plurality of tooth elements (133) configured to rotate around a rotational axis (A1).
8. The method according to item 7, wherein the rotating cutting device comprises at least two cutting elements (132), preferably a plurality of cutting elements.
9. The method according to item 7 or 8, wherein a first tooth element is angularly offset with respect to a second tooth element, such as along the rotation axis (A1).
10. The method according to any of the preceding items 7-9, wherein a cutting surface (134) of at least one tooth element is inclined.
11. The method according to any of the preceding items 7-10, wherein a shape and/or an inclination of a cutting surface (134) of a first tooth element and a cutting surface (134) of a second tooth element are different.
12. The method according to any of the preceding items 7-11, wherein the rotating cutting device is configured to operate in an up-cut direction or a down-cut direction.
13. The method according to any of the preceding items 7-12, wherein said rotating cutting device is a first rotating cutting device (131*a*) and wherein processing tool further comprises a second rotating cutting device (131*b*) comprising a plurality of tooth elements (133) configured to rotate around a rotational axis (A2), the second rotating cutting device preferably being located downstream of the first rotating cutting device in a feeding direction (F).
14. The method according to item 13, wherein the first and second rotating cutting devices are configured to operate in opposite directions, said first rotating cutting device preferably being configured to operate in a down-cut direction and said second rotating cutting device preferably being configured to operate in an up-cut direction.
15. The method according to item 13 or 14, wherein a cutting element of the second rotating cutting device is laterally offset with respect to a cutting element of the first rotating cutting device.
16. The method according to any of the preceding items 13-15, wherein at least one cutting element of the second rotating cutting device is laterally aligned with respect to a corresponding number of cutting elements of the first rotating cutting device.
17. The method according to any of the preceding items, wherein said forming of at least one groove comprises forming a first groove arrangement (41) and forming a second groove arrangement (42), wherein grooves of the first groove arrangement preferably have the same characteristics, such as cross sections, and grooves of the second groove arrangement preferably have the same characteristics, such as cross sections.
18. The method according to item 17, wherein said first and second groove arrangements are at least partially, such as completely, formed by the same processing tool, such as a single rotating cutting device.
19. The method according to item 17 or 18, wherein said first groove arrangement is at least partially, such as completely, formed by a first rotating cutting device (131*a*) and said second groove arrangement is at least partially, such as completely, formed by a second rotating cutting device (131*b*).
20. The method according to any of the preceding items, wherein the processing tool comprises a first (93) and a second (94) group of cutting elements, said first group and second group comprising cutting elements each having a first diameter (d1) and a second diameter (d2), respectively, wherein the second diameter is different from the first diameter.
21. The method according to item 20, wherein the first rotating cutting device comprises cutting elements each having the same diameter (d0), such as an outer diameter and/or wherein the second rotating cutting device comprises cutting elements each having the same diameter (d0), such as an outer diameter.
22. The method according to any of the preceding items, further comprising controlling a position, preferably a position in a lateral direction, of an aligning element (160) and/or a blocking element (162).
23. The method according to any of the preceding items, further comprising counteracting, such as preventing, a displacement of the board element away from the support member during forming of said at least one groove.
24. The method according to item 23, wherein said counteracting, such as preventing, comprises arranging at least a portion of the board element between an obstruction element (170) and the support member (120).
25. The method according to item 23 or 24, wherein said obstruction element has a varying profile, such as a varying thickness (T), along a longitudinal direction (X), preferably being parallel to a feeding direction (F) of the board element, and optionally comprising a chamfer (175, 176, 177, 178) on at least one side of the obstruction element along the longitudinal direction (X).
26. The method according to any of the preceding items 23-25, wherein said counteracting, such as preventing, comprises adjusting a distance, such a vertical distance (Z1), between the obstruction element and the support member.
27. The method according to any of the preceding items 24-26, wherein said portion of the board element engages with the obstruction element and the support member during forming of the at least one groove, preferably by a pressured engagement, such as a pretensioned engagement.
28. The method according to any of the preceding items 23-27, wherein said forming at least one groove comprises arranging a portion of the processing tool through at least one slot (171) in the obstruction element.
29. The method according to any of the preceding items, wherein the forming of any, some or each of said at least one groove comprises forming a first groove profile (11) and, thereafter, a second groove profile (12), said second groove profile having a larger cross-sectional area than said first groove profile.
30. The method according to any of the preceding items, wherein the forming of the at least one groove comprises forming at least two grooves having different lengths (LE) along a feeding direction (F) of the board element.

31. The method according to any of the preceding items, further comprising collecting the removed material (80), such as at least from the board element and/or the support member, preferably by suction and/or blowing, and preferably during a displacement of the board element.

32. The method according to any of the preceding items, wherein said board element (200) is a panel (300).

33. The method according to any of the preceding items 1-31, further comprising dividing said board element (200) into at least two panels (300).

34. The method according to item 33, wherein said dividing of the board element comprises forming at least one notch (203) in the board element.

35. The method according to any of the preceding items, further comprising forming at least one functional groove (70) in the board element, preferably in said rear side.

36. The method according to item 35, when depending on item 33 or 34, further comprising controlling said dividing by providing a guiding element (73) in the at least one functional groove of the board element.

37. The method according to any of the preceding items, wherein said forming of the at least one groove comprises carving or scraping the board element, or drilling or milling the board element.

38. The method according to any of the preceding items, wherein the board element comprises at least one layer (340), wherein any layer, some layers, or each layer preferably comprises a thermoplastic material and, optionally, a filler.

39. The method according to any of the preceding items, wherein the board element comprises at least two layers (341, 342, 343, 344).

40. The method according to item 38 or 39, wherein said forming at least one groove comprises forming a first portion of the at least one groove in a first layer and, thereafter, forming a second portion of the at least one groove in the first layer and/or in a second layer.

41. The method according to any of the preceding items, wherein the board element comprises at least one reinforcement layer (250; 350) and wherein the method further comprises controlling a penetration depth of said processing tool such that said at least one reinforcement layer is left unprocessed.

42. The method according to any of the preceding items, further comprising extruding and/or calendering at least one layer for forming said board element.

43. A panel (300) obtainable by the method according to any of the preceding items 1-42.

44. A system (100) for forming grooves (10) in a board element (200; 300), comprising:
a frame member (110),
a support member (120) for supporting the board element during said forming, and
a processing tool (130).

45. The system according to item 44, wherein the processing tool comprises or is a rotating cutting device (131) comprising a plurality of tooth elements (133) configured to rotate around a rotational axis.

46. The system according to item 45, wherein the rotating cutting device comprises at least two cutting elements (132), preferably a plurality of cutting elements.

47. The system according to item 45 or 46, wherein a first tooth element is angularly offset around said rotational axis with respect to a second tooth element.

48. The system according to any of the preceding items 45-47, wherein a cutting surface (134) of at least one tooth element is inclined.

49. The system according to any of the preceding items 45-48, wherein a shape and/or an inclination of a cutting surface of a first tooth element and a cutting surface of a second tooth element are different.

50. The system according to any of the preceding items 45-49, wherein said rotating cutting device is a first rotating cutting device (131*a*) and wherein processing tool further comprises a second rotating cutting device (131*b*) comprising a plurality of tooth elements (133) configured to rotate around a rotational axis (A2), the second rotating cutting device preferably being located downstream of the first rotating cutting device in a feeding direction (F).

51. The system according to item 50, wherein said first rotating cutting device is configured to operate in a down-cut direction and wherein said second rotating cutting device is configured to operate in an up-cut direction 52. The system according to item 50 or 51, wherein a cutting element of the second rotating cutting device is laterally offset with respect to a cutting element of the first rotating cutting device.

53. The system according to any of the preceding items 50-52, wherein at least one cutting element of the second rotating cutting device is laterally aligned with respect to a corresponding number of cutting elements of the first rotating cutting device.

54. The system according to any of the preceding items 50-53, wherein the first rotating cutting device comprises cutting elements each having the same diameter (d0) and/or wherein the second rotating cutting device comprises cutting elements each having the same diameter (d0).

55. The system according to any of the preceding items 50-54, wherein at least one of the first and second rotating cutting devices comprises cutting elements having at least two different diameters (d1, d2).

56. The system according to any of the preceding items 44-55, further comprising an aligning element (160), optionally comprising a chamfer (161), for example at a longitudinal end portion (164) thereof.

57. The system according to item 56, further comprising a blocking element (162), wherein the board element is configured to be provided between the aligning element and the blocking element, the blocking element optionally comprising a chamfer (163), for example at a longitudinal end portion (165) thereof.

58. The system according to any of the preceding items 44-57, further comprising an obstruction element (170) configured to counteract, such as prevent, a displacement of the board element away from the support member.

59. The system according to item 58, wherein said obstruction element has a varying profile, such as a varying thickness (T), along a longitudinal direction (X), preferably being parallel to a feeding direction (F) of the board element, optionally comprising a chamfer (175, 176, 177, 178) on at least one side of the obstruction element along the longitudinal direction (X).

60. The system according to item 58 or 59, wherein a portion of the processing tool is configured to be arranged through at least one slot (171) in the obstruction element.

61. The system according to any of the preceding items 44-60, further comprising a pressure member (180), optionally being a resilient member (183), configured to exert pressure on, such as providing a pretensioned engagement against, the board element.

61. The system according to any of the preceding items 44-61 further comprising a material collecting device (190), such as a suction device and/or a blowing device, for collecting the removed material (80).

62. The system according to item 61, further comprising a material separating device (192) and/or an enclosure element (191).

63. The system according to any of the preceding items 44-62, further comprising a board dividing device (400) configured to divide a board element into at least two panels (300).

64. The system according to item 63, further comprising a guiding element (73) for controlling the dividing of the board element.

65. The system according to any of the preceding items 44-64, wherein the processing tool comprises a carving tool or scraping tool or a drilling tool (151) or a milling tool (152).

66. A panel (300) comprising at least one layer (340), wherein the panel comprises at least one groove (10) in a rear side (320) of the panel, preferably a plurality of grooves.

67. The panel according to item 66, wherein the at least one groove comprises one bevel (14) or two bevels (14, 15), each preferably being disposed between a respective groove wall (18) and said rear side.

68. The panel according to item 66 or 67, wherein the at least one groove comprises a first groove arrangement (41) and a second groove arrangement (42), each of the first and second groove arrangements comprising at least one groove, preferably a plurality of grooves.

69. The panel according to item 68, wherein grooves of the first and/or second groove arrangement(s) have the same characteristics, the characteristics of the first and second groove arrangements being different from each other.

70. The panel according to any of the preceding items 66-69, wherein said at least one groove is provided in an interior of the rear side being spaced from a pair of opposite edge portions (330), such as opposite short edge portions, of the panel, preferably being spaced from all edge portions of the panel.

71. The panel according to any of the preceding items 66-70, wherein the at least one groove comprises at least two grooves having different lengths along the first (x) and/or second (y) horizontal direction(s) of the panel.

72. The panel according to any of the preceding items 66-71, wherein end portions (16) of the grooves, preferably longitudinal end portions of the grooves, are disposed along a joining curve (51), such as a straight curve or a non-linear curve.

73. The panel according to any of the preceding items 66-72, comprising at least a first layer and a second layer, such as a plurality of layers (341, 342, 343, 344), for example comprising a core layer (343), a decorative layer (342) and/or a wear layer (341).

74. The panel according to item 74, further comprising a backing layer (344) and/or a cover layer.

75. The panel according to item 73 or 74, wherein the at least one groove is provided in the first layer only.

76. The panel according to items 73 or 74, wherein the at least one groove is provided in the first and second layers only.

77. The panel according to any of the preceding items 66-76, wherein the panel comprises at least one reinforcement layer (350), the at least one reinforcement layer optionally comprises at least one opening.

78. The panel according to any of the preceding items 73-77, wherein any layer, some layers, or each layer comprises a thermoplastic material, such as PVC, and, optionally, a filler, such as a mineral material.

79. The panel according to any of the preceding items 73-78, wherein any layer, some layers or each layer is calendered or extruded, such as coextruded, each of the calendered or extruded layer preferably comprising a thermoplastic material, such as PVC, and optionally a filler.

80. The panel according to any of the preceding items 66-79, wherein the at least one groove has a substantially vertical groove wall (18).

The invention claimed is:

1. A panel comprising at least one layer comprising a thermoplastic material and a filler, the panel comprising a plurality of grooves in a rear side of the panel, wherein said plurality of grooves comprise a first groove arrangement and a second groove arrangement, wherein a plurality of first grooves has the first groove arrangement and at least one second groove has the second groove arrangement, the first groove arrangement having a same first groove depth and the second groove arrangement having a same second groove depth, wherein the second groove depth is different from the first groove depth, wherein the plurality of first grooves are spaced from one another along a longitudinal direction of the panel, and the plurality of first grooves is a cluster spaced from all of the at least one second groove along the longitudinal direction of the panel.

2. The panel according to claim 1, wherein a plurality of second grooves have the second groove arrangement.

3. The panel according to claim 1, wherein a maximal groove depth of the plurality of grooves is at least 0.2 times a thickness of the board element.

4. The panel according to claim 1, wherein said plurality of grooves comprise at least one third groove with a third groove arrangement, the third groove arrangement having a same third groove depth, the first and second groove depths being different from the third groove depth.

5. The panel according to claim 4, wherein the first groove depth and/or the second groove depth is/are smaller than the third groove depth, grooves with the first and/or the second groove arrangement being disposed adjacent to an edge portion of the panel.

6. The panel according to claim 1, the first groove arrangement having a first groove width and the second groove arrangement having a second groove width, wherein the first and second groove widths are different from each other.

7. The panel according to claim 1, wherein at least one pair of grooves is provided in an offset relation in a first and/or a second horizontal direction of the panel.

8. The panel according to claim 1, wherein the plurality of grooves are provided in an interior of the rear side being spaced from a pair of opposite edge portions.

9. The panel according to claim 1, comprising a core layer and a decorative layer and/or a wear layer, the plurality of grooves being provided in the core layer only.

10. The panel according to claim 1, further comprising a backing layer and/or a cover layer.

11. The panel according to claim 1, wherein at least one groove comprises a bevel disposed between a groove wall and said rear side.

12. The panel according to claim 1, wherein end portions of the plurality of grooves are disposed along a non-linear curve extending in a horizontal plane provided along the rear side.

13. The panel according to claim 1, wherein the thermoplastic material comprises polyvinyl chloride, PVC, and the filler comprises a mineral material.

14. The panel according to claim 1, wherein the at least one layer is extruded or coextruded.

15. The panel according to claim 1, further comprising a locking system on a first pair and a second pair of opposite edge portions of the panel, wherein the grooves are provided inwardly of the locking system on the first and/or second pair.

16. The panel according to claim 1, wherein the plurality of grooves comprise a substantially vertical groove wall.

17. The panel according to claim 1, wherein bottom portions of the plurality of grooves are disposed along a continuous curve.

18. The panel according to claim 1, wherein a linking portion joining the plurality of grooves is spaced from the rear side, the groove depths of at least the end portions of the grooves varying continuously.

19. The panel according to claim 1, wherein the first and second groove depth is a maximal groove depth from a horizontal plane provided along the rear side to an innermost portion of the respective groove.

20. A panel comprising at least one layer comprising a thermoplastic material and a filler, the panel comprising a plurality of grooves in a rear side of the panel, wherein said plurality of grooves comprise a first groove arrangement and a second groove arrangement, at least one first groove having the first groove arrangement, at least one second groove having the second groove arrangement comprising at least one groove, the first groove arrangement having a same first groove depth and the second groove arrangement having a same second groove depth, wherein the second groove depth is different from the first groove depth, wherein the plurality of grooves includes a deepest groove at an inner portion of the panel along a first or second direction of the panel, and a shallowest groove at an outer portion along the first or second direction of the panel, the deepest groove having a depth that is a maximum depth amongst the depths of the plurality of grooves, the shallowest groove having a depth that is a minimum depth amongst the depths of the plurality of grooves and that is less than the depth of the deepest groove.

* * * * *